US012750499B2

(12) United States Patent
Li et al.

(10) Patent No.: US 12,750,499 B2
(45) **Date of Patent: *Sep. 29, 2026**

(54) ENCODER, DECODER, ENCODING METHOD, AND DECODING METHOD USING HORIZONTAL AND VERTICAL GRADIENTS FOR PREDICTION

(71) Applicant: Panasonic Intellectual Property Corporation of America, Torrance, CA (US)

(72) Inventors: Jing Ya Li, Singapore (SG); Ru Ling Liao, Singapore (SG); Chong Soon Lim, Singapore (SG); Han Boon Teo, Singapore (SG); Hai Wei Sun, Singapore (SG); Kiyofumi Abe, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/044,747

(22) Filed: Feb. 4, 2025

(65) Prior Publication Data

US 2025/0184499 A1 Jun. 5, 2025

Related U.S. Application Data

(63) Continuation of application No. 18/234,504, filed on Aug. 16, 2023, now Pat. No. 12,250,384, which is a (Continued)

(51) Int. Cl.
*H04N 19/119* (2014.01)
*H04N 19/117* (2014.01)

(Continued)

(52) U.S. Cl.
CPC ......... *H04N 19/159* (2014.11); *H04N 19/117* (2014.11); *H04N 19/182* (2014.11)

(58) Field of Classification Search
CPC .... H04N 19/159; H04N 19/182; H04N 19/42; H04N 19/577; H04N 19/117
See application file for complete search history.

(56) References Cited

U.S. PATENT DOCUMENTS

2017/0094305 A1 3/2017 Li et al.
2018/0262773 A1 9/2018 Chuang et al.

(Continued)

FOREIGN PATENT DOCUMENTS

WO 2017/036399 3/2017
WO 2018/113658 6/2018

OTHER PUBLICATIONS

International Search Report (ISR) issued on Nov. 5, 2019 in International (PCT) Application No. PCT/JP2019/035125.

(Continued)

*Primary Examiner* — Tsion B Owens
(74) *Attorney, Agent, or Firm* — Wenderoth, Lind & Ponack, L.L.P.

(57) ABSTRACT

An encoder includes circuitry and memory connected to the circuitry. The circuitry: derives an absolute value of a sum of gradient values in first and second ranges; derives, as a first parameter, a total sum of absolute values of sums of gradient values derived respectively for pairs of relative pixel positions; derives a pixel difference value between pixel values in the first and second ranges; inverts or maintains a plus or minus sign of the pixel difference value, according to a plus or minus sign of the sum of the gradient values indicating the sum of the gradient values in the first and second ranges; derives, as a second parameter, a total sum of pixel difference values each having the plus or minus sign inverted or maintained, the pixel difference values (Continued)

derived respectively for the relative pixel positions; and generates a prediction image using the first and second parameters.

6 Claims, 56 Drawing Sheets

Related U.S. Application Data continuation of application No. 17/726,840, filed on Apr. 22, 2022, now Pat. No. 11,778,203, which is a continuation of application No. 17/196,194, filed on Mar. 9, 2021, now Pat. No. 11,350,111, which is a continuation of application No. PCT/JP2019/035125, filed on Sep. 6, 2019.

(60) Provisional application No. 62/731,283, filed on Sep. 14, 2018.

(51) Int. Cl.
*H04N 19/159* (2014.01)
*H04N 19/182* (2014.01)

(56) References Cited

U.S. PATENT DOCUMENTS

| | | | | |
|---|---|---|---|---|
| 2020/0221122 | A1 | 7/2020 | Ye | |
| 2020/0374550 | A1* | 11/2020 | Huang | H04N 19/1883 |
| 2020/0404255 | A1* | 12/2020 | Zhang | H04N 19/107 |
| 2021/0029378 | A1* | 1/2021 | He | H04N 19/139 |
| 2021/0084325 | A1 | 3/2021 | Lim | |
| 2021/0218970 | A1* | 7/2021 | Li | H04N 19/159 |
| 2022/0239937 | A1* | 7/2022 | Park | H04N 19/46 |

OTHER PUBLICATIONS

H.265 (ISO/IEC 23008-2 HEVC)/HEVC (High Efficiency Video Coding), Dec. 1, 2013.

Li Jingya and Chong Soon Lim, "CE9-related: Simplification of BIO", Joint Video Exploration Team (JVET) of ITU-T SG 16 WP 3 and ISO/IEC JTC 1/SC 29/WG 11, JVET-L0123-v2, 12th Meeting: Macao, CN, Oct. 2018, pp. 1-6.

Ching-Yeh Chen et al., "CE9.5.2: Bio with simplified gradient calculation, adaptive BIO granularity, and applying BIO to chroma components", Joint Video Experts Team (JVET) of ITU-T SG 16 WP 3 and ISO/IEC JTC 1/SC 29/WG 11, JVET-K0255-v1, 11th Meeting: Ljubljana, SI, Jul. 2018, pp. 1-5.

Xiaoyu Xiu et al., "Description of SDR, HDR, and 360° video coding technology proposal by InterDigital Communications and Dolby Laboratories", Joint Video Experts Team (JVET) of ITU-T SG 16 WP 3 and ISO/IEC JTC 1/SC 29/WG 11.

JVET-J0015-v1, 10th Meeting: San Diego, US, Apr. 2018, pp. i-v, 1-2, 8-9.

Tadamasa Toma et al., "Description of SDR video coding technology proposal by Panasonic", Joint Video Experts Team (JVET) of ITU-T SG 16 WP 3 and ISO/IEC JTC 1/SC 29/WG 11, JVET-J0020-v1, 10th Meeting: San Diego, US, Apr. 2018, pp. i-iii, 1-2, 10-11.

Office Action issued Jan. 2, 2026 in Indian Patent Application No. 202348072797, with English translation.

* cited by examiner

FIG. 5A

| TRANSFORM TYPE | BASIS FUNCTION $T_i(j)$, $i, j = 0, 1, \ldots, N-1$ |
|---|---|
| DCT - II | $T_i(j) = \omega_0 \cdot \sqrt{\frac{2}{N}} \cdot \cos\left(\frac{\pi \cdot i \cdot (2j+1)}{2N}\right)$ WHERE $\omega_0 = \begin{cases} \sqrt{\frac{2}{N}} & i = 0 \\ 1 & i \neq 0 \end{cases}$ |
| DCT - V | $T_i(j) = \omega_0 \cdot \omega_1 \cdot \sqrt{\frac{2}{2N-1}} \cdot \cos\left(\frac{2\pi \cdot i \cdot j}{2N-1}\right)$ WHERE $\omega_0 = \begin{cases} \sqrt{\frac{2}{N}} & i = 0 \\ 1 & i \neq 0 \end{cases}$, $\omega_1 = \begin{cases} \sqrt{\frac{2}{N}} & j = 0 \\ 1 & j \neq 0 \end{cases}$ |
| DCT - VIII | $T_i(j) = \sqrt{\frac{4}{2N+1}} \cdot \cos\left(\frac{\pi \cdot (2i+1) \cdot (2j+1)}{4N+2}\right)$ |
| DST - I | $T_i(j) = \sqrt{\frac{2}{N+1}} \cdot \sin\left(\frac{\pi \cdot (i+1) \cdot (j+1)}{N+1}\right)$ |
| DST - VII | $T_i(j) = \sqrt{\frac{4}{2N+1}} \cdot \sin\left(\frac{\pi \cdot (2i+1) \cdot (j+1)}{2N+1}\right)$ |

$$q'0 = (p1 + 2 \times p0 + 2 \times q0 + 2 \times q1 + q2 + 4) / 8$$
$$q'1 = (p0 + q0 + q1 + q2 + 2) / 4$$
$$q'2 = (p0 + q0 + q1 + 3 \times q2 + 2 \times q3 + 4) / 8$$

FIG. 9

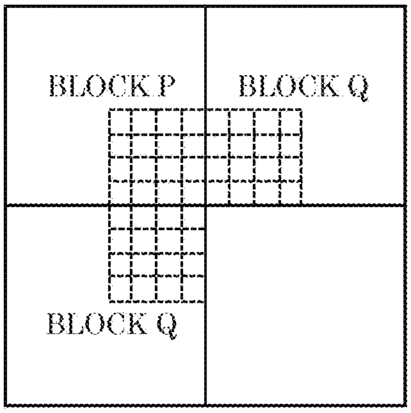

FIG. 10

| CONDITIONS FOR BLOCKS P AND Q LOCATED ACROSS BOUNDARY FOR WHICH Bs VALUE IS TO BE DETERMINED | Bs VALUES |
|---|---|
| - AT LEAST ONE OF THE BLOCKS IS INTRA PREDICTION BLOCK | 2 |
| - AT LEAST ONE OF THE BLOCKS INCLUDES NON-ZERO TRANSFORM COEFFICIENT AND HAS A SIDE WHICH COINCIDES WITH TU BOUNDARY | 1 |
| - ABSOLUTE VALUE OF DIFFERENCE BETWEEN MOTION VECTORS OF THE TWO BLOCKS ACROSS BOUNDARY CORRESPONDS TO ONE OR MORE PIXELS | 1 |
| - REFERENCE IMAGES FOR MOTION COMPENSATION OF THE TWO BLOCKS ACROSS BOUNDARY OR THE NUMBERS OF MOTION VECTORS OF THE TWO BLOCKS ARE DIFFERENT | 1 |
| - THE OTHERS | 0 |

ENCODER, DECODER, ENCODING METHOD, AND DECODING METHOD USING HORIZONTAL AND VERTICAL GRADIENTS FOR PREDICTION

CROSS REFERENCE TO RELATED APPLICATIONS

This application is a continuation of U.S. application Ser. No. 18/234,504 filed on Aug. 16, 2023, which is a continuation of U.S. application Ser. No. 17/726,840, now U.S. Pat. No. 11,778,203, filed on Apr. 22, 2022, which is a continuation of U.S. application Ser. No. 17/196,194, now U.S. Pat. No. 11,350,111, filed on Mar. 9, 2021, which is a continuation application of PCT International Patent Application Number PCT/JP2019/035125 filed on Sep. 6, 2019, claiming the benefit of priority of U.S. Provisional Application No. 62/731,283 filed on Sep. 14, 2018. The entire disclosures of the above-identified applications, including the specifications, drawings, and claims are incorporated herein by reference in their entirety.

BACKGROUND

1. Technical Field

The present disclosure relates to video coding, and relates to, for example, systems, constituent elements, methods, etc. in encoding and decoding of videos.

2. Description of the Related Art

The video coding technology has been developed from H.261 and MPEG-1 to H.264/AVC (Advanced Video Coding), MPEG-LA, H.265 (ISO/IEC 23008-2 HEVC)/HEVC (High Efficiency Video Coding), and H.266/VVC (Versatile Video Codec). With this development, it is always required to improve and optimize video coding technology in order to process digital video data the amount of which has kept increasing in various kinds of applications.

It is to be noted that Non Patent Literature 1 relates to one example of a conventional standard related to the above-described video coding technology.

SUMMARY

For example, an encoder according to an aspect of the present disclosure includes circuitry and memory connected to the circuitry. The circuitry: derives an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; derives, as a first parameter, a total sum of a plurality of absolute values of sums of gradient values derived respectively for the plurality of pairs of relative pixel positions; derives a pixel difference value which indicates a difference between a pixel value at the relative pixel position in the first range and a pixel value at the relative pixel position in the second range, for each of the plurality of pairs of relative pixel positions; inverts or maintains a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; derives, as a second parameter, a total sum of a plurality of pixel difference values each having the plus or minus sign inverted or maintained, the plurality of pixel difference values derived respectively for the plurality of pairs of relative pixel positions; and generates a prediction image to be used to encode the current block using the first parameter and the second parameter.

Some of implementations of embodiments according to the present disclosure may: improve coding efficiency; simplify an encoding/decoding process; increase an encoding and/or decoding speed; and efficiently select appropriate components/operations to be used for encoding and decoding, such as appropriate filters, block sizes, motion vectors, reference pictures, reference blocks, etc.

Further benefits and advantages according to one or more aspects of the present disclosure will become apparent from the Specification and the Drawings. These benefits and advantages are obtainable by features described in some embodiments, the Specification, and the Drawings. However, all the features do not always need to be provided to obtain one or more of the advantages and/or effects.

It is to be noted that these general or specific aspects may be implemented as a system, a method, an integrated circuit, a computer program, a recording medium, or any combination of these.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5A is a chart indicating transform basis functions for various transform types;

FIG. 9 is a conceptual diagram for illustrating a block boundary on which a deblocking filter process is performed;

FIG. 10 is a conceptual diagram indicating examples of Bs values;

DETAILED DESCRIPTION OF THE EMBODIMENTS

Figure 1:
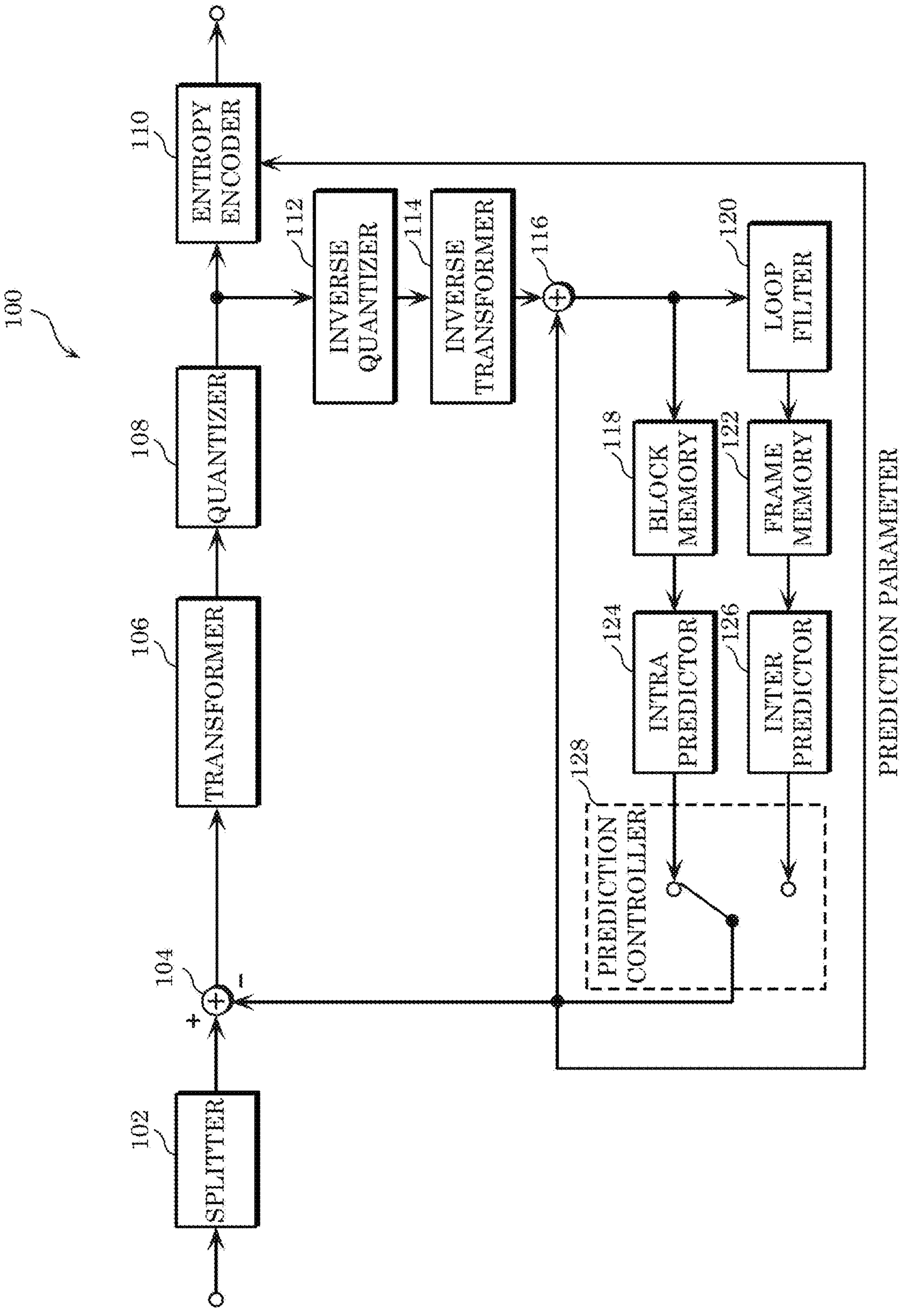
FIG. 1 is a block diagram illustrating a functional configuration of an encoder according to an embodiment.

In recent years, video encoding using a bi-directional optical flow has been studied. The bi-directional optical flow is also referred to as BIO or BDOF. For example, in the bi-directional optical flow, a prediction image having a predicted value adjusted for each pixel is generated using a parameter derived based on a pixel value of a reference image for each block and a gradient value of a reference image for the block.

An encoder is highly likely to be able to generate a highly-accurate prediction image using the bi-directional optical flow. Likewise, a decoder is highly likely to be able to generate a highly-accurate prediction image using the bi-directional optical flow.

For example, the encoder encodes a difference image between a prediction image and an original image. The decoder then decodes the difference image and adds the difference image and the prediction image to generate a reconstructed image. The use of the highly-accurate prediction image enables reduction in the amount of codes of the difference image. In other words, the use of the bi-directional optical flow provides a high possibility of being able to reduce the amount of codes of a video.

On the other hand, the parameter for use in the bi-directional optical flow is derived based on the pixel value and a gradient value at each pixel position in a reference image. For this reason, since the parameter to be used for the bi-directional optical flow is derived, computation performed for each pixel position may increase the amount of computation.

For this reason, for example, an encoder according to an aspect of the present disclosure includes circuitry and memory connected to the circuitry. The circuitry: derives an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; derives, as a first parameter, a total sum of a plurality of absolute values of sums of gradient values derived respectively for the plurality of pairs of relative pixel positions; derives a pixel difference value which indicates a difference between a pixel value at the relative pixel position in the first range and a pixel value at the relative pixel position in the second range, for each of the plurality of pairs of relative pixel positions; inverts or maintains a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; derives, as a second parameter, a total sum of a plurality of pixel difference values each having the plus or minus sign inverted or maintained, the plurality of pixel difference values derived respectively for the plurality of pairs of relative pixel positions; and generates a prediction image to be used to encode the current block using the first parameter and the second parameter.

In this way, the encoder is capable of reducing substantial multiplication which requires a large amount of computation in the computations performed for the respective pixel positions, and deriving the plurality of parameters for generating the prediction image with a small amount of computation. Accordingly, the encoder is capable of reducing the processing amount in encoding.

In addition, for example, for each of the plurality of pairs of relative pixel positions, the gradient value at the relative pixel position in the first range is a horizontal gradient value at the relative pixel position in the first range, and the gradient value at the relative pixel position in the second range is a horizontal gradient value at the relative pixel position in the second range.

In this way, the encoder is capable of deriving the plurality of parameters using the horizontal gradient values with a small amount of computation.

In addition, for example, the circuitry derives the first parameter according to Expression (4.1) described later, and the second parameter according to Expression (4.2) described later, where: Ω denotes a set of the plurality of pairs of relative pixel positions; [i, j] denotes each of the relative pixel positions included in the plurality of pairs of relative pixel positions; for each of the plurality of pairs of relative pixel positions, $$I_x^0$$

denotes a horizontal gradient value at a relative pixel position in the first range, and $$I_x^1$$

denotes a horizontal gradient value at a relative pixel position in the second range; $I^0$ denotes a pixel value at the relative pixel position in the first range; $I^1$ denotes a pixel value at the relative pixel position in the second range; abs $$(I_x^1 + I_x^0)$$

denotes an absolute value of $$I_x^1 + I_x^0;$$

and sign $$(I_x^1 + I_x^0)$$

denotes a plus or minus sign of $$I_x^1 + I_x^0.$$

In this way, the encoder is capable of appropriately deriving the plurality of parameters using the pixel values and the horizontal gradient values.

In addition, for example, for each of the plurality of pairs of relative pixel positions, the gradient value at the relative pixel position in the first range is a vertical gradient value at the relative pixel position in the first range, and the gradient value at the relative pixel position in the second range is a vertical gradient value at the relative pixel position in the second range.

In this way, the encoder is capable of deriving the plurality of parameters using the vertical gradient values with a small amount of computation.

In addition, for example, the circuitry derives the first parameter according to Expression (4.5) described later, and the second parameter according to Expression (4.6) described later, where: Ω denotes a set of the plurality of pairs of relative pixel positions; [i, j] denotes each of the relative pixel positions included in the plurality of pairs of relative pixel positions; for each of the plurality of pairs of relative pixel positions, $$I_y^0$$

denotes a vertical gradient value at a relative pixel position in the first range, and $$I_y^1$$

denotes a vertical gradient value at a relative pixel position in the second range; $I^0$ denotes a pixel value at the relative pixel position in the first range; $I^1$ denotes a pixel value at the relative pixel position in the second range; abs $$(I_y^1 + I_y^0)$$

denotes an absolute value of $$I_y^1 + I_y^0;$$

and sign $$(I_y^1 + I_y^0)$$

denotes a plus or minus sign of $$I_y^1 + I_y^0.$$

In this way, the encoder is capable of appropriately deriving the plurality of parameters using the pixel values and the vertical gradient values.

In addition, for example, the circuitry: derives, for each of the plurality of pairs of relative pixel positions, an absolute value of a sum of horizontal gradients which indicates an absolute value of a sum of a horizontal gradient value at the relative pixel position in the first range and a horizontal gradient value at the relative pixel position in the second range, and derives a total sum of a plurality of absolute values of sums of horizontal gradient values derived respectively for the plurality of pairs of relative pixel positions; derives, for each of the plurality of pairs of relative pixel positions, an absolute value of a sum of vertical gradients which indicates an absolute value of a sum of a vertical gradient value at the relative pixel position in the first range and a vertical gradient value at the relative pixel position in the second range, and derives a total sum of a plurality of absolute values of sums of vertical gradient values derived respectively for the plurality of pairs of relative pixel positions; when the total sum of the plurality of absolute values of the sums of horizontal gradient values is larger than the total sum of the plurality of absolute values of the sums of vertical gradient values, for each of the plurality of pairs of relative pixel positions: applies the horizontal gradient value at the relative pixel position in the first range to the gradient value at the relative pixel position in the first range; and applies the horizontal gradient value at the relative pixel position in the second range to the gradient value at the relative pixel position in the second range; and when the total sum of the plurality of absolute values of the sums of horizontal gradient values is not larger than the total sum of the plurality of absolute values of the sums of vertical gradient values, for each of the plurality of pairs of relative pixel positions: applies the vertical gradient value at the relative pixel position in the first range to the gradient value at the relative pixel position in the first range; and applies the vertical gradient value at the relative pixel position in the second range to the gradient value at the relative pixel position in the second range.

In this way, the encoder is capable of applying the horizontal gradient values or the vertical gradient values to the derivation of the plurality of parameters, based on comparison between the total sum related to the horizontal gradient values and the total sum related to the vertical gradient values. In other words, the encoder is capable of applying the gradient values having a large influence to the derivation of the plurality of parameters.

In addition, for example, the circuitry: derives a third parameter using the first parameter as a denominator and the second parameter as a numerator; and generates the prediction image using the third parameter.

In this way, the encoder is capable of appropriately generating the prediction image, using the parameters derived based on the relationships between the plurality of parameters.

In addition, for example, the circuitry derives, for each of the plurality of pairs of relative pixel positions, the gradient value at the relative pixel position in the first range and the gradient value at the relative pixel position in the second range using a three-tap filter having a filter coefficient set of [−1, 0, 1].

In this way, the encoder is capable of deriving the gradient value at each pixel position simply and appropriately.

In addition, for example, the current block is a sub-block defined as having 4×4 pixel size in a coding unit, and the circuitry derives the first parameter and the second parameter on a per sub-block basis.

In this way, the encoder is capable of appropriately generating the prediction image, using the plurality of parameters defined by the 4×4 pixel size.

In addition, for example, a decoder according to an aspect of the present disclosure includes circuitry and memory connected to the circuitry. The circuitry: derives an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; derives, as a first parameter, a total sum of a plurality of absolute values of sums of gradient values derived respectively for the plurality of pairs of relative pixel positions; derives a pixel difference value which indicates a difference between a pixel value at the relative pixel position in the first range and a pixel value at the relative pixel position in the second range, for each of the plurality of pairs of relative pixel positions; inverts or maintains a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; derives, as a second parameter, a total sum of a plurality of pixel difference values each having the plus or minus sign inverted or maintained, the plurality of pixel difference values derived respectively for the plurality of pairs of relative pixel positions; and generates a prediction image to be used to decode the current block using the first parameter and the second parameter.

In this way, the decoder is capable of reducing substantial multiplication which requires a large amount of computation in the computations performed for the respective pixel positions, and deriving the plurality of parameters for generating the prediction image with a small amount of computation. Accordingly, the decoder is capable of reducing the processing amount in decoding.

In addition, for example, for each of the plurality of pairs of relative pixel positions, the gradient value at the relative pixel position in the first range is a horizontal gradient value at the relative pixel position in the first range, and the gradient value at the relative pixel position in the second range is a horizontal gradient value at the relative pixel position in the second range.

In this way, the decoder is capable of deriving the plurality of parameters using the horizontal gradient values with a small amount of computation.

In addition, for example, the circuitry derives the first parameter according to Expression (4.1) described later, and the second parameter according to Expression (4.2) described later, where: Ω denotes a set of the plurality of pairs of relative pixel positions; [i, j] denotes each of the relative pixel positions included in the plurality of pairs of relative pixel positions; for each of the plurality of pairs of relative pixel positions, $$I_x^0$$

denotes a horizontal gradient value at a relative pixel position in the first range, and $$I_x^1$$

denotes a horizontal gradient value at a relative pixel position in the second range; $I^0$ denotes a pixel value at the relative pixel position in the first range; $I^1$ denotes a pixel value at the relative pixel position in the second range; abs $$(I_x^1 + I_x^0)$$

denotes an absolute value of $$I_x^1 + I_x^0;$$

and sign $$(I_x^1 + I_x^0)$$

denotes a plus or minus sign of $$I_x^1 + I_x^0.$$

In this way, the decoder is capable of appropriately deriving the plurality of parameters using the pixel values and the horizontal gradient values.

In addition, for example, for each of the plurality of pairs of relative pixel positions, the gradient value at the relative pixel position in the first range is a vertical gradient value at the relative pixel position in the first range, and the gradient value at the relative pixel position in the second range is a vertical gradient value at the relative pixel position in the second range.

In this way, the decoder is capable of deriving the plurality of parameters using the vertical gradient values with a small amount of computation.

In addition, for example, the circuitry derives the first parameter according to Expression (4.5), and the second parameter according to Expression (4.6), where: Ω denotes a set of the plurality of pairs of relative pixel positions; [i, j] denotes each of the relative pixel positions included in the plurality of pairs of relative pixel positions; for each of the plurality of pairs of relative pixel positions, $$I_y^0$$

denotes a vertical gradient value at a relative pixel position in the first range, and $$I_y^1$$

denotes a vertical gradient value at a relative pixel position in the second range; $I^0$ denotes a pixel value at the relative pixel position in the first range; $I^1$ denotes a pixel value at the relative pixel position in the second range; abs $$(I_y^1 + I_y^0)$$

denotes an absolute value of $$I_y^1 + I_y^0;$$

and sign $$\left(I_y^1 + I_y^0\right)$$

denotes a plus or minus sign of $$I_y^1 + I_y^0.$$

In this way, the decoder is capable of appropriately deriving the plurality of parameters using the pixel values and the vertical gradient values.

In addition, for example, the circuitry: derives, for each of the plurality of pairs of relative pixel positions, an absolute value of a sum of horizontal gradients which indicates an absolute value of a sum of a horizontal gradient value at the relative pixel position in the first range and a horizontal gradient value at the relative pixel position in the second range, and derives a total sum of a plurality of absolute values of sums of horizontal gradient values derived respectively for the plurality of pairs of relative pixel positions; derives, for each of the plurality of pairs of relative pixel positions, an absolute value of a sum of vertical gradients which indicates an absolute value of a sum of a vertical gradient value at the relative pixel position in the first range and a vertical gradient value at the relative pixel position in the second range, and derives a total sum of a plurality of absolute values of sums of vertical gradient values derived respectively for the plurality of pairs of relative pixel positions; when the total sum of the plurality of absolute values of the sums of horizontal gradient values is larger than the total sum of the plurality of absolute values of the sums of vertical gradient values, for each of the plurality of pairs of relative pixel positions: applies the horizontal gradient value at the relative pixel position in the first range to the gradient value at the relative pixel position in the first range; and applies the horizontal gradient value at the relative pixel position in the second range to the gradient value at the relative pixel position in the second range; and when the total sum of the plurality of absolute values of the sums of horizontal gradient values is not larger than the total sum of the plurality of absolute values of the sums of vertical gradient values, for each of the plurality of pairs of relative pixel positions: applies the vertical gradient value at the relative pixel position in the first range to the gradient value at the relative pixel position in the first range; and applies the vertical gradient value at the relative pixel position in the second range to the gradient value at the relative pixel position in the second range.

In this way, the decoder is capable of applying the horizontal gradient values or the vertical gradient values to the derivation of the plurality of parameters, based on comparison between the total sum related to the horizontal gradient values and the total sum related to the vertical gradient values. In other words, the decoder is capable of applying the gradient values having a large influence to the derivation of the plurality of parameters.

In addition, for example, the circuitry: derives a third parameter using the first parameter as a denominator and the second parameter as a numerator; and generates the prediction image using the third parameter.

In this way, the decoder is capable of appropriately generating the prediction image, using the parameters derived based on the relationships between the plurality of parameters.

In addition, for example, the circuitry derives, for each of the plurality of pairs of relative pixel positions, the gradient value at the relative pixel position in the first range and the gradient value at the relative pixel position in the second range using a three-tap filter having a filter coefficient set of [−1, 0, 1].

In this way, the decoder is capable of deriving the gradient value at each pixel position simply and appropriately.

In addition, for example, the current block is a sub-block defined as having 4×4 pixel size in a coding unit, and the circuitry derives the first parameter and the second parameter on a per sub-block basis.

In this way, the decoder is capable of appropriately generating the prediction image, using the plurality of parameters defined by the 4×4 pixel size.

In addition, for example, an encoding method according to an aspect of the present disclosure includes: deriving an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; deriving, as a first parameter, a total sum of a plurality of absolute values of sums of gradient values derived respectively for the plurality of pairs of relative pixel positions; deriving a pixel difference value which indicates a difference between a pixel value at the relative pixel position in the first range and a pixel value at the relative pixel position in the second range, for each of the plurality of pairs of relative pixel positions; inverting or maintaining a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; deriving, as a second parameter, a total sum of a plurality of pixel difference values each having the plus or minus sign inverted or maintained, the plurality of pixel difference values derived respectively for the plurality of pairs of relative pixel positions; and generating a prediction image to be used to encode the current block using the first parameter and the second parameter.

In this way, it becomes possible to reduce substantial multiplication which requires a large amount of computation in the computations performed for the respective pixel positions, and derive the plurality of parameters for generating the prediction image with a small amount of computation. Accordingly, it becomes possible to reduce the processing amount in encoding.

In addition, for example, a decoding method according to an aspect of the present disclosure includes: deriving an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; deriving, as a first parameter, a total sum of a plurality of absolute values of sums of gradient values derived respectively for the plurality of pairs of relative pixel positions; deriving a pixel difference value which indicates a difference between a pixel value at the relative pixel position in the first range and a pixel value at the relative pixel position in the second range, for each of the plurality of pairs of relative pixel positions; inverting or maintaining a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; deriving, as a second parameter, a total sum of a plurality of pixel difference values each having the plus or minus sign inverted or maintained, the plurality of pixel difference values derived respectively for the plurality of pairs of relative pixel positions; and generating a prediction image to be used to decode the current block using the first parameter and the second parameter.

In this way, it becomes possible to reduce substantial multiplication which requires a large amount of computation in the computations performed for the respective pixel positions, and derive the plurality of parameters for generating the prediction image with a small amount of computation. Accordingly, it becomes possible to reduce the processing amount in decoding.

Alternatively, an encoder according to an aspect of the present disclosure is an encoder which encodes a video using a prediction image. The encoder includes a splitter, an intra predictor, an inter predictor, a transformer, a quantizer, and an entropy encoder.

The splitter splits a current picture to be encoded included in the video into a plurality of blocks. The intra predictor performs intra prediction for generating a prediction image for a current block to be encoded in the current picture, using a reference image in the current picture. The inter predictor performs inter prediction for generating a prediction image for a current block to be encoded, using a reference image in a reference picture different from the current picture.

The transformer transforms a prediction error signal between (i) either the prediction image generated by the intra predictor or the prediction image generated by the inter predictor and (ii) the image of the current block, to generate a transform coefficient signal of the current block. The quantizer quantizes the transform coefficient signal. The entropy encoder encodes the quantized transform coefficient signal.

In addition, for example, the inter predictor: derives an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; derives, as a first parameter, a total sum of a plurality of absolute values of sums of gradient values derived respectively for the plurality of pairs of relative pixel positions; derives a pixel difference value which indicates a difference between a pixel value at the relative pixel position in the first range and a pixel value at the relative pixel position in the second range, for each of the plurality of pairs of relative pixel positions; inverts or maintains a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; derives, as a second parameter, a total sum of a plurality of pixel difference values each having the plus or minus sign inverted or maintained, the plurality of pixel difference values derived respectively for the plurality of pairs of relative pixel positions; and generates a prediction image to be used to encode the current block using the first parameter and the second parameter.

Alternatively, for example, a decoder according to an aspect of the present disclosure is a decoder which decodes a video using a prediction image. The decoder includes an entropy decoder, an inverse quantizer, an inverse transformer, an intra predictor, an inter predictor, and an adder (reconstructor).

The entropy decoder decodes a quantized transform coefficient signal of a current block to be decoded in a current picture to be decoded in the video. The inverse quantizer inverse quantizes the quantized transform coefficient signal. The inverse transformer inverse transforms the transform coefficient signal to obtain a prediction error signal of the current block.

The intra predictor performs intra prediction for generating the prediction image for a current block to be decoded, using a reference image in a current picture to be decoded. The inter predictor performs inter prediction for generating a prediction image for a current block to be decoded, using a reference image in a reference picture different from the current picture. The adder adds the prediction error signal and either the prediction image generated by the intra predictor or the prediction image generated by the inter predictor to reconstruct an image of the current block.

In addition, for example, the inter predictor: derives an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; derives, as a first parameter, a total sum of a plurality of absolute values of sums of gradient values derived respectively for the plurality of pairs of relative pixel positions; derives a pixel difference value which indicates a difference between a pixel value at the relative pixel position in the first range and a pixel value at the relative pixel position in the second range, for each of the plurality of pairs of relative pixel positions; inverts or maintains a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; derives, as a second parameter, a total sum of a plurality of pixel difference values each having the plus or minus sign inverted or maintained, the plurality of pixel difference values derived respectively for the plurality of pairs of relative pixel positions; and generates a prediction image to be used to decode the current block using the first parameter and the second parameter.

Furthermore, these general or specific aspects may be implemented using a system, an apparatus, a method, an integrated circuit, a computer program, or a non-transitory computer-readable recording medium such as a CD-ROM, or any combination of systems, apparatuses, methods, integrated circuits, computer programs, or computer-readable recording media.

Hereinafter, embodiments will be described with reference to the drawings. Note that the embodiments described below each show a general or specific example. The numerical values, shapes, materials, components, the arrangement and connection of the components, steps, the relation and order of the steps, etc., indicated in the following embodiments are mere examples, and are not intended to limit the scope of the claims.

Embodiments of an encoder and a decoder will be described below. The embodiments are examples of an encoder and a decoder to which the processes and/or configurations presented in the description of aspects of the present disclosure are applicable. The processes and/or configurations can also be implemented in an encoder and a decoder different from those according to the embodiments. For example, regarding the processes and/or configurations as applied to the embodiments, any of the following may be implemented:

(1) Any of the components of the encoder or the decoder according to the embodiments presented in the description of aspects of the present disclosure may be substituted or combined with another component presented anywhere in the description of aspects of the present disclosure.

(2) In the encoder or the decoder according to the embodiments, discretionary changes may be made to functions or processes performed by one or more components of the encoder or the decoder, such as addition, substitution, removal, etc., of the functions or processes. For example, any function or process may be substituted or combined with another function or process presented anywhere in the description of aspects of the present disclosure.

(3) In methods implemented by the encoder or the decoder according to the embodiments, discretionary changes may be made such as addition, substitution, and removal of one or more of the processes included in the method. For example, any process in the method may be substituted or combined with another process presented anywhere in the description of aspects of the present disclosure.

(4) One or more components included in the encoder or the decoder according to embodiments may be combined with a component presented anywhere in the description of aspects of the present disclosure, may be combined with a component including one or more functions presented anywhere in the description of aspects of the present disclosure, and may be combined with a component that implements one or more processes implemented by a component presented in the description of aspects of the present disclosure.

(5) A component including one or more functions of the encoder or the decoder according to the embodiments, or a component that implements one or more processes of the encoder or the decoder according to the embodiments, may be combined or substituted with a component presented anywhere in the description of aspects of the present disclosure, with a component including one or more functions presented anywhere in the description of aspects of the present disclosure, or with a component that implements one or more processes presented anywhere in the description of aspects of the present disclosure.

(6) In methods implemented by the encoder or the decoder according to the embodiments, any of the processes included in the method may be substituted or combined with a process presented anywhere in the description of aspects of the present disclosure or with any corresponding or equivalent process.

(7) One or more processes included in methods implemented by the encoder or the decoder according to the embodiments may be combined with a process presented anywhere in the description of aspects of the present disclosure.

(8) The implementation of the processes and/or configurations presented in the description of aspects of the present disclosure is not limited to the encoder or the decoder according to the embodiments. For example, the processes and/or configurations may be implemented in a device used for a purpose different from the moving picture encoder or the moving picture decoder disclosed in the embodiments.

[Encoder]

First, an encoder according to an embodiment will be described. FIG. 1 is a block diagram illustrating a functional configuration of encoder 100 according to the embodiment. Encoder 100 is a video encoder which encodes a video in units of a block.

As illustrated in FIG. 1, encoder 100 is an apparatus which encodes an image in units of a block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is implemented as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be implemented as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, an overall flow of processes performed by encoder 100 is described, and then each of constituent elements included in encoder 100 will be described.

[Overall Flow of Encoding Process]

Figure 2:
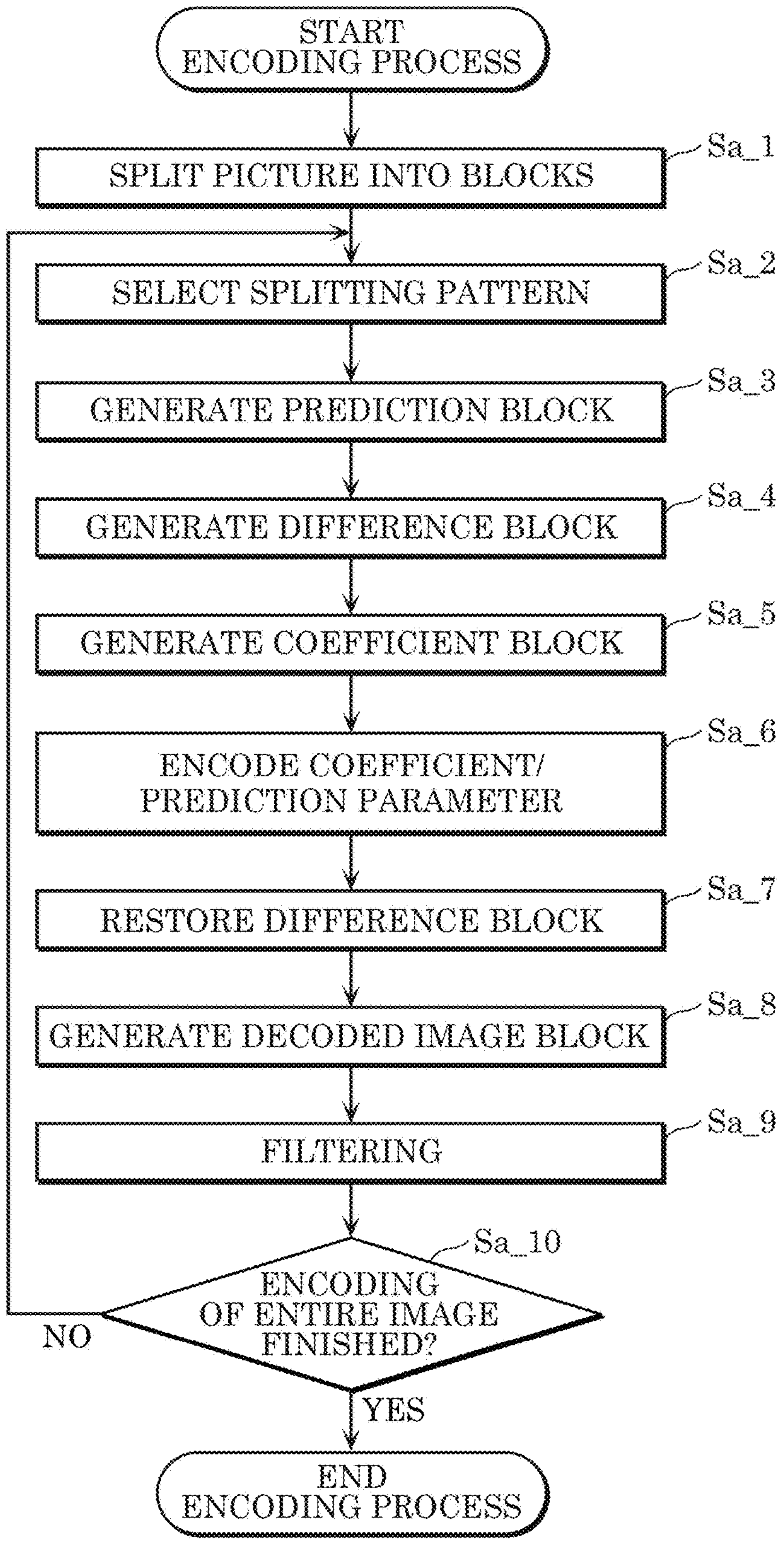
FIG. 2 is a flow chart indicating one example of an overall encoding process performed by the encoder.

FIG. 2 is a flow chart indicating one example of an overall encoding process performed by encoder 100.

First, splitter 102 of encoder 100 splits each of pictures included in an input image which is a video into a plurality of blocks having a fixed size (e.g., 128×128 pixels) (Step Sa_1). Splitter 102 then selects a splitting pattern for the fixed-size block (also referred to as a block shape) (Step Sa_2). In other words, splitter 102 further splits the fixed-size block into a plurality of blocks which form the selected splitting pattern. Encoder 100 performs, for each of the plurality of blocks, Steps Sa_3 to Sa_9 for the block (that is a current block to be encoded).

In other words, a prediction processor which includes all or part of intra predictor 124, inter predictor 126, and prediction controller 128 generates a prediction signal (also referred to as a prediction block) of the current block to be encoded (also referred to as a current block) (Step Sa_3).

Next, subtractor 104 generates a difference between the current block and a prediction block as a prediction residual (also referred to as a difference block) (Step Sa_4).

Next, transformer 106 transforms the difference block and quantizer 108 quantizes the result, to generate a plurality of quantized coefficients (Step Sa_5). It is to be noted that the block having the plurality of quantized coefficients is also referred to as a coefficient block.

Next, entropy encoder 110 encodes (specifically, entropy encodes) the coefficient block and a prediction parameter related to generation of a prediction signal to generate an encoded signal (Step Sa_6). It is to be noted that the encoded signal is also referred to as an encoded bitstream, a compressed bitstream, or a stream.

Next, inverse quantizer 112 performs inverse quantization of the coefficient block and inverse transformer 114 performs inverse transform of the result, to restore a plurality of prediction residuals (that is, a difference block) (Step Sa_7).

Next, adder 116 adds the prediction block to the restored difference block to reconstruct the current block as a reconstructed image (also referred to as a reconstructed block or a decoded image block) (Step Sa_8). In this way, the reconstructed image is generated.

When the reconstructed image is generated, loop filter 120 performs filtering of the reconstructed image as necessary (Step Sa_9).

Encoder 100 then determines whether encoding of the entire picture has been finished (Step Sa_10). When determining that the encoding has not yet been finished (No in Step Sa_10), processes from Step Sa_2 are executed repeatedly.

Although encoder 100 selects one splitting pattern for a fixed-size block, and encodes each block according to the splitting pattern in the above-described example, it is to be noted that each block may be encoded according to a corresponding one of a plurality of splitting patterns. In this case, encoder 100 may evaluate a cost for each of the plurality of splitting patterns, and, for example, may select the encoded signal obtainable by encoding according to the splitting pattern which yields the smallest cost as an encoded signal which is output.

As illustrated, the processes in Steps Sa_1 to Sa_10 are performed sequentially by encoder 100. Alternatively, two or more of the processes may be performed in parallel, the processes may be reordered, etc.

[Splitter]

Splitter 102 splits each of pictures included in an input video into a plurality of blocks, and outputs each block to subtractor 104. For example, splitter 102 first splits a picture into blocks of a fixed size (for example, 128×128). Other fixed block sizes may be employed. The fixed-size block is also referred to as a coding tree unit (CTU). Splitter 102 then splits each fixed-size block into blocks of variable sizes (for example, 64×64 or smaller), based on recursive quadtree and/or binary tree block splitting. In other words, splitter 102 selects a splitting pattern. The variable-size block is also referred to as a coding unit (CU), a prediction unit (PU), or a transform unit (TU). It is to be noted that, in various kinds of processing examples, there is no need to differentiate between CU, PU, and TU; all or some of the blocks in a picture may be processed in units of a CU, a PU, or a TU.

Figure 3:
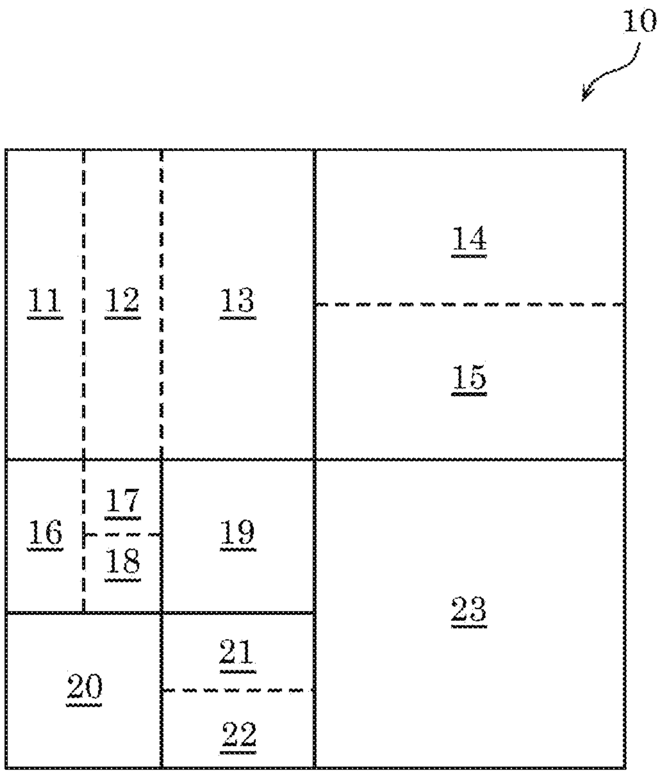
FIG. 3 is a conceptual diagram illustrating one example of block splitting.

FIG. 3 is a conceptual diagram illustrating one example of block splitting according to an embodiment. In FIG. 3, the solid lines represent block boundaries of blocks split by quadtree block splitting, and the dashed lines represent block boundaries of blocks split by binary tree block splitting.

Here, block 10 is a square block having 128×128 pixels (128×128 block). This 128×128 block 10 is first split into four square 64×64 blocks (quadtree block splitting).

The upper-left 64×64 block is further vertically split into two rectangular 32×64 blocks, and the left 32×64 block is further vertically split into two rectangular 16×64 blocks (binary tree block splitting). As a result, the upper-left 64×64 block is split into two 16×64 blocks 11 and 12 and one 32×64 block 13.

The upper-right 64×64 block is horizontally split into two rectangular 64×32 blocks 14 and 15 (binary tree block splitting).

The lower-left 64×64 block is first split into four square 32×32 blocks (quadtree block splitting). The upper-left block and the lower-right block among the four 32×32 blocks are further split. The upper-left 32×32 block is vertically split into two rectangle 16×32 blocks, and the right 16×32 block is further horizontally split into two 16×16 blocks (binary tree block splitting). The lower-right 32×32 block is horizontally split into two 32×16 blocks (binary tree block splitting). As a result, the lower-left 64×64 block is split into 16×32 block 16, two 16×16 blocks 17 and 18, two 32×32 blocks 19 and 20, and two 32×16 blocks 21 and 22.

The lower-right 64×64 block 23 is not split.

As described above, in FIG. 3, block 10 is split into thirteen variable-size blocks 11 through 23 based on recursive quadtree and binary tree block splitting. This type of splitting is also referred to as quadtree plus binary tree (QTBT) splitting.

It is to be noted that, in FIG. 3, one block is split into four or two blocks (quadtree or binary tree block splitting), but splitting is not limited to these examples. For example, one block may be split into three blocks (ternary block splitting). Splitting including such ternary block splitting is also referred to as multi-type tree (MBT) splitting.

[Picture Structure: Slice/Tile]

A picture may be configured in units of one or more slices or tiles in order to decode the picture in parallel. The picture configured in units of one or more slices or tiles may be configured by splitter 102.

Slices are basic encoding units included in a picture. A picture may include, for example, one or more slices. In addition, a slice includes one or more successive coding tree units (CTU).

Figure 4A:
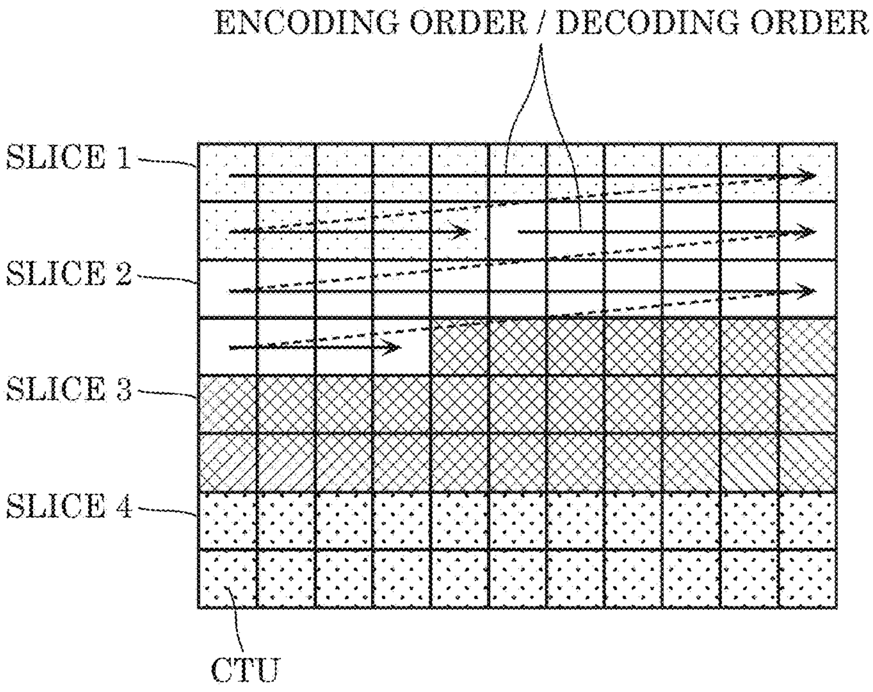
FIG. 4A is a conceptual diagram illustrating one example of a slice configuration.

FIG. 4A is a conceptual diagram illustrating one example of a slice configuration. For example, a picture includes 11×8 CTUs and is split into four slices (slices 1 to 4). Slice 1 includes sixteen CTUs, slice 2 includes twenty-one CTUs, slice 3 includes twenty-nine CTUs, and slice 4 includes twenty-two CTUs. Here, each CTU in the picture belongs to one of the slices. The shape of each slice is a shape obtainable by splitting the picture horizontally. A boundary of each slice does not need to be coincide with an image end, and may be coincide with any of the boundaries between CTUs in the image. The processing order of the CTUs in a slice (an encoding order or a decoding order) is, for example, a raster-scan order. A slice includes header information and encoded data. Features of the slice may be described in header information. The features include a CTU address of a top CTU in the slice, a slice type, etc.

A tile is a unit of a rectangular region included in a picture. Each of tiles may be assigned with a number referred to as TileId in raster-scan order.

Figure 4B:
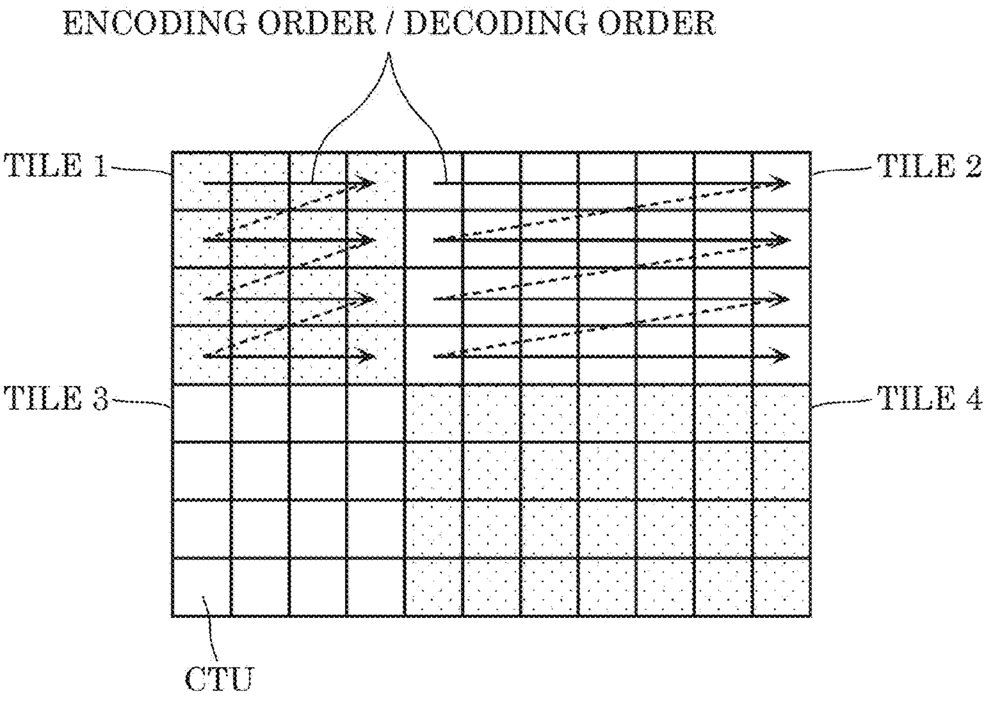
FIG. 4B is a conceptual diagram illustrating one example of a tile configuration.

FIG. 4B is a conceptual diagram indicating an example of a tile configuration. For example, a picture includes 11×8 CTUs and is split into four tiles of rectangular regions (tiles 1 to 4). When tiles are used, the processing order of CTUs are changed from the processing order in the case where no tile is used. When no tile is used, CTUs in a picture are processed in raster-scan order. When tiles are used, at least one CTU in each of the tiles is processed in raster-scan order. For example, as illustrated in FIG. 4B, the processing order of the CTUs included in tile 1 is the order which starts from the left-end of the first row of tile 1 toward the right-end of the first row of tile 1 and then starts from the left-end of the second row of tile 1 toward the right-end of the second row of tile 1. It is to be noted that the one tile may include one or more slices, and one slice may include one or more tiles.

[Subtractor]

Subtractor 104 subtracts a prediction signal (prediction sample that is input from prediction controller 128 indicated below) from an original signal (original sample) in units of a block input from splitter 102 and split by splitter 102. In other words, subtractor 104 calculates prediction errors (also referred to as residuals) of a block to be encoded (hereinafter also referred to as a current block). Subtractor 104 then outputs the calculated prediction errors (residuals) to transformer 106.

The original signal is a signal which has been input into encoder 100 and represents an image of each picture included in a video (for example, a luma signal and two chroma signals). Hereinafter, a signal representing an image is also referred to as a sample.

[Transformer]

Transformer 106 transforms prediction errors in spatial domain into transform coefficients in frequency domain, and outputs the transform coefficients to quantizer 108. More specifically, transformer 106 applies, for example, a defined discrete cosine transform (DCT) or discrete sine transform (DST) to prediction errors in spatial domain. The defined DCT or DST may be predefined.

It is to be noted that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 5A is a chart indicating transform basis functions for the example transform types. In FIG. 5A, N indicates the number of input pixels. For example, selection of a transform type from among the plurality of transform types may depend on a prediction type (one of intra prediction and inter prediction), and may depend on an intra prediction mode.

Information indicating whether to apply such EMT or AMT (referred to as, for example, an EMT flag or an AMT flag) and information indicating the selected transform type is normally signaled at the CU level. It is to be noted that the signaling of such information does not necessarily need to be performed at the CU level, and may be performed at another level (for example, at the bit sequence level, picture level, slice level, tile level, or CTU level).

In addition, transformer 106 may re-transform the transform coefficients (transform result). Such re-transform is also referred to as adaptive secondary transform (AST) or non-separable secondary transform (NSST). For example, transformer 106 performs re-transform in units of a sub-block (for example, 4×4 sub-block) included in a transform coefficient block corresponding to an intra prediction error. Information indicating whether to apply NSST and information related to a transform matrix for use in NSST are normally signaled at the CU level. It is to be noted that the signaling of such information does not necessarily need to be performed at the CU level, and may be performed at another level (for example, at the sequence level, picture level, slice level, tile level, or CTU level).

Transformer 106 may employ a separable transform and a non-separable transform. A separable transform is a method in which a transform is performed a plurality of times by separately performing a transform for each of a number of directions according to the number of dimensions of inputs. A non-separable transform is a method of performing a collective transform in which two or more dimensions in multidimensional inputs are collectively regarded as a single dimension.

In one example of a non-separable transform, when an input is a 4×4 block, the 4×4 block is regarded as a single array including sixteen elements, and the transform applies a 16×16 transform matrix to the array.

In another example of a non-separable transform, a 4×4 input block is regarded as a single array including sixteen elements, and then a transform (hypercube givens transform) in which givens revolution is performed on the array a plurality of times may be performed.

Figure 5B:
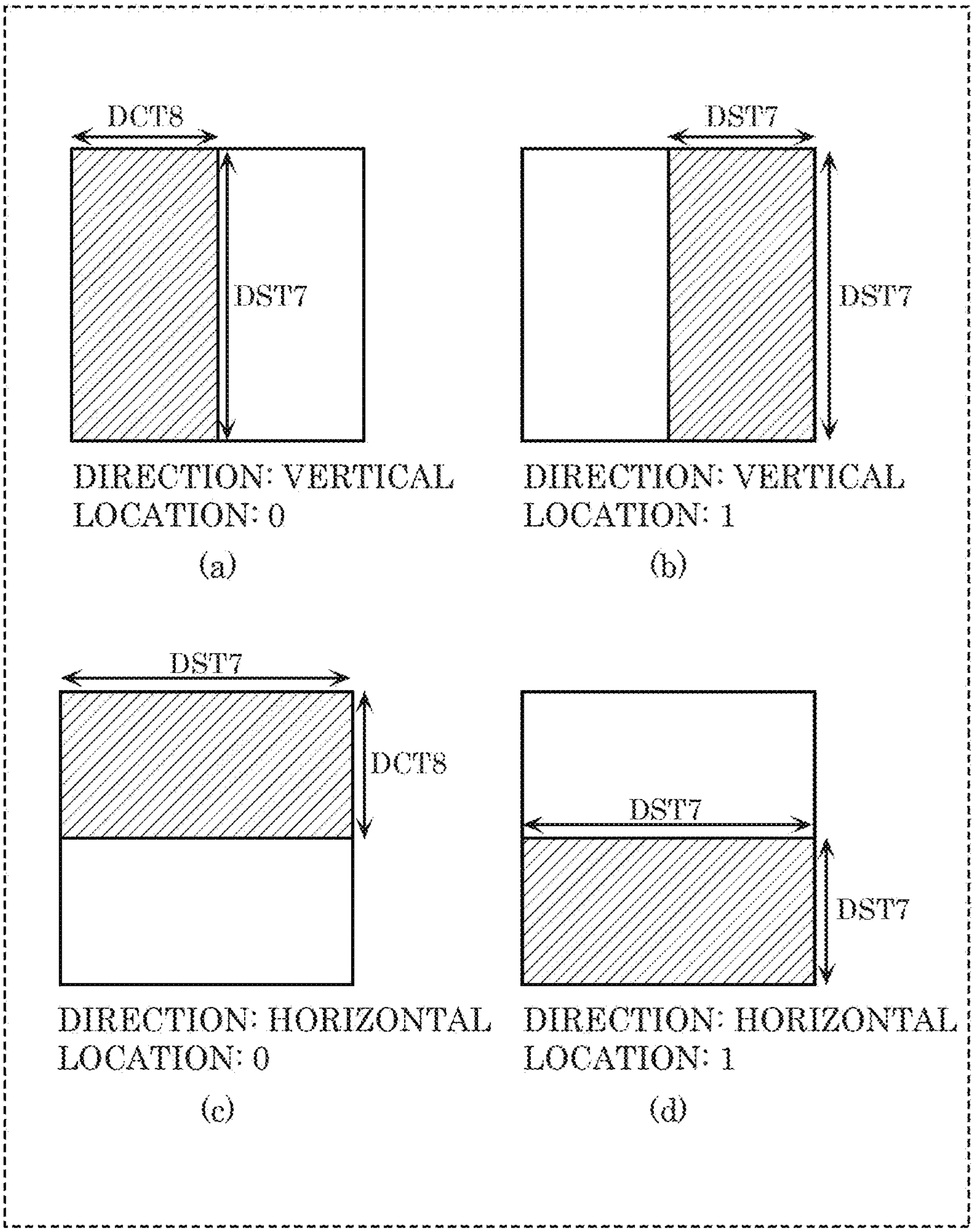
FIG. 5B is a conceptual diagram illustrating example spatially varying transforms (SVT)

In the transform in transformer 106, the types of bases to be transformed into the frequency domain according to regions in a CU can be switched. Examples include spatially varying transforms (SVT). In SVT, as illustrated in FIG. 5B, CUs are split into two equal regions horizontally or vertically, and only one of the regions is transformed into the frequency domain. A transform basis type can be set for each region. For example, DST7 and DST8 are used. In this example, only one of these two regions in the CU is transformed, and the other is not transformed. However, both of these two regions may be transformed. In addition, the splitting method is not limited to the splitting into two equal regions, and can be more flexible. For example, the CU may be split into four equal regions, or information indicating splitting may be encoded separately and be signaled in the same manner as the CU splitting. It is to be noted that SVT is also referred to as sub-block transform (SBT).

[Quantizer]

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. Quantizer 108 then outputs the quantized transform coefficients (hereinafter also referred to as quantized coefficients) of the current block to entropy encoder 110 and inverse quantizer 112. The determined scanning order may be predetermined.

A determined scanning order is an order for quantizing/inverse quantizing transform coefficients. For example, a determined scanning order may be defined as ascending order of frequency (from low to high frequency) or descending order of frequency (from high to low frequency).

A quantization parameter (QP) is a parameter defining a quantization step (quantization width). For example, when the value of the quantization parameter increases, the quantization step also increases. In other words, when the value of the quantization parameter increases, the quantization error increases.

In addition, a quantization matrix may be used for quantization. For example, several kinds of quantization matrices may be used correspondingly to frequency transform sizes such as 4×4 and 8×8, prediction modes such as intra prediction and inter prediction, and pixel components such as luma and chroma pixel components. It is to be noted that quantization means digitalizing values sampled at determined intervals correspondingly to determined levels. In this technical field, quantization may be referred to using other expressions, such as rounding and scaling, and may employ rounding and scaling. The determined intervals and levels may be predetermined.

Methods using quantization matrices include a method using a quantization matrix which has been set directly at the encoder side and a method using a quantization matrix which has been set as a default (default matrix). At the encoder side, a quantization matrix suitable for features of an image can be set by directly setting a quantization matrix. This case, however, has a disadvantage of increasing a coding amount for encoding the quantization matrix.

There is a method for quantizing a high-frequency coefficient and a low-frequency coefficient without using a quantization matrix. It is to be noted that this method is equivalent to a method using a quantization matrix (flat matrix) whose coefficients have the same value.

The quantization matrix may be specified using, for example, a sequence parameter set (SPS) or a picture parameter set (PPS). The SPS includes a parameter which is used for a sequence, and the PPS includes a parameter which is used for a picture. Each of the SPS and the PPS may be simply referred to as a parameter set.

[Entropy Encoder]

Entropy encoder 110 generates an encoded signal (encoded bitstream) based on quantized coefficients which have been input from quantizer 108. More specifically, entropy encoder 110, for example, binarizes quantized coefficients, and arithmetically encodes the binary signal, and outputs a compressed bit stream or sequence.

[Inverse Quantizer]

Inverse quantizer 112 inverse quantizes quantized coefficients which have been input from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114. The determined scanning order may be predetermined.

[Inverse Transformer]

Inverse transformer 114 restores prediction errors (residuals) by inverse transforming transform coefficients which have been input from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

It is to be noted that since information is lost in quantization, the restored prediction errors do not match the prediction errors calculated by subtractor 104. In other words, the restored prediction errors normally include quantization errors.

[Adder]

Adder 116 reconstructs the current block by adding prediction errors which have been input from inverse transformer 114 and prediction samples which have been input from prediction controller 128. Adder 116 then outputs the reconstructed block to block memory 118 and loop filter 120. A reconstructed block is also referred to as a local decoded block.

[Block Memory]

Block memory 118 is, for example, storage for storing blocks in a picture to be encoded (hereinafter referred to as a current picture) which is referred to in intra prediction. More specifically, block memory 118 stores reconstructed blocks output from adder 116.

[Frame Memory]

Frame memory 122 is, for example, storage for storing reference pictures for use in inter prediction, and is also referred to as a frame buffer. More specifically, frame memory 122 stores reconstructed blocks filtered by loop filter 120.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF or DBF), a sample adaptive offset (SAO), and an adaptive loop filter (ALF).

In an ALF, a least square error filter for removing compression artifacts is applied. For example, one filter selected from among a plurality of filters based on the direction and activity of local gradients is applied for each of 2×2 sub-blocks in the current block.

More specifically, first, each sub-block (for example, each 2×2 sub-block) is categorized into one out of a plurality of classes (for example, fifteen or twenty-five classes). The classification of the sub-block is based on gradient directionality and activity. For example, classification index C (for example, C=5D+A) is derived based on gradient directionality D (for example, 0 to 2 or 0 to 4) and gradient activity A (for example, 0 to 4). Then, based on classification index C, each sub-block is categorized into one out of a plurality of classes.

For example, gradient directionality D is calculated by comparing gradients of a plurality of directions (for example, the horizontal, vertical, and two diagonal directions). Moreover, for example, gradient activity A is calculated by adding gradients of a plurality of directions and quantizing the result of addition.

The filter to be used for each sub-block is determined from among the plurality of filters based on the result of such categorization.

Figure 6A:
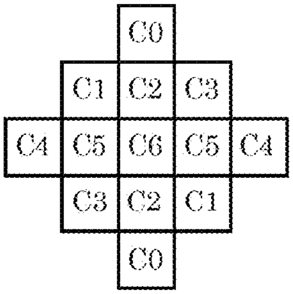
FIG. 6A is a conceptual diagram illustrating one example of a filter shape used in an adaptive loop filter (ALF)
Figure 6B:
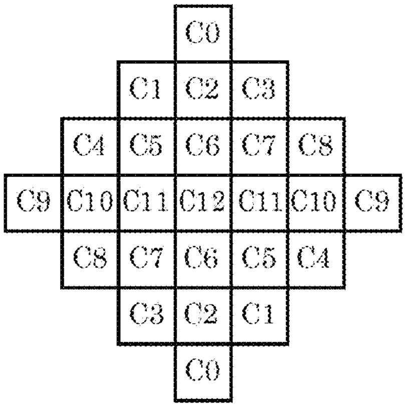
FIG. 6B is a conceptual diagram illustrating another example of a filter shape used in an ALF.
Figure 6C:
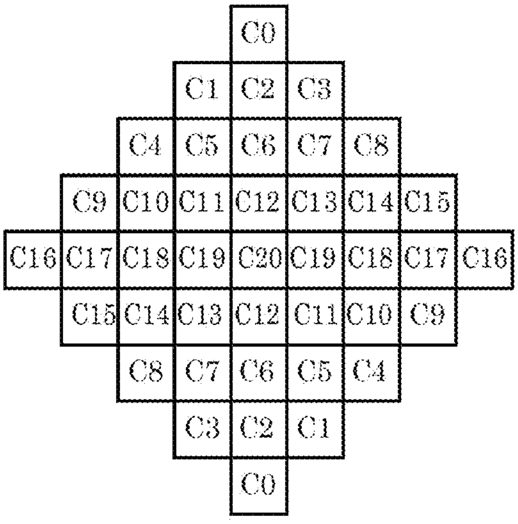
FIG. 6C is a conceptual diagram illustrating another example of a filter shape used in an ALF.

The filter shape to be used in an ALF is, for example, a circular symmetric filter shape. FIG. 6A through FIG. 6C illustrate examples of filter shapes used in ALFs. FIG. 6A illustrates a 5×5 diamond shape filter, FIG. 6B illustrates a 7×7 diamond shape filter, and FIG. 6C illustrates a 9×9 diamond shape filter. Information indicating the filter shape is normally signaled at the picture level. It is to be noted that the signaling of such information indicating the filter shape does not necessarily need to be performed at the picture level, and may be performed at another level (for example, at the sequence level, slice level, tile level, CTU level, or CU level).

The ON or OFF of the ALF is determined, for example, at the picture level or CU level. For example, the decision of whether to apply the ALF to luma may be made at the CU level, and the decision of whether to apply ALF to chroma may be made at the picture level. Information indicating ON or OFF of the ALF is normally signaled at the picture level or CU level. It is to be noted that the signaling of information indicating ON or OFF of the ALF does not necessarily need to be performed at the picture level or CU level, and may be performed at another level (for example, at the sequence level, slice level, tile level, or CTU level).

The coefficient set for the plurality of selectable filters (for example, fifteen or up to twenty-five filters) is normally signaled at the picture level. It is to be noted that the signaling of the coefficient set does not necessarily need to be performed at the picture level, and may be performed at another level (for example, at the sequence level, slice level, tile level, CTU level, CU level, or sub-block level).

[Loop Filter>Deblocking Filter]

In a deblocking filter, loop filter 120 performs a filter process on a block boundary in a reconstructed image so as to reduce distortion which occurs at the block boundary.

Figure 7:
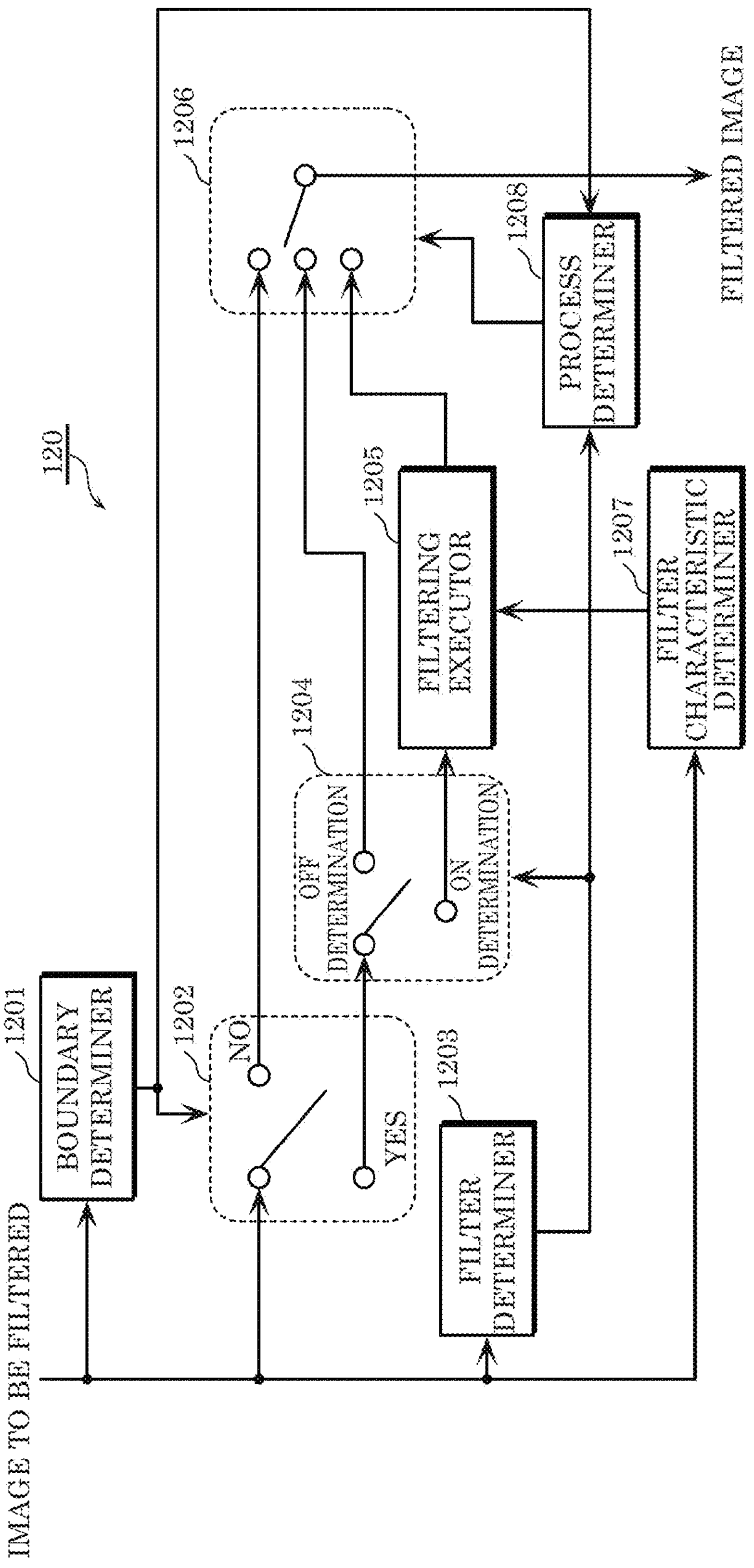
FIG. 7 is a block diagram indicating one example of a specific configuration of a loop filter which functions as a deblocking filter (DBF)

FIG. 7 is a block diagram illustrating one example of a specific configuration of loop filter 120 which functions as a deblocking filter.

Loop filter 120 includes: boundary determiner 1201; filter determiner 1203; filtering executor 1205; process determiner 1208; filter characteristic determiner 1207; and switches 1202, 1204, and 1206.

Boundary determiner 1201 determines whether a pixel to be deblock-filtered (that is, a current pixel) is present around a block boundary. Boundary determiner 1201 then outputs the determination result to switch 1202 and processing determiner 1208.

In the case where boundary determiner 1201 has determined that a current pixel is present around a block boundary, switch 1202 outputs an unfiltered image to switch 1204. In the opposite case where boundary determiner 1201 has determined that no current pixel is present around a block boundary, switch 1202 outputs an unfiltered image to switch 1206.

Filter determiner 1203 determines whether to perform deblocking filtering of the current pixel, based on the pixel value of at least one surrounding pixel located around the current pixel. Filter determiner 1203 then outputs the determination result to switch 1204 and processing determiner 1208.

In the case where filter determiner 1203 has determined to perform deblocking filtering of the current pixel, switch 1204 outputs the unfiltered image obtained through switch 1202 to filtering executor 1205. In the opposite case were filter determiner 1203 has determined not to perform deblocking filtering of the current pixel, switch 1204 outputs the unfiltered image obtained through switch 1202 to switch 1206.

When obtaining the unfiltered image through switches 1202 and 1204, filtering executor 1205 executes, for the current pixel, deblocking filtering with the filter characteristic determined by filter characteristic determiner 1207. Filtering executor 1205 then outputs the filtered pixel to switch 1206.

Under control by processing determiner 1208, switch 1206 selectively outputs a pixel which has not been deblock-filtered and a pixel which has been deblock-filtered by filtering executor 1205.

Processing determiner 1208 controls switch 1206 based on the results of determinations made by boundary determiner 1201 and filter determiner 1203. In other words, processing determiner 1208 causes switch 1206 to output the pixel which has been deblock-filtered when boundary determiner 1201 has determined that the current pixel is present around the block boundary and filter determiner 1203 has determined to perform deblocking filtering of the current pixel. In addition, other than the above case, processing determiner 1208 causes switch 1206 to output the pixel which has not been deblock-filtered. A filtered image is output from switch 1206 by repeating output of a pixel in this way.

Figure 8:
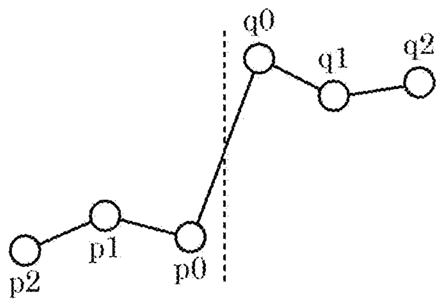
FIG. 8 is a conceptual diagram indicating an example of a deblocking filter having a symmetrical filtering characteristic with respect to a block boundary.

FIG. 8 is a conceptual diagram indicating an example of a deblocking filter having a symmetrical filtering characteristic with respect to a block boundary.

In a deblocking filter process, one of two deblocking filters having different characteristics, that is, a strong filter and a weak filter is selected using pixel values and quantization parameters. In the case of the strong filter, pixels p0 to p2 and pixels q0 to q2 are present across a block boundary as illustrated in FIG. 8, the pixel values of the respective pixels q0 to q2 are changed to pixel values q'0 to q'2 by performing, for example, computations according to the expressions below.

$$q'0 = (p1 + 2 \times p0 + 2 \times q0 + 2 \times q1 + q2 + 4)/8$$

$$q'1 = (p0 + q0 + q1 + q2 + 2)/4$$

$$q'2 = (p0 + q0 + q1 + 3 \times q2 + 2 \times q3 + 4)/8$$

It is to be noted that, in the above expressions, p0 to p2 and q0 to q2 are the pixel values of respective pixels p0 to p2 and pixels q0 to q2. In addition, q3 is the pixel value of neighboring pixel q3 located at the opposite side of pixel q2 with respect to the block boundary. In addition, in the right side of each of the expressions, coefficients which are multiplied with the respective pixel values of the pixels to be used for deblocking filtering are filter coefficients.

Furthermore, in the deblocking filtering, clipping may be performed so that the calculated pixel values are not set over a threshold value. In the clipping process, the pixel values calculated according to the above expressions are clipped to a value obtained according to "a computation pixel value±2×a threshold value" using the threshold value determined based on a quantization parameter. In this way, it is possible to prevent excessive smoothing.

FIG. 9 is a conceptual diagram for illustrating a block boundary on which a deblocking filter process is performed. FIG. 10 is a conceptual diagram indicating examples of Bs values.

The block boundary on which the deblocking filter process is performed is, for example, a boundary between prediction units (PU) having 8×8 pixel blocks as illustrated in FIG. 9 or a boundary between transform units (TU). The deblocking filter process may be performed in units of four rows or four columns. First, boundary strength (Bs) values are determined as indicated in FIG. 10 for block P and block Q illustrated in FIG. 9.

According to the Bs values in FIG. 10, whether to perform deblocking filter processes of block boundaries belonging to the same image using different strengths is determined. The deblocking filter process for a chroma signal is performed when a Bs value is 2. The deblocking filter process for a luma signal is performed when a Bs value is 1 or more and a determined condition is satisfied. The determined condition may be predetermined. It is to be noted that conditions for determining Bs values are not limited to those indicated in FIG. 10, and a Bs value may be determined based on another parameter.

[Prediction Processor (Intra Predictor, Inter Predictor, Prediction Controller)]

Figure 11:
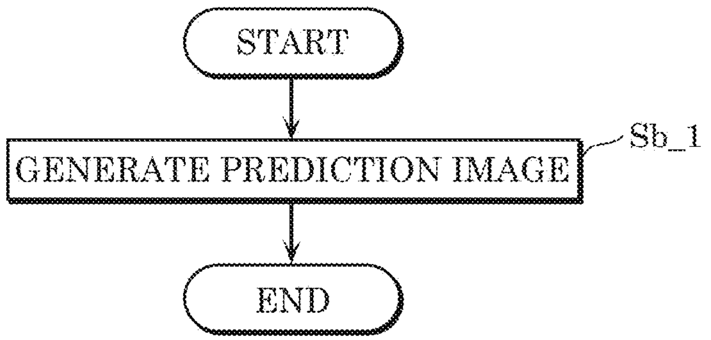
FIG. 11 is a flow chart illustrating one example of a process performed by a prediction processor of the encoder.

FIG. 11 is a flow chart illustrating one example of a process performed by the prediction processor of encoder 100. It is to be noted that the prediction processor includes all or part of the following constituent elements: intra predictor 124; inter predictor 126; and prediction controller 128.

The prediction processor generates a prediction image of a current block (Step Sb_1). This prediction image is also referred to as a prediction signal or a prediction block. It is to be noted that the prediction signal is, for example, an intra prediction signal or an inter prediction signal. Specifically, the prediction processor generates the prediction image of the current block using a reconstructed image which has been already obtained through generation of a prediction block, generation of a difference block, generation of a coefficient block, restoring of a difference block, and generation of a decoded image block.

The reconstructed image may be, for example, an image in a reference picture, or an image of an encoded block in a current picture which is the picture including the current block. The encoded block in the current picture is, for example, a neighboring block of the current block.

Figure 12:
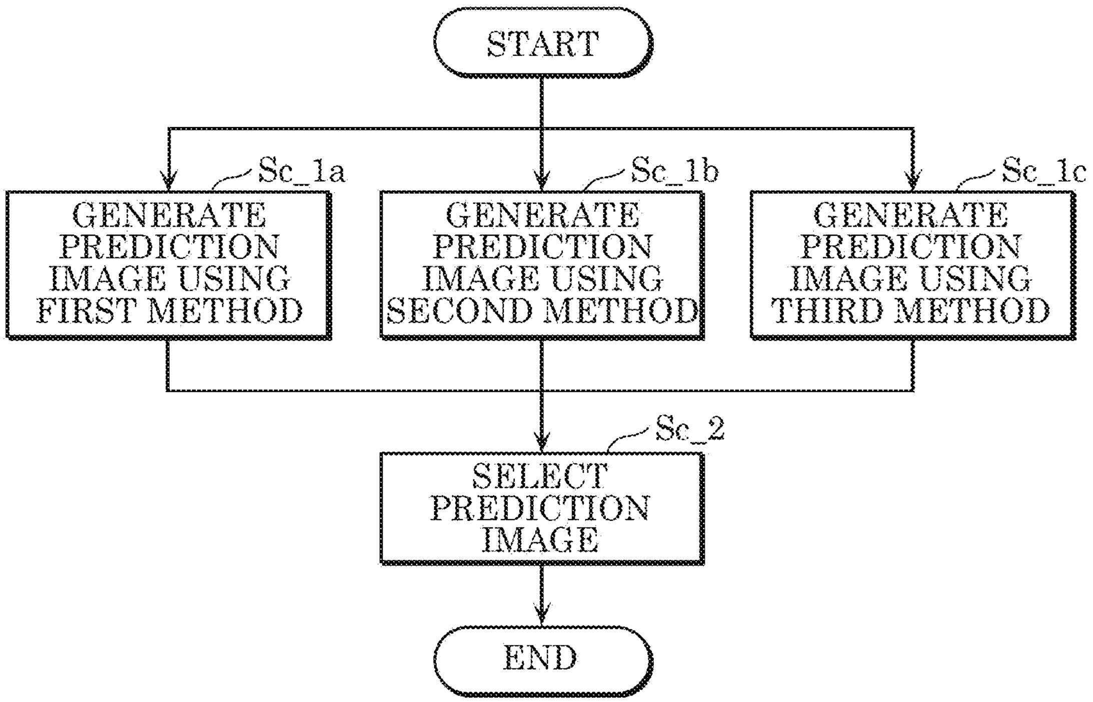
FIG. 12 is a flow chart illustrating another example of a process performed by the prediction processor of the encoder.

FIG. 12 is a flow chart illustrating another example of a process performed by the prediction processor of encoder 100.

The prediction processor generates a prediction image using a first method (Step Sc_1*a*), generates a prediction image using a second method (Step Sc_1*b*), and generates a prediction image using a third method (Step Sc_1*c*). The first method, the second method, and the third method may be mutually different methods for generating a prediction image. Each of the first to third methods may be an inter prediction method, an intra prediction method, or another prediction method. The above-described reconstructed image may be used in these prediction methods.

Next, the prediction processor selects any one of a plurality of prediction methods generated in Steps Sc_1*a*, Sc_1*b*, and Sc_1*c* (Step Sc_2). The selection of the prediction image, that is selection of a method or a mode for obtaining a final prediction image may be made by calculating a cost for each of the generated prediction images and based on the cost. Alternatively, the selection of the prediction image may be made based on a parameter which is used in an encoding process. Encoder 100 may transform information for identifying a selected prediction image, a method, or a mode into an encoded signal (also referred to as an encoded bitstream). The information may be, for example, a flag or the like. In this way, the decoder is capable of generating a prediction image according to the method or the mode selected based on the information in encoder 100. It is to be noted that, in the example illustrated in FIG. 12, the prediction processor selects any of the prediction images after the prediction images are generated using the respective methods. However, the prediction processor may select a method or a mode based on a parameter for use in the above-described encoding process before generating prediction images, and may generate a prediction image according to the method or mode selected.

For example, the first method and the second method may be intra prediction and inter prediction, respectively, and the prediction processor may select a final prediction image for a current block from prediction images generated according to the prediction methods.

Figure 13:
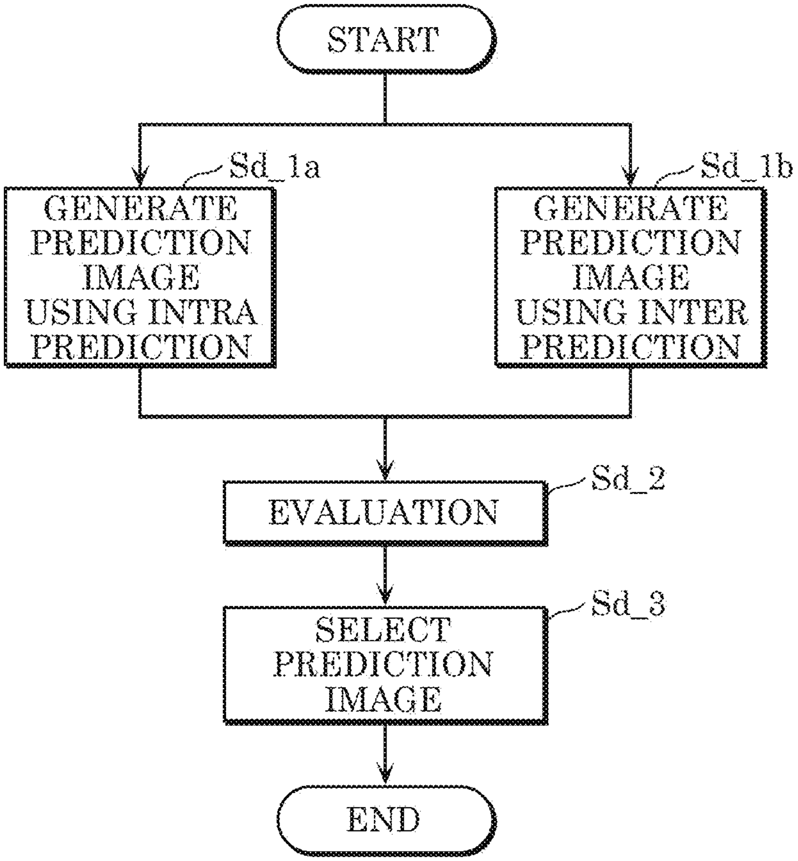
FIG. 13 is a flow chart illustrating another example of a process performed by the prediction processor of the encoder.

FIG. 13 is a flow chart illustrating another example of a process performed by the prediction processor of encoder 100.

First, the prediction processor generates a prediction image using intra prediction (Step Sd_1*a*), and generates a prediction image using inter prediction (Step Sd_1*b*). It is to be noted that the prediction image generated by intra prediction is also referred to as an intra prediction image, and the prediction image generated by inter prediction is also referred to as an inter prediction image.

Next, the prediction processor evaluates each of the intra prediction image and the inter prediction image (Step Sd_2). A cost may be used in the evaluation. In other words, the prediction processor calculates cost C for each of the intra prediction image and the inter prediction image. Cost C may be calculated according to an expression of an R-D optimization model, for example, $C=D+\lambda\times R$. In this expression, D indicates a coding distortion of a prediction image, and is represented as, for example, a sum of absolute differences between the pixel value of a current block and the pixel value of a prediction image. In addition, R indicates a predicted coding amount of a prediction image, specifically, the coding amount required to encode motion information for generating a prediction image, etc. In addition, A indicates, for example, a multiplier according to the method of Lagrange multiplier.

The prediction processor then selects the prediction image for which the smallest cost C has been calculated among the intra prediction image and the inter prediction image, as the final prediction image for the current block (Step Sd_3). In other words, the prediction method or the mode for generating the prediction image for the current block is selected.

[Intra Predictor]

Intra predictor 124 generates a prediction signal (intra prediction signal) by performing intra prediction (also referred to as intra frame prediction) of the current block by referring to a block or blocks in the current picture and stored in block memory 118. More specifically, intra predictor 124 generates an intra prediction signal by performing intra prediction by referring to samples (for example, luma and/or chroma values) of a block or blocks neighboring the current block, and then outputs the intra prediction signal to prediction controller 128.

For example, intra predictor 124 performs intra prediction by using one mode from among a plurality of intra prediction modes which have been defined. The intra prediction modes include one or more non-directional prediction modes and a plurality of directional prediction modes. The defined modes may be predefined.

The one or more non-directional prediction modes include, for example, the planar prediction mode and DC prediction mode defined in the H.265/high-efficiency video coding (HEVC) standard.

Figure 14:
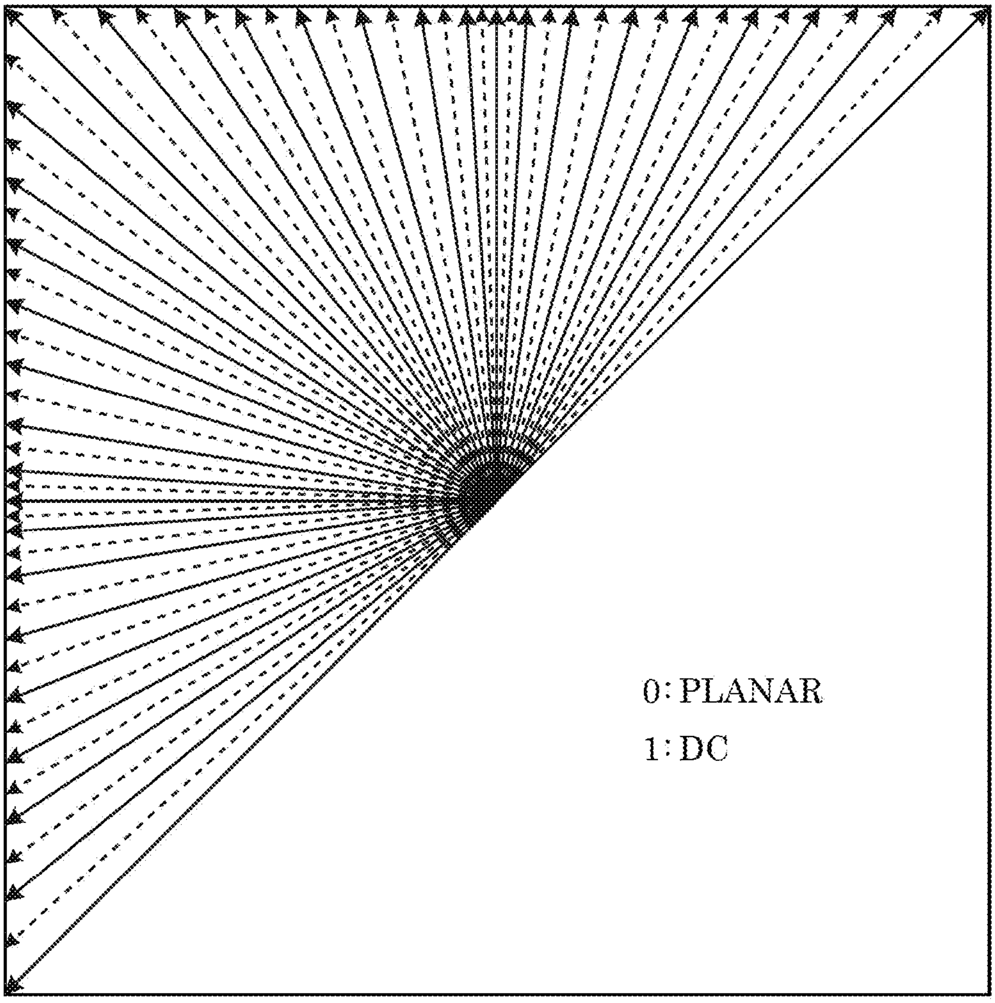
FIG. 14 is a conceptual diagram illustrating sixty-seven intra prediction modes used in intra prediction in an embodiment.

The plurality of directional prediction modes include, for example, the thirty-three directional prediction modes defined in the H.265/HEVC standard. It is to be noted that the plurality of directional prediction modes may further include thirty-two directional prediction modes in addition to the thirty-three directional prediction modes (for a total of sixty-five directional prediction modes). FIG. 14 is a conceptual diagram illustrating sixty-seven intra prediction modes in total that may be used in intra prediction (two non-directional prediction modes and sixty-five directional prediction modes). The solid arrows represent the thirty-three directions defined in the H.265/HEVC standard, and the dashed arrows represent the additional thirty-two directions (the two non-directional prediction modes are not illustrated in FIG. 14).

In various kinds of processing examples, a luma block may be referred to in intra prediction of a chroma block. In other words, a chroma component of the current block may be predicted based on a luma component of the current block. Such intra prediction is also referred to as cross-component linear model (CCLM) prediction. The intra prediction mode for a chroma block in which such a luma block is referred to (also referred to as, for example, a CCLM mode) may be added as one of the intra prediction modes for chroma blocks.

Intra predictor 124 may correct intra-predicted pixel values based on horizontal/vertical reference pixel gradients. Intra prediction accompanied by this sort of correcting is also referred to as position dependent intra prediction combination (PDPC). Information indicating whether to apply PDPC (referred to as, for example, a PDPC flag) is normally signaled at the CU level. It is to be noted that the signaling of such information does not necessarily need to be performed at the CU level, and may be performed at another level (for example, at the sequence level, picture level, slice level, tile level, or CTU level).

[Inter Predictor]

Inter predictor 126 generates a prediction signal (inter prediction signal) by performing inter prediction (also referred to as inter frame prediction) of the current block by referring to a block or blocks in a reference picture, which is different from the current picture and is stored in frame memory 122. Inter prediction is performed in units of a current block or a current sub-block (for example, a 4×4 block) in the current block. For example, inter predictor 126 performs motion estimation in a reference picture for the current block or the current sub-block, and finds out a reference block or a sub-block which best matches the current block or the current sub-block. Inter predictor 126 then obtains motion information (for example, a motion vector) which compensates a motion or a change from the reference block or the sub-block to the current block or the sub-block. Inter predictor 126 generates an inter prediction signal of the current block or the sub-block by performing motion compensation (or motion prediction) based on the motion information. Inter predictor 126 outputs the generated inter prediction signal to prediction controller 128.

The motion information used in motion compensation may be signaled as inter prediction signals in various forms. For example, a motion vector may be signaled. As another example, the difference between a motion vector and a motion vector predictor may be signaled.

[Basic Flow of Inter Prediction]

Figure 15:
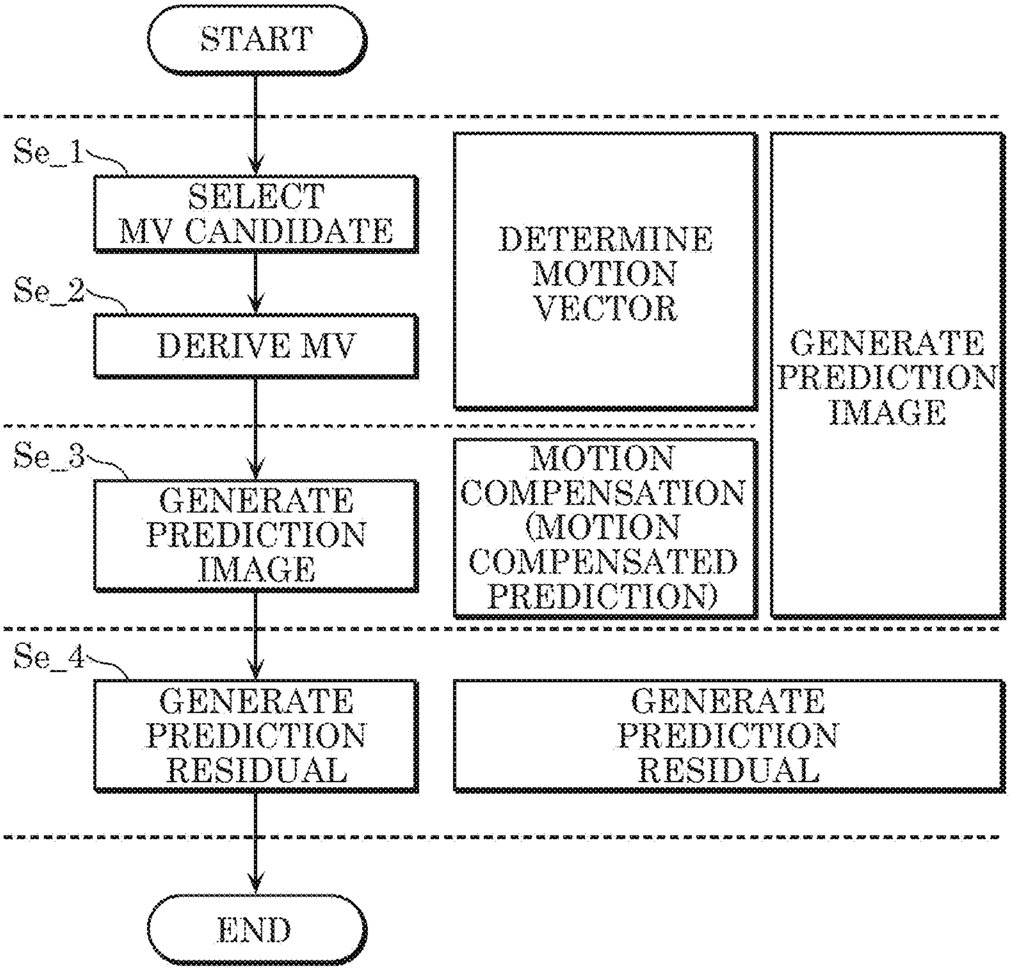
FIG. 15 is a flow chart illustrating an example basic processing flow of inter prediction.

FIG. 15 is a flow chart illustrating an example basic processing flow of inter prediction.

First, inter predictor 126 generates a prediction signal (Steps Se_1 to Se_3). Next, subtractor 104 generates the difference between a current block and a prediction image as a prediction residual (Step Se_4).

Here, in the generation of the prediction image, inter predictor 126 generates the prediction image through determination of a motion vector (MV) of the current block (Steps Se_1 and Se_2) and motion compensation (Step Se_3). Furthermore, in determination of an MV, inter predictor 126 determines the MV through selection of a motion vector candidate (MV candidate) (Step Se_1) and derivation of an MV (Step Se_2). The selection of the MV candidate is made by, for example, selecting at least one MV candidate from an MV candidate list. Alternatively, in derivation of an MV, inter predictor 126 may further select at least one MV candidate from the at least one MV candidate, and determine the selected at least one MV candidate as the MV for the current block. Alternatively, inter predictor 126 may determine the MV for the current block by performing estimation in a reference picture region specified by each of the selected at least one MV candidate. It is to be noted that the estimation in a reference picture region may be referred to as motion estimation.

In addition, although Steps Se_1 to Se_3 are performed by inter predictor 126 in the above-described example, a process that is for example Step Se_1, Step Se_2, or the like may be performed by another constituent element included in encoder 100.

[Motion Vector Derivation Flow]

Figure 16:
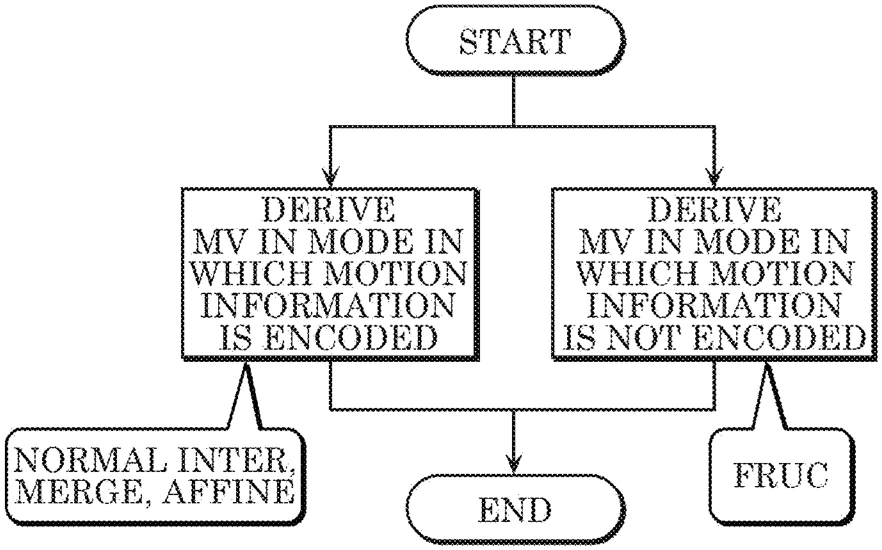
FIG. 16 is a flow chart illustrating one example of derivation of motion vectors.

FIG. 16 is a flow chart illustrating one example of derivation of motion vectors.

Inter predictor 126 derives an MV of a current block in a mode for encoding motion information (for example, an MV). In this case, for example, the motion information is encoded as a prediction parameter, and is signaled. In other words, the encoded motion information is included in an encoded signal (also referred to as an encoded bitstream).

Alternatively, inter predictor 126 derives an MV in a mode in which motion information is not encoded. In this case, no motion information is included in an encoded signal.

Here, MV derivation modes may include a normal inter mode, a merge mode, a FRUC mode, an affine mode, etc. which are described later. Modes in which motion information is encoded among the modes include the normal inter mode, the merge mode, the affine mode (specifically, an affine inter mode and an affine merge mode), etc. It is to be noted that motion information may include not only an MV but also motion vector predictor selection information which is described later. Modes in which no motion information is encoded include the FRUC mode, etc. Inter predictor 126 selects a mode for deriving an MV of the current block from the modes, and derives the MV of the current block using the selected mode.

Figure 17:
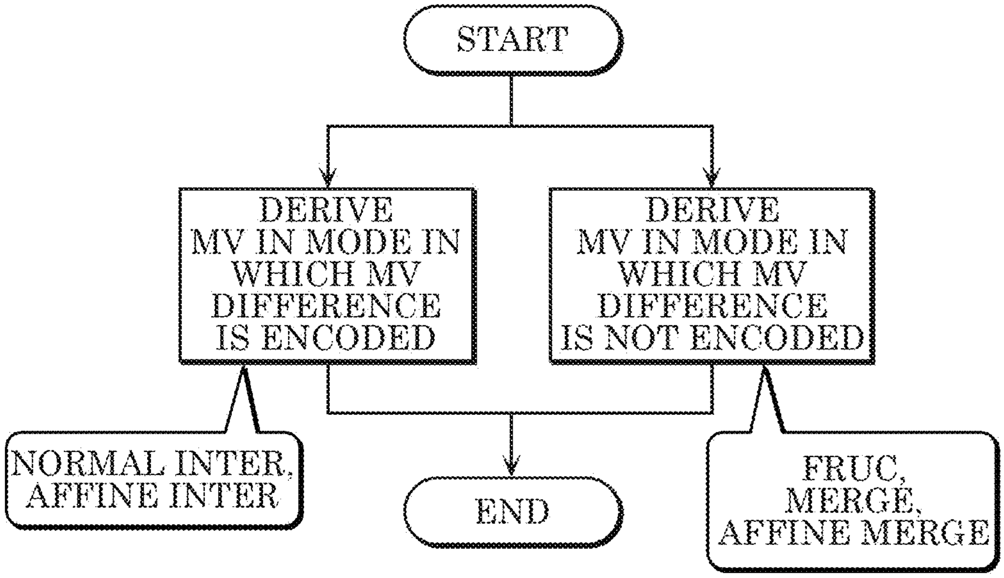
FIG. 17 is a flow chart illustrating another example of derivation of motion vectors.

FIG. 17 is a flow chart illustrating another example of derivation of motion vectors.

Inter predictor 126 derives an MV of a current block in a mode in which an MV difference is encoded. In this case, for example, the MV difference is encoded as a prediction parameter, and is signaled. In other words, the encoded MV difference is included in an encoded signal. The MV difference is the difference between the MV of the current block and the MV predictor.

Alternatively, inter predictor 126 derives an MV in a mode in which no MV difference is encoded. In this case, no encoded MV difference is included in an encoded signal.

Here, as described above, the MV derivation modes include the normal inter mode, the merge mode, the FRUC mode, the affine mode, etc. which are described later. Modes in which an MV difference is encoded among the modes include the normal inter mode, the affine mode (specifically, the affine inter mode), etc. Modes in which no MV difference is encoded include the FRUC mode, the merge mode, the affine mode (specifically, the affine merge mode), etc. Inter predictor 126 selects a mode for deriving an MV of the current block from the plurality of modes, and derives the MV of the current block using the selected mode.

[Motion Vector Derivation Flow]

Figure 18:
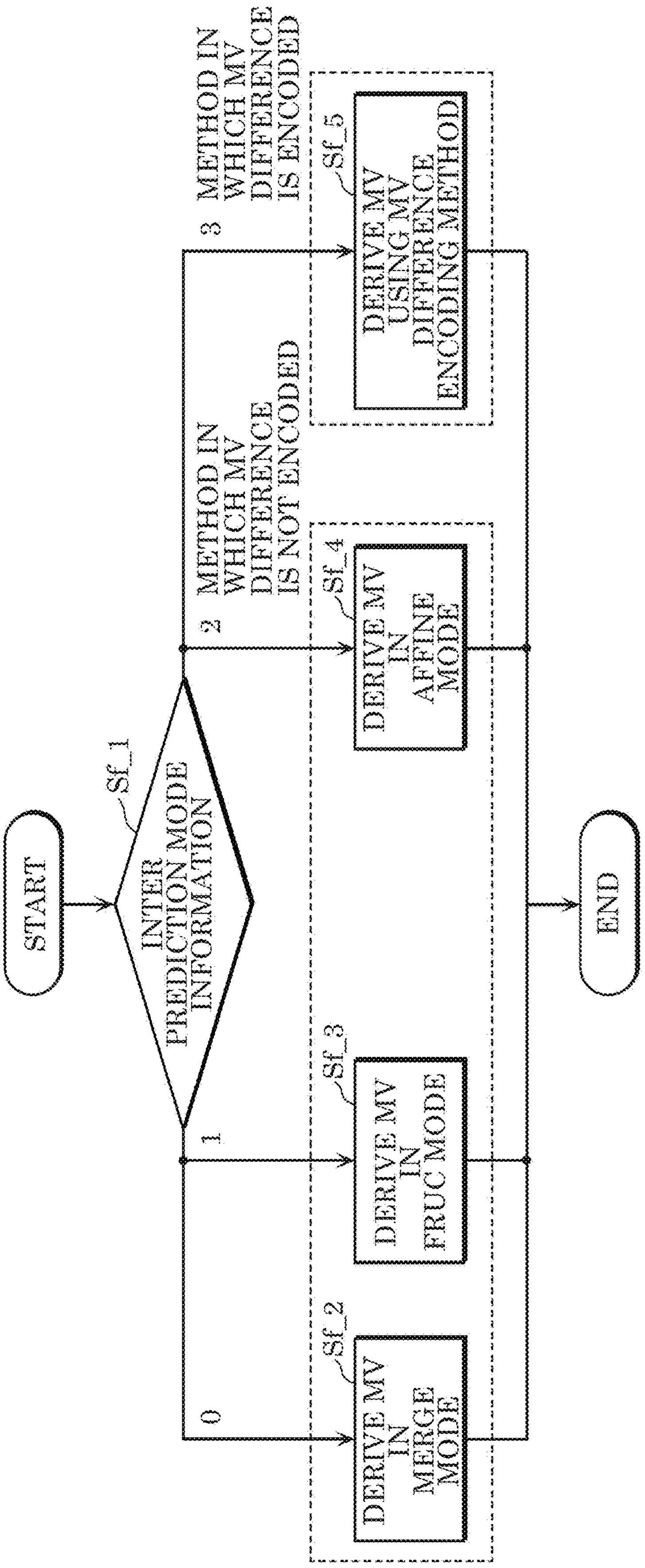
FIG. 18 is a flow chart illustrating another example of derivation of motion vectors.

FIG. 18 is a flow chart illustrating another example of derivation of motion vectors. The MV derivation modes which are inter prediction modes include a plurality of modes and are roughly divided into modes in which an MV difference is encoded and modes in which no motion vector difference is encoded. The modes in which no MV difference is encoded include the merge mode, the FRUC mode, the affine mode (specifically, the affine merge mode), etc. These modes are described in detail later. Simply, the merge mode is a mode for deriving an MV of a current block by selecting a motion vector from an encoded surrounding block, and the FRUC mode is a mode for deriving an MV of a current block by performing estimation between encoded regions. The affine mode is a mode for deriving, as an MV of a current block, a motion vector of each of a plurality of sub-blocks included in the current block, assuming affine transform.

More specifically, as illustrated when the inter prediction mode information indicates 0 (0 in Sf_1), inter predictor 126 derives a motion vector using the merge mode (Sf_2). When the inter prediction mode information indicates 1 (1 in Sf_1), inter predictor 126 derives a motion vector using the FRUC mode (Sf_3). When the inter prediction mode information indicates 2 (2 in Sf_1), inter predictor 126 derives a motion vector using the affine mode (specifically, the affine merge mode) (Sf_4). When the inter prediction mode information indicates 3 (3 in Sf_1), inter predictor 126 derives a motion vector using a mode in which an MV difference is encoded (for example, a normal inter mode (Sf_5).

[MV Derivation>Normal Inter Mode]

The normal inter mode is an inter prediction mode for deriving an MV of a current block based on a block similar to the image of the current block from a reference picture region specified by an MV candidate. In this normal inter mode, an MV difference is encoded.

Figure 19:
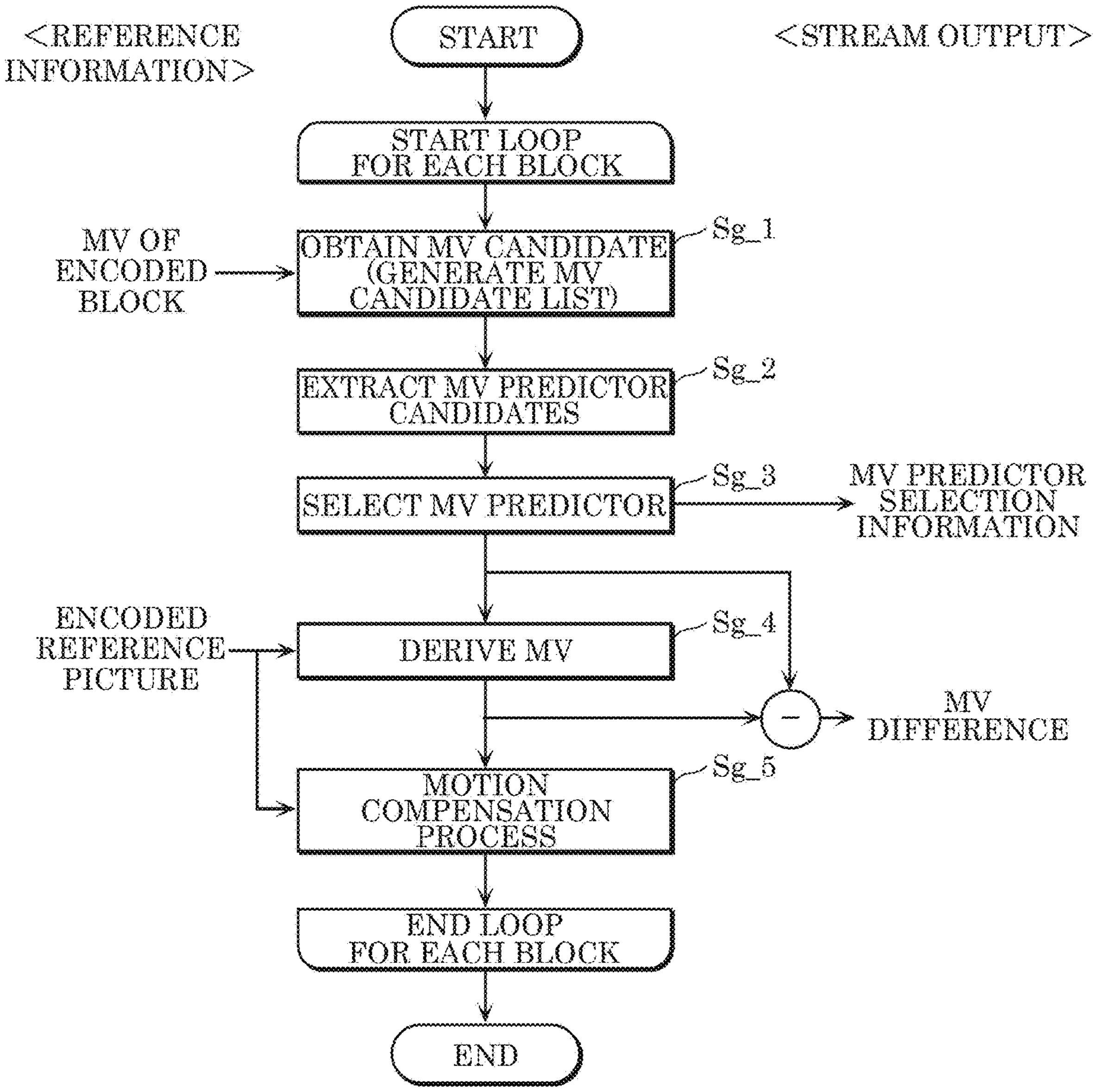
FIG. 19 is a flow chart illustrating an example of inter prediction in normal inter mode.

FIG. 19 is a flow chart illustrating an example of inter prediction in normal inter mode.

First, inter predictor 126 obtains a plurality of MV candidates for a current block based on information such as MVs of a plurality of encoded blocks temporally or spatially surrounding the current block (Step Sg_1). In other words, inter predictor 126 generates an MV candidate list.

Next, inter predictor 126 extracts N (an integer of 2 or larger) MV candidates from the plurality of MV candidates obtained in Step Sg_1, as motion vector predictor candidates (also referred to as MV predictor candidates) according to a determined priority order (Step Sg_2). It is to be noted that the priority order may be determined in advance for each of the N MV candidates.

Next, inter predictor 126 selects one motion vector predictor candidate from the N motion vector predictor candidates, as the motion vector predictor (also referred to as an MV predictor) of the current block (Step Sg_3). At this time, inter predictor 126 encodes, in a stream, motion vector predictor selection information for identifying the selected motion vector predictor. It is to be noted that the stream is an encoded signal or an encoded bitstream as described above.

Next, inter predictor 126 derives an MV of a current block by referring to an encoded reference picture (Step Sg_4). At this time, inter predictor 126 further encodes, in the stream, the difference value between the derived MV and the motion vector predictor as an MV difference. It is to be noted that the encoded reference picture is a picture including a plurality of blocks which have been reconstructed after being encoded.

Lastly, inter predictor 126 generates a prediction image for the current block by performing motion compensation of the current block using the derived MV and the encoded reference picture (Step Sg_5). It is to be noted that the prediction image is an inter prediction signal as described above.

In addition, information indicating the inter prediction mode (normal inter mode in the above example) used to generate the prediction image is, for example, encoded as a prediction parameter.

It is to be noted that the MV candidate list may be also used as a list for use in another mode. In addition, the processes related to the MV candidate list may be applied to processes related to the list for use in another mode. The processes related to the MV candidate list include, for example, extraction or selection of an MV candidate from the MV candidate list, reordering of MV candidates, or deletion of an MV candidate.

[MV Derivation>Merge Mode]

The merge mode is an inter prediction mode for selecting an MV candidate from an MV candidate list as an MV of a current block, thereby deriving the MV.

Figure 20:
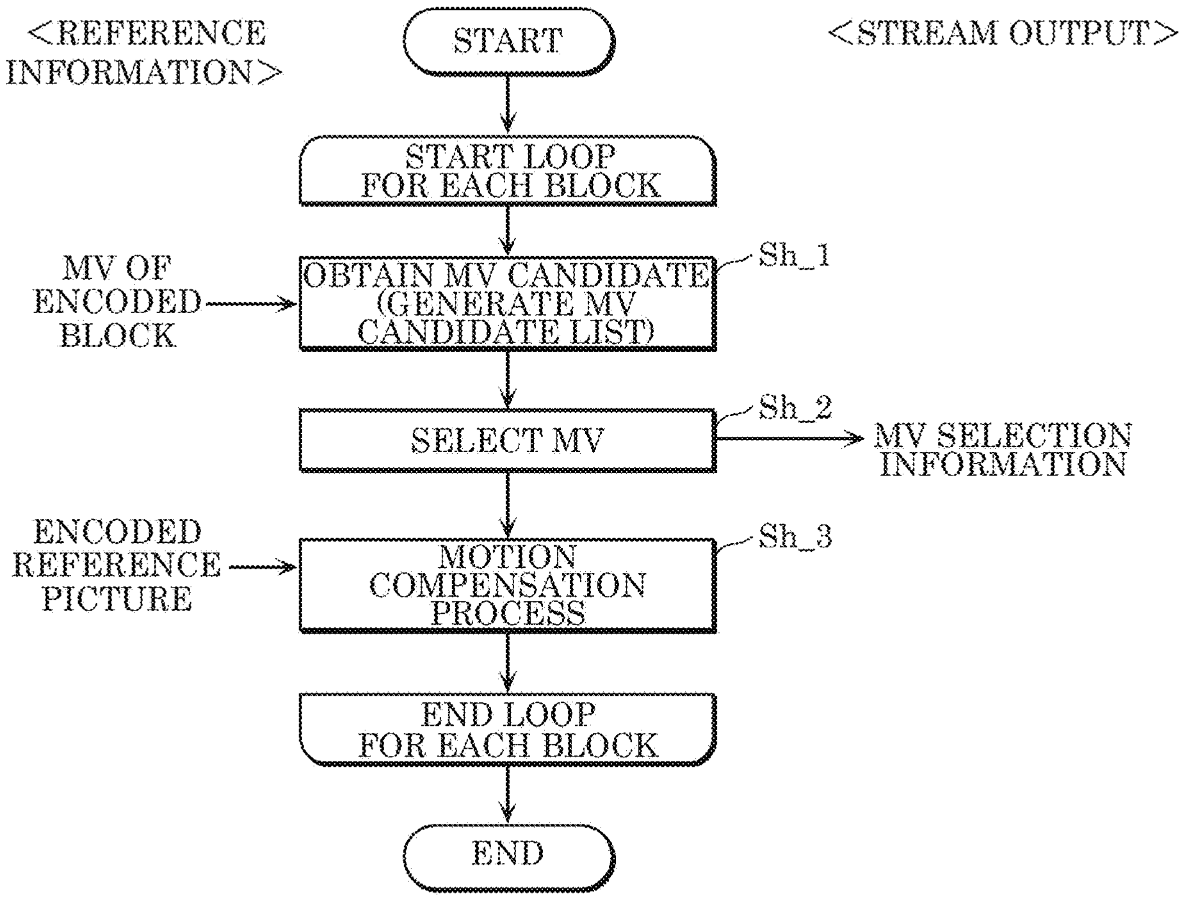
FIG. 20 is a flow chart illustrating an example of inter prediction in merge mode.

FIG. 20 is a flow chart illustrating an example of inter prediction in merge mode.

First, inter predictor 126 obtains a plurality of MV candidates for a current block based on information such as MVs of a plurality of encoded blocks temporally or spatially surrounding the current block (Step Sh_1). In other words, inter predictor 126 generates an MV candidate list.

Next, inter predictor 126 selects one MV candidate from the plurality of MV candidates obtained in Step Sh_1, thereby deriving an MV of the current block (Step Sh_2). At this time, inter predictor 126 encodes, in a stream, MV selection information for identifying the selected MV candidate.

Lastly, inter predictor 126 generates a prediction image for the current block by performing motion compensation of the current block using the derived MV and the encoded reference picture (Step Sh_3).

In addition, information indicating the inter prediction mode (merge mode in the above example) used to generate the prediction image and included in the encoded signal is, for example, encoded as a prediction parameter.

Figure 21:
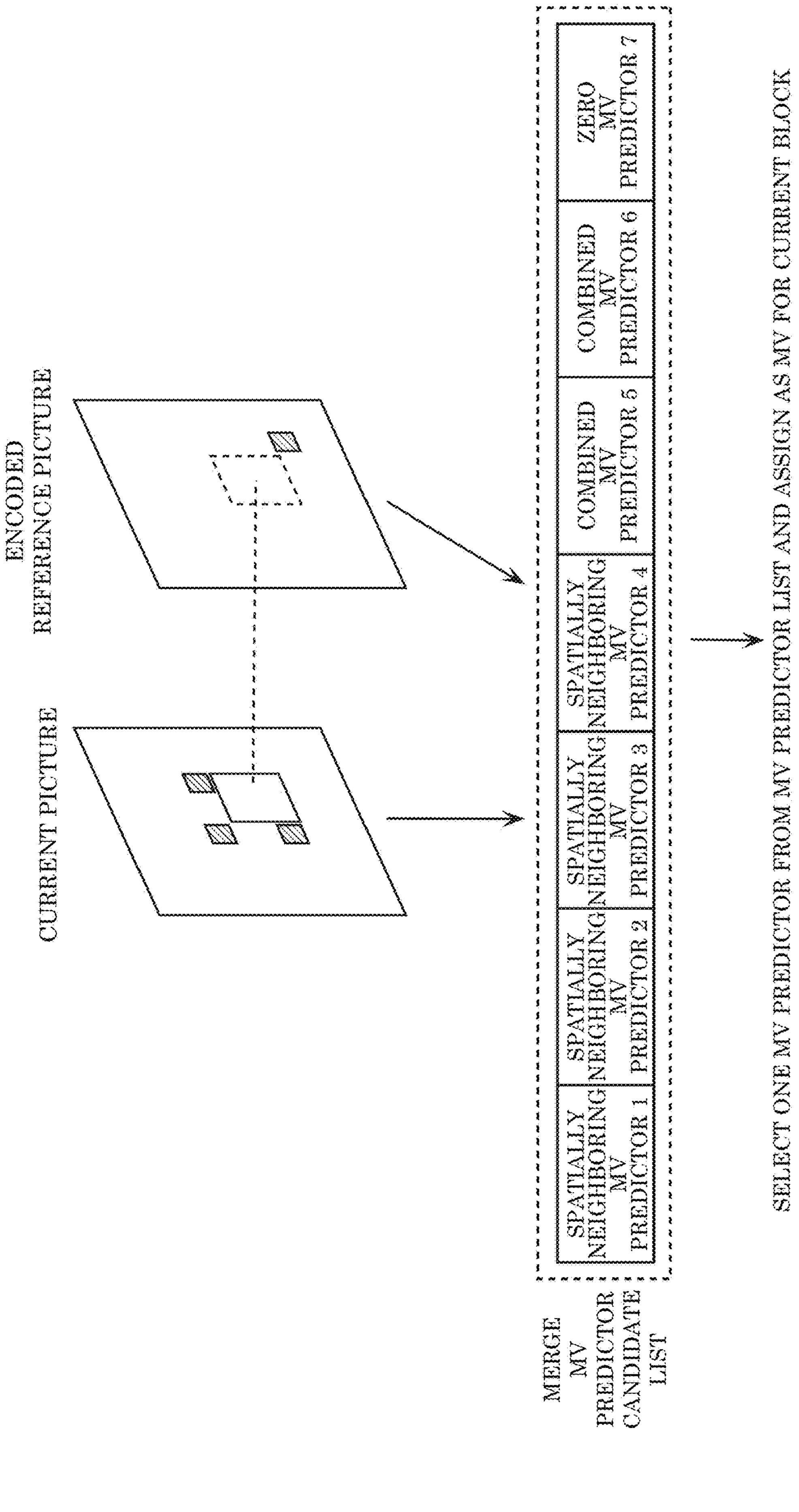
FIG. 21 is a conceptual diagram for illustrating one example of a motion vector derivation process in merge mode.

FIG. 21 is a conceptual diagram for illustrating one example of a motion vector derivation process of a current picture in merge mode.

First, an MV candidate list in which MV predictor candidates are registered is generated. Examples of MV predictor candidates include: spatially neighboring MV predictors which are MVs of a plurality of encoded blocks located spatially surrounding a current block; temporally neighboring MV predictors which are MVs of surrounding blocks on which the position of a current block in an encoded reference picture is projected; combined MV predictors which are MVs generated by combining the MV value of a spatially neighboring MV predictor and the MV of a temporally neighboring MV predictor; and a zero MV predictor which is an MV having a zero value.

Next, one MV predictor is selected from a plurality of MV predictors registered in an MV predictor list, and the selected MV predictor is determined as the MV of a current block.

Furthermore, the variable length encoder describes and encodes, in a stream, merge_idx which is a signal indicating which MV predictor has been selected.

It is to be noted that the MV predictors registered in the MV predictor list described in FIG. 21 are examples. The number of MV predictors may be different from the number of MV predictors in the diagram, the MV predictor list may be configured in such a manner that some of the kinds of the MV predictors in the diagram may not be included, or that one or more MV predictors other than the kinds of MV predictors in the diagram are included.

A final MV may be determined by performing a decoder motion vector refinement process (DMVR) to be described later using the MV of the current block derived in merge mode.

It is to be noted that the MV predictor candidates are MV candidates described above, and the MV predictor list is the MV candidate list described above. It is to be noted that the MV candidate list may be referred to as a candidate list. In addition, merge_idx is MV selection information.

[MV Derivation>FRUC Mode]

Motion information may be derived at the decoder side without being signaled from the encoder side. It is to be noted that, as described above, the merge mode defined in the H.265/HEVC standard may be used. In addition, for example, motion information may be derived by performing motion estimation at the decoder side. In an embodiment, at the decoder side, motion estimation is performed without using any pixel value in a current block.

Here, a mode for performing motion estimation at the decoder side is described. The mode for performing motion estimation at the decoder side may be referred to as a pattern matched motion vector derivation (PMMVD) mode, or a frame rate up-conversion (FRUC) mode.

Figure 22:
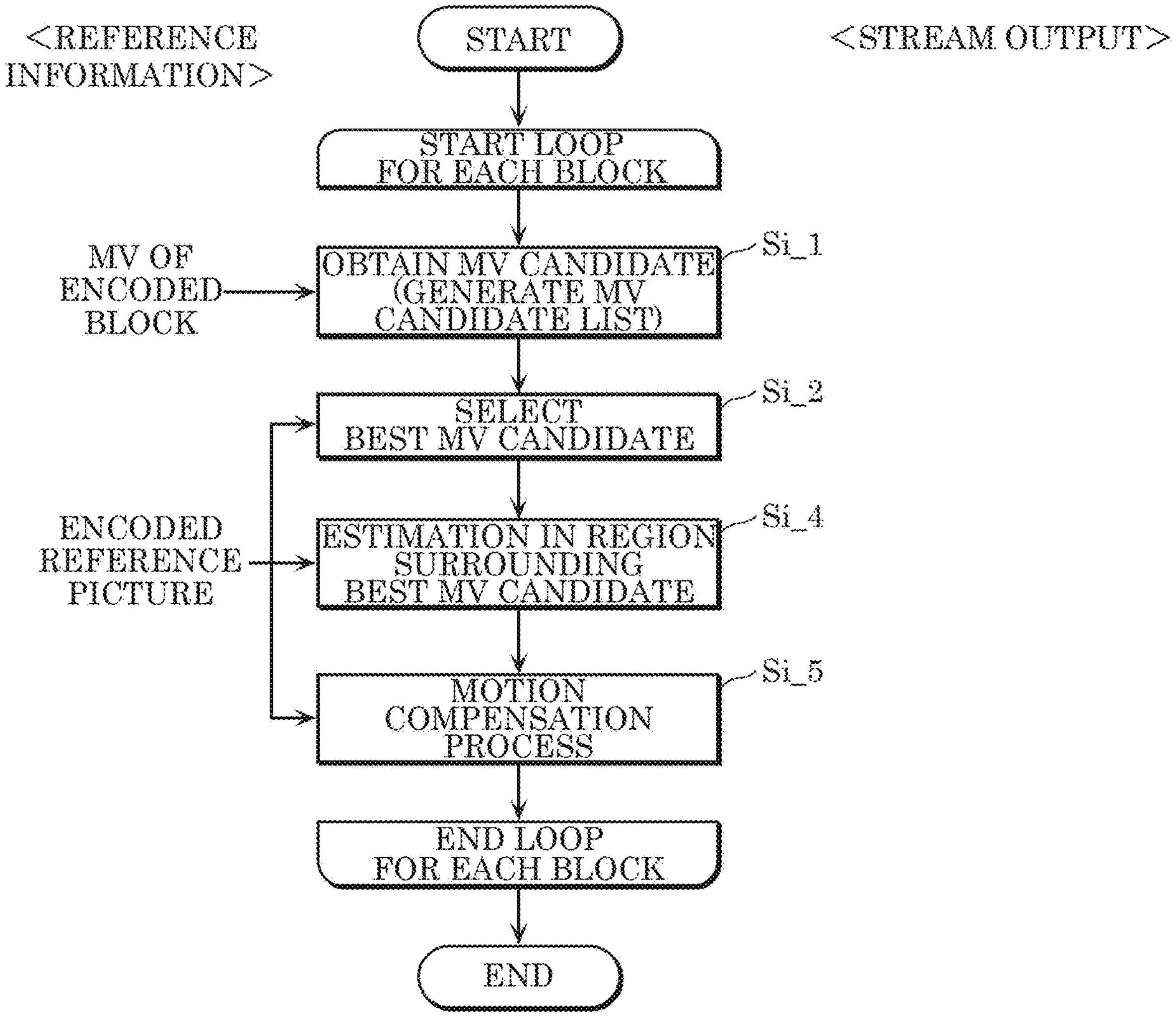
FIG. 22 is a flow chart illustrating one example of frame rate up conversion (FRUC) process.

One example of a FRUC process in the form of a flow chart is illustrated in FIG. 22. First, a list of a plurality of candidates each having a motion vector (MV) predictor (that is, an MV candidate list that may be also used as a merge list) is generated by referring to a motion vector in an encoded block which spatially or temporally neighbors a current block (Step Si_1). Next, a best MV candidate is selected from the plurality of MV candidates registered in the MV candidate list (Step Si_2). For example, the evaluation values of the respective MV candidates included in the MV candidate list are calculated, and one MV candidate is selected based on the evaluation values. Based on the selected motion vector candidates, a motion vector for the current block is then derived (Step Si_4). More specifically, for example, the selected motion vector candidate (best MV candidate) is derived directly as the motion vector for the current block. In addition, for example, the motion vector for the current block may be derived using pattern matching in a surrounding region of a position in a reference picture where the position in the reference picture corresponds to the selected motion vector candidate. In other words, estimation using the pattern matching and the evaluation values may be performed in the surrounding region of the best MV candidate, and when there is an MV that yields a better evaluation value, the best MV candidate may be updated to the MV that yields the better evaluation value, and the updated MV may be determined as the final MV for the current block. A configuration in which no such a process for updating the best MV candidate to the MV having a better evaluation value is performed is also possible.

Lastly, inter predictor 126 generates a prediction image for the current block by performing motion compensation of the current block using the derived MV and the encoded reference picture (Step Si_5).

A similar process may be performed in units of a sub-block.

Evaluation values may be calculated according to various kinds of methods. For example, a comparison is made between a reconstructed image in a region in a reference picture corresponding to a motion vector and a reconstructed image in a determined region (the region may be, for example, a region in another reference picture or a region in a neighboring block of a current picture, as indicated below). The determined region may be predetermined.

The difference between the pixel values of the two reconstructed images may be used for an evaluation value of the motion vectors. It is to be noted that an evaluation value may be calculated using information other than the value of the difference.

Next, an example of pattern matching is described in detail. First, one MV candidate included in an MV candidate list (for example, a merge list) is selected as a start point of estimation by the pattern matching. For example, as the pattern matching, either a first pattern matching or a second pattern matching may be used. The first pattern matching and the second pattern matching are also referred to as bilateral matching and template matching, respectively.

[MV Derivation>FRUC>Bilateral Matching]

In the first pattern matching, pattern matching is performed between two blocks along a motion trajectory of a current block which are two blocks in different two reference pictures. Accordingly, in the first pattern matching, a region in another reference picture along the motion trajectory of the current block is used as a determined region for calculating the evaluation value of the above-described candidate. The determined region may be predetermined.

Figure 23:
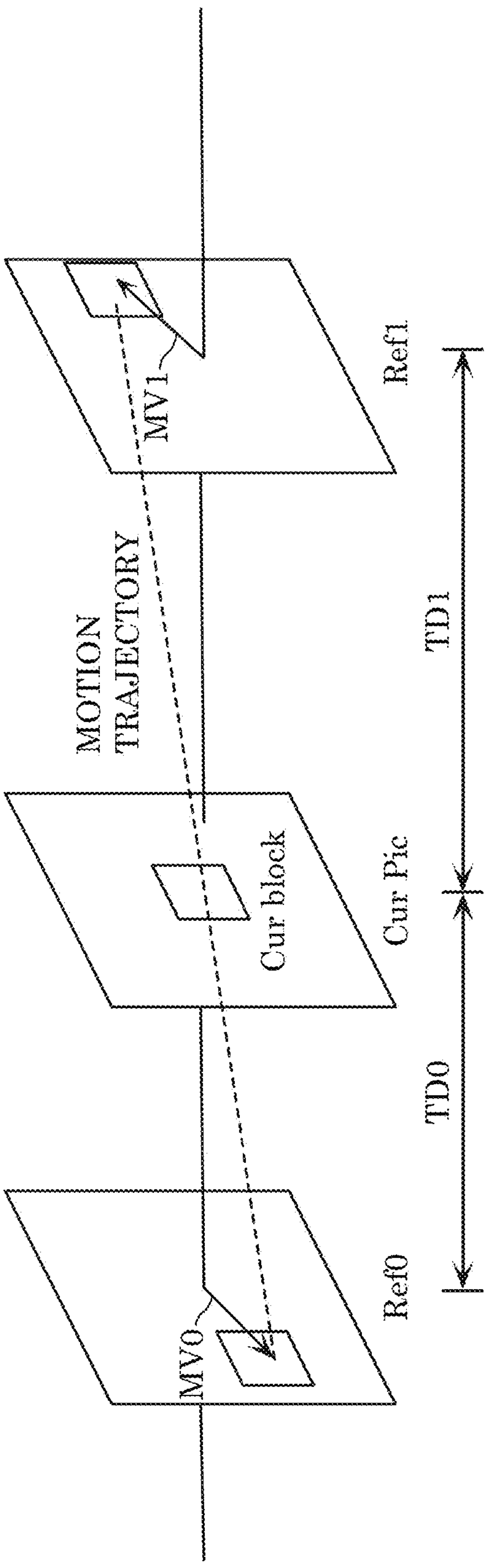
FIG. 23 is a conceptual diagram for illustrating one example of pattern matching (bilateral matching) between two blocks along a motion trajectory.

FIG. 23 is a conceptual diagram for illustrating one example of the first pattern matching (bilateral matching) between the two blocks in the two reference pictures along the motion trajectory. As illustrated in FIG. 23, in the first pattern matching, two motion vectors (MV0, MV1) are derived by estimating a pair which best matches among pairs in the two blocks in the two different reference pictures (Ref0, Ref1) which are the two blocks along the motion trajectory of the current block (Cur block). More specifically, a difference between the reconstructed image at a specified location in the first encoded reference picture (Ref0) specified by an MV candidate and the reconstructed image at a specified location in the second encoded reference picture (Ref1) specified by a symmetrical MV obtained by scaling the MV candidate at a display time interval is derived for the current block, and an evaluation value is calculated using the value of the obtained difference. It is possible to select, as the final MV, the MV candidate which yields the best evaluation value among the plurality of MV candidates, and which is likely to produce good results.

In the assumption of a continuous motion trajectory, the motion vectors (MV0, MV1) specifying the two reference blocks are proportional to temporal distances (TD0, TD1) between the current picture (Cur Pic) and the two reference pictures (Ref0, Ref1). For example, when the current picture is temporally located between the two reference pictures and the temporal distances from the current picture to the respective two reference pictures are equal to each other, mirror-symmetrical bi-directional motion vectors are derived in the first pattern matching.

[MV Derivation>FRUC>Template Matching]

In the second pattern matching (template matching), pattern matching is performed between a block in a reference picture and a template in the current picture (the template is a block neighboring the current block in the current picture (the neighboring block is, for example, an upper and/or left neighboring block(s))). Accordingly, in the second pattern matching, the block neighboring the current block in the current picture is used as the determined region for calculating the evaluation value of the above-described candidate.

Figure 24:
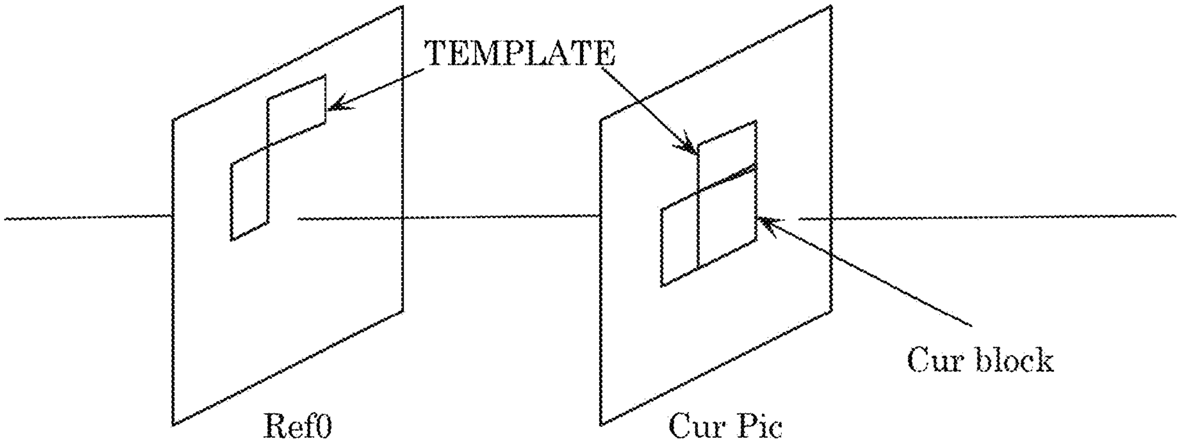
FIG. 24 is a conceptual diagram for illustrating one example of pattern matching (template matching) between a template in a current picture and a block in a reference picture.

FIG. 24 is a conceptual diagram for illustrating one example of pattern matching (template matching) between a template in a current picture and a block in a reference picture. As illustrated in FIG. 24, in the second pattern matching, the motion vector of the current block (Cur block) is derived by estimating, in the reference picture (Ref0), the block which best matches the block neighboring the current block in the current picture (Cur Pic). More specifically, it is possible that the difference between a reconstructed image in an encoded region which neighbors both left and above or either left or above and a reconstructed image which is in a corresponding region in the encoded reference picture (Ref0) and is specified by an MV candidate is derived, an evaluation value is calculated using the value of the obtained difference, and the MV candidate which yields the best evaluation value among a plurality of MV candidates is selected as the best MV candidate.

Such information indicating whether to apply the FRUC mode (referred to as, for example, a FRUC flag) may be signaled at the CU level. In addition, when the FRUC mode is applied (for example, when a FRUC flag is true), information indicating an applicable pattern matching method (either the first pattern matching or the second pattern matching) may be signaled at the CU level. It is to be noted that the signaling of such information does not necessarily need to be performed at the CU level, and may be performed at another level (for example, at the sequence level, picture level, slice level, tile level, CTU level, or sub-block level).

[MV Derivation>Affine Mode]

Next, the affine mode for deriving a motion vector in units of a sub-block based on motion vectors of a plurality of neighboring blocks is described. This mode is also referred to as an affine motion compensation prediction mode.

Figure 25A:
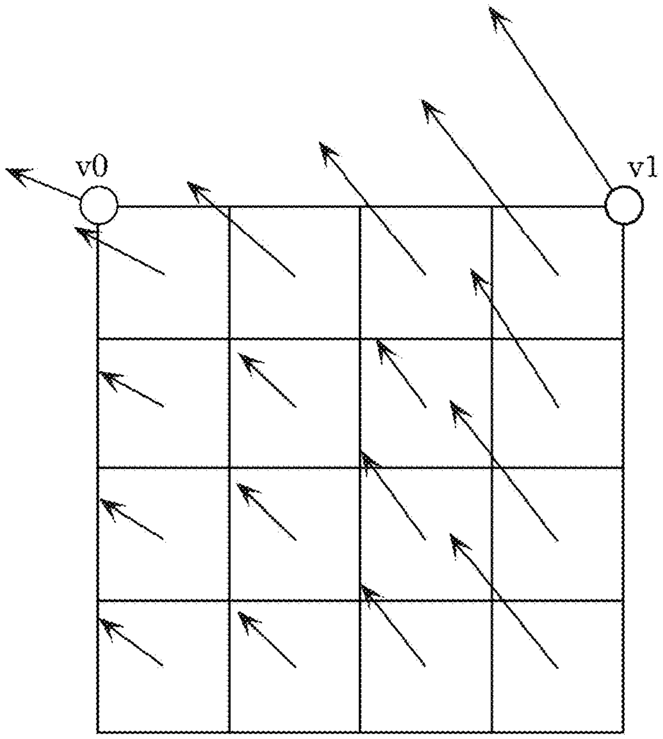
FIG. 25A is a conceptual diagram for illustrating one example of deriving a motion vector of each sub-block based on motion vectors of a plurality of neighboring blocks.

FIG. 25A is a conceptual diagram for illustrating one example of deriving a motion vector of each sub-block based on motion vectors of a plurality of neighboring blocks. In FIG. 25A, the current block includes sixteen 4×4 sub-blocks. Here, motion vector $V_0$ at an upper-left corner control point in the current block is derived based on a motion vector of a neighboring block, and likewise, motion vector $V_1$ at an upper-right corner control point in the current block is derived based on a motion vector of a neighboring sub-block. Two motion vectors $v_0$ and $v_1$ may be projected according to an expression (1A) indicated below, and motion vectors $(v_x, v_y)$ for the respective sub-blocks in the current block may be derived.

[Math. 1]

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x - \dfrac{(v_{1x} - v_{0x})}{w}y + v_{0y} \end{cases} \tag{1A}$$

Here, x and y indicate the horizontal position and the vertical position of the sub-block, respectively, and w indicates a determined weighting coefficient. The determined weighting coefficient may be predetermined.

Such information indicating the affine mode (for example, referred to as an affine flag) may be signaled at the CU level. It is to be noted that the signaling of the information indicating the affine mode does not necessarily need to be performed at the CU level, and may be performed at another level (for example, at the sequence level, picture level, slice level, tile level, CTU level, or sub-block level).

In addition, the affine mode may include several modes for different methods for deriving motion vectors at the upper-left and upper-right corner control points. For example, the affine mode include two modes which are the affine inter mode (also referred to as an affine normal inter mode) and the affine merge mode.

[MV Derivation>Affine Mode]

Figure 25B:
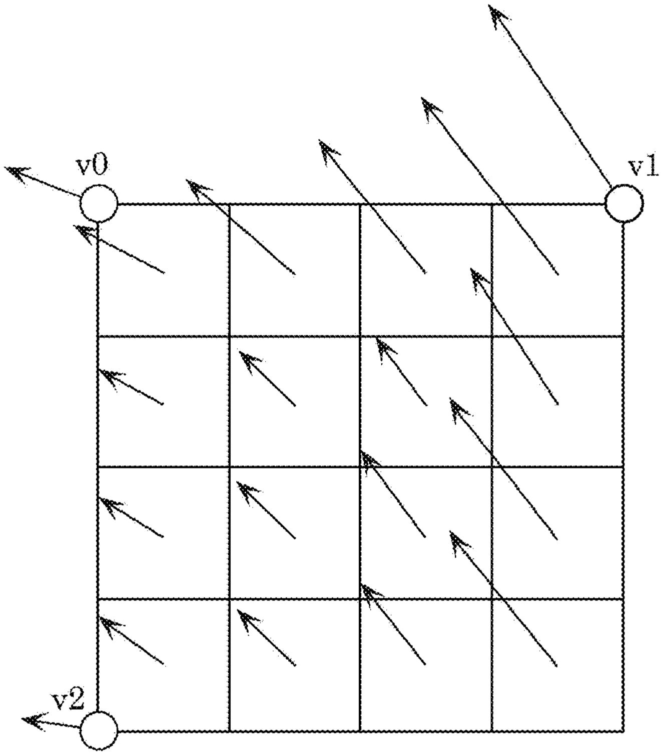
FIG. 25B is a conceptual diagram for illustrating one example of deriving a motion vector of each sub-block in affine mode in which three control points are used.

FIG. 25B is a conceptual diagram for illustrating one example of deriving a motion vector of each sub-block in affine mode in which three control points are used. In FIG. 25B, the current block includes sixteen 4×4 blocks. Here, motion vector $V_0$ at the upper-left corner control point for the current block is derived based on a motion vector of a neighboring block, and likewise, motion vector $V_1$ at the upper-right corner control point for the current block is derived based on a motion vector of a neighboring block, and motion vector $V_2$ at the lower-left corner control point for the current block is derived based on a motion vector of a neighboring block. Three motion vectors $v_0$, $v_1$, and $v_2$ may be projected according to an expression (1B) indicated below, and motion vectors $(v_x, v_y)$ for the respective sub-blocks in the current block may be derived.

[Math. 2]

$$\begin{cases} v_x = \dfrac{(v_{1x} - v_{0x})}{w}x - \dfrac{(v_{2x} - v_{0x})}{h}y + v_{0x} \\ v_y = \dfrac{(v_{1y} - v_{0y})}{w}x - \dfrac{(v_{2y} - v_{0y})}{h}y + v_{0y} \end{cases} \tag{1B}$$

Here, x and y indicate the horizontal position and the vertical position of the center of the sub-block, respectively, w indicates the width of the current block, and h indicates the height of the current block.

Affine modes in which different numbers of control points (for example, two and three control points) are used may be switched and signaled at the CU level. It is to be noted that information indicating the number of control points in affine mode used at the CU level may be signaled at another level (for example, the sequence level, picture level, slice level, tile level, CTU level, or sub-block level).

In addition, such an affine mode in which three control points are used may include different methods for deriving motion vectors at the upper-left, upper-right, and lower-left corner control points. For example, the affine modes include two modes which are the affine inter mode (also referred to as the affine normal inter mode) and the affine merge mode.

[MV Derivation>Affine Merge Mode]

Figure 26A:
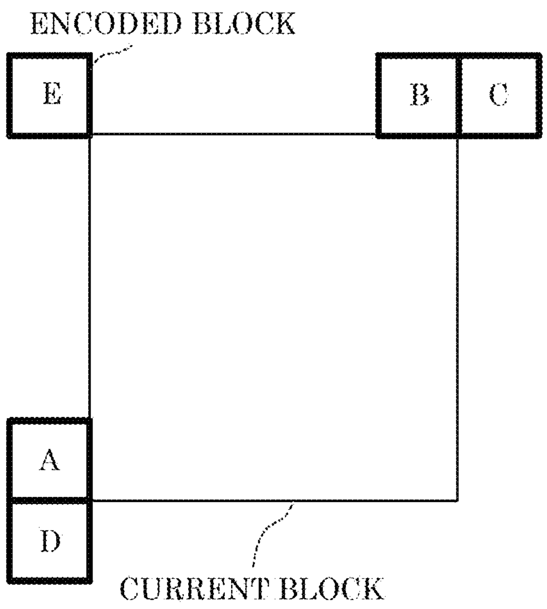
FIG. 26A is a conceptual diagram for illustrating an affine merge mode.
Figure 26B:
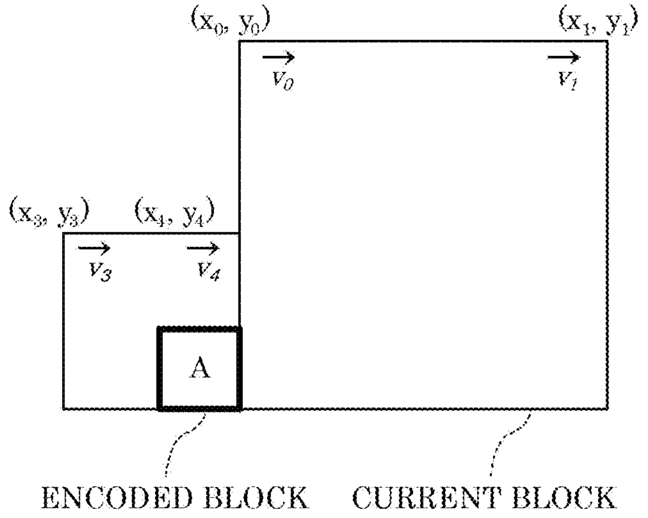
FIG. 26B is a conceptual diagram for illustrating an affine merge mode in which two control points are used.
Figure 26C:
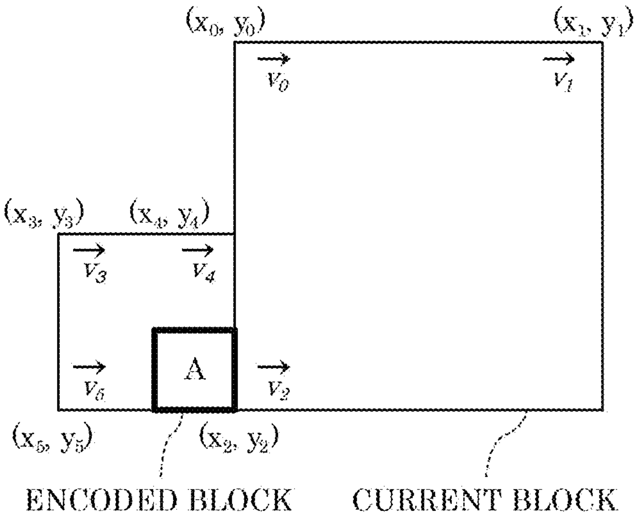
FIG. 26C is a conceptual diagram for illustrating an affine merge mode in which three control points are used.

FIG. 26A, FIG. 26B, and FIG. 26C are conceptual diagrams for illustrating the affine merge mode.

As illustrated in FIG. 26A, in the affine merge mode, for example, motion vector predictors at respective control points of a current block are calculated based on a plurality of motion vectors corresponding to blocks encoded according to the affine mode among encoded block A (left), block B (upper), block C (upper-right), block D (lower-left), and block E (upper-left) which neighbor the current block. More specifically, encoded block A (left), block B (upper), block C (upper-right), block D (lower-left), and block E (upper-left) are checked in the listed order, and the first effective block encoded according to the affine mode is identified. Motion vector predictors at the control points of the current block are calculated based on a plurality of motion vectors corresponding to the identified block.

For example, as illustrated in FIG. 26B, when block A which neighbors to the left of the current block has been encoded according to an affine mode in which two control points are used, motion vectors $v_3$ and $v_4$ projected at the upper-left corner position and the upper-right corner position of the encoded block including block A are derived. Motion vector predictor $v_0$ at the upper-left corner control point of the current block and motion vector predictor $v_1$ at the upper-right corner control point of the current block are then calculated from derived motion vectors $v_3$ and $v_4$.

For example, as illustrated in FIG. 26C, when block A which neighbors to the left of the current block has been encoded according to an affine mode in which three control points are used, motion vectors $v_3$, $v_4$, and $v_5$ projected at the upper-left corner position, the upper-right corner position, and the lower-left corner position of the encoded block including block A are derived. Motion vector predictor $v_0$ at the upper-left corner control point of the current block, motion vector predictor $v_1$ at the upper-right corner control point of the current block, and motion vector predictor $v_2$ at the lower-left corner control point of the current block are then calculated from derived motion vectors $v_3$, $v_4$, and $v_5$.

It is to be noted that this method for deriving motion vector predictors may be used to derive motion vector predictors of the respective control points of the current block in Step Sj_1 in FIG. 29 described later.

Figure 27:
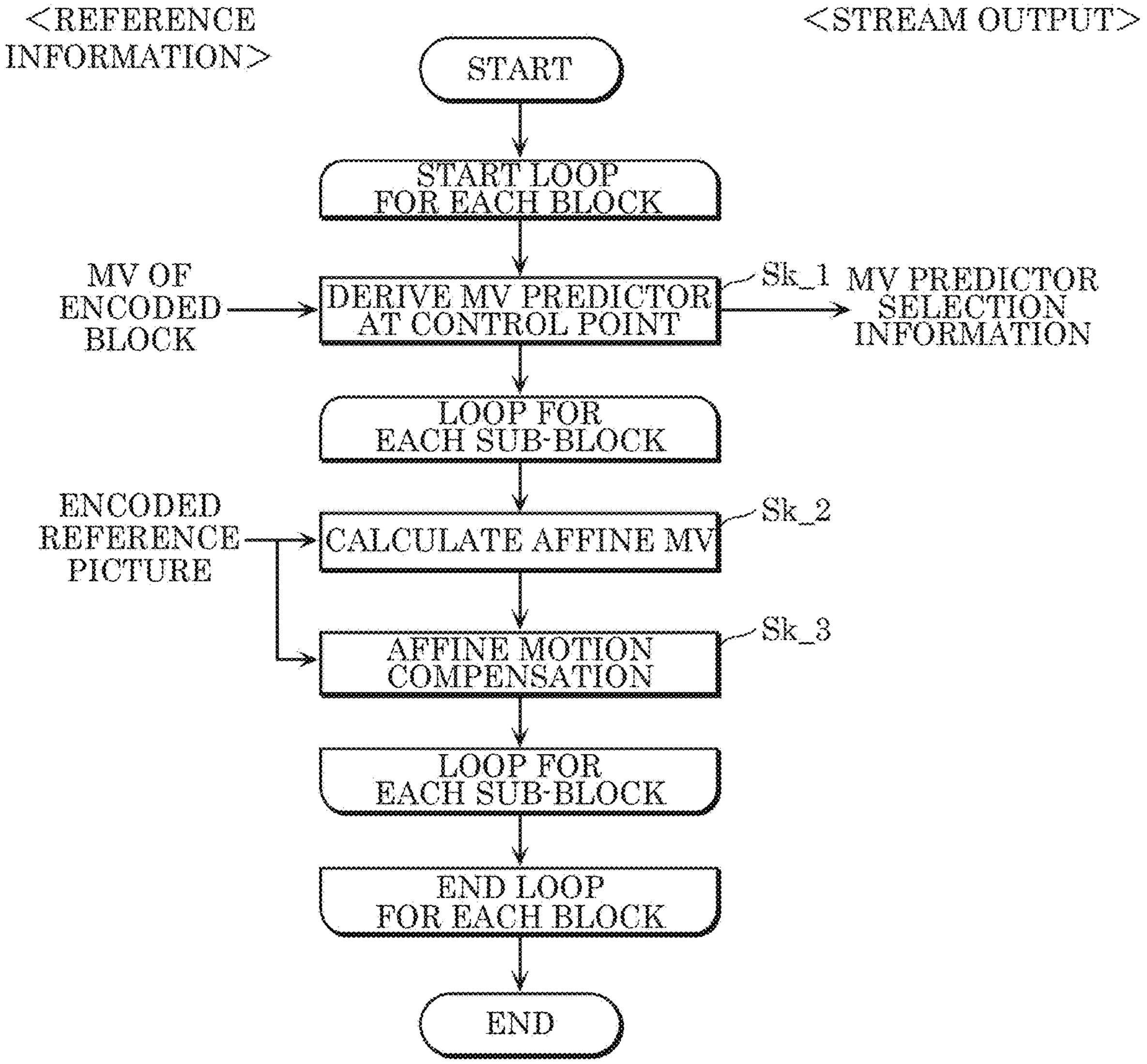
FIG. 27 is a flow chart illustrating one example of a process in affine merge mode.

FIG. 27 is a flow chart illustrating one example of the affine merge mode.

In affine merge mode as illustrated, first, inter predictor 126 derives MV predictors of respective control points of a current block (Step Sk_1). The control points are an upper-left corner point of the current block and an upper-right corner point of the current block as illustrated in FIG. 25A, or an upper-left corner point of the current block, an upper-right corner point of the current block, and a lower-left corner point of the current block as illustrated in FIG. 25B.

In other words, as illustrated in FIG. 26A, inter predictor 126 checks encoded block A (left), block B (upper), block C (upper-right), block D (lower-left), and block E (upper-left) in the listed order, and identifies the first effective block encoded according to the affine mode.

When block A is identified and block A has two control points, as illustrated in FIG. 26B, inter predictor 126 calculates motion vector $v_0$ at the upper-left corner control point of the current block and motion vector $v_1$ at the upper-right corner control point of the current block from motion vectors $v_3$ and $v_4$ at the upper-left corner and the upper-right corner of the encoded block including block A. For example, inter predictor 126 calculates motion vector $v_0$ at the upper-left corner control point of the current block and motion vector $v_1$ at the upper-right corner control point of the current block by projecting motion vectors $v_3$ and $v_4$ at the upper-left corner and the upper-right corner of the encoded block onto the current block.

Alternatively, when block A is identified and block A has three control points, as illustrated in FIG. 26C, inter predictor 126 calculates motion vector $v_0$ at the upper-left corner control point of the current block, motion vector $v_1$ at the upper-right corner control point of the current block, and motion vector $v_2$ at the lower-left corner control point of the current block from motion vectors $v_3$, $v_4$, and $v_5$ at the upper-left corner, the upper-right corner, and the lower-left corner of the encoded block including block A. For example, inter predictor 126 calculates motion vector $v_0$ at the upper-left corner control point of the current block, motion vector $v_1$ at the upper-right corner control point of the current block, and motion vector $v_2$ at the lower-left corner control point of the current block by projecting motion vectors $v_3$, $v_4$, and $v_5$ at the upper-left corner, the upper-right corner, and the lower-left corner of the encoded block onto the current block.

Next, inter predictor 126 performs motion compensation of each of a plurality of sub-blocks included in the current block. In other words, inter predictor 126 calculates, for each of the plurality of sub-blocks, a motion vector of the sub-block as an affine MV, by using either (i) two motion vector predictors $v_0$ and $v_1$ and the expression (1A) described above or (ii) three motion vector predictors $v_0$, $v_1$, and $v_2$ and the expression (1B) described above (Step Sk_2). Inter predictor 126 then performs motion compensation of the sub-blocks using these affine MVs and encoded reference pictures (Step Sk_3). As a result, motion compensation of the current block is performed to generate a prediction image of the current block.

[MV Derivation>Affine Inter Mode]

Figure 28A:
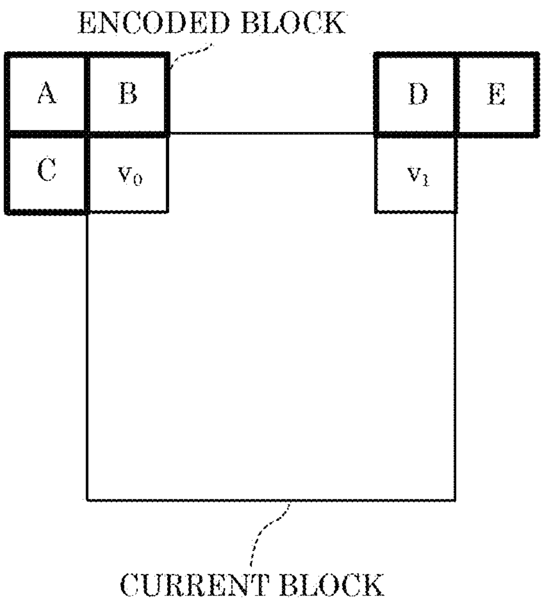
FIG. 28A is a conceptual diagram for illustrating an affine inter mode in which two control points are used.

FIG. 28A is a conceptual diagram for illustrating an affine inter mode in which two control points are used.

In the affine inter mode, as illustrated in FIG. 28A, a motion vector selected from motion vectors of encoded block A, block B, and block C which neighbor the current block is used as motion vector predictor $v_0$ at the upper-left corner control point of the current block. Likewise, a motion vector selected from motion vectors of encoded block D and block E which neighbor the current block is used as motion vector predictor $v_1$ at the upper-right corner control point of the current block.

Figure 28B:
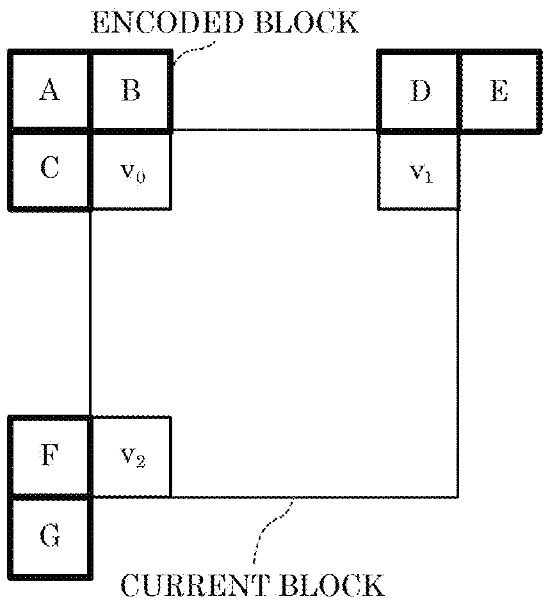
FIG. 28B is a conceptual diagram for illustrating an affine inter mode in which three control points are used.

FIG. 28B is a conceptual diagram for illustrating an affine inter mode in which three control points are used.

In the affine inter mode, as illustrated in FIG. 28B, a motion vector selected from motion vectors of encoded block A, block B, and block C which neighbor the current block is used as motion vector predictor $v_0$ at the upper-left corner control point of the current block. Likewise, a motion vector selected from motion vectors of encoded block D and block E which neighbor the current block is used as motion vector predictor $v_1$ at the upper-right corner control point of the current block. Furthermore, a motion vector selected from motion vectors of encoded block F and block G which neighbor the current block is used as motion vector predictor $v_2$ at the lower-left corner control point of the current block.

Figure 29:
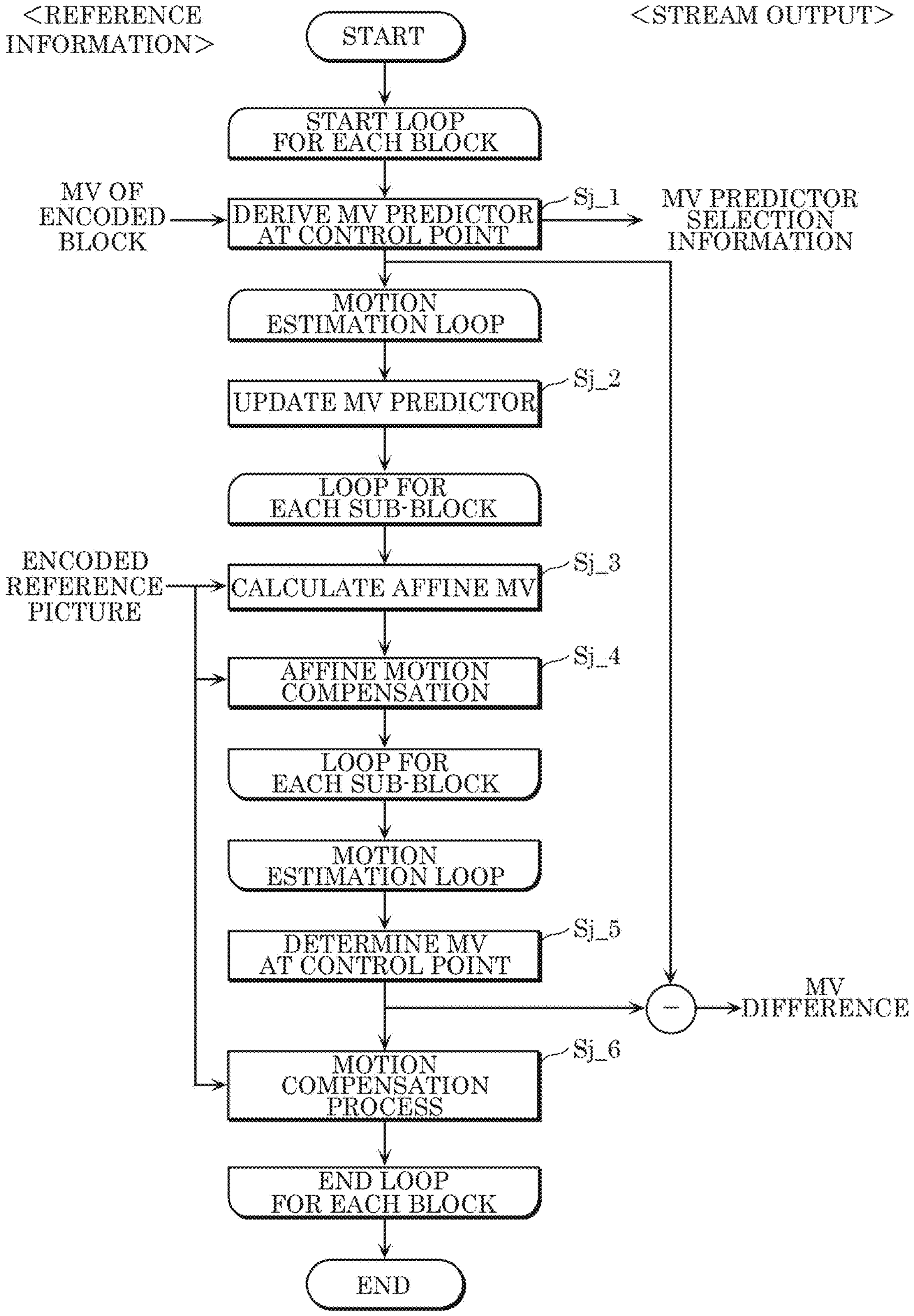
FIG. 29 is a flow chart illustrating one example of a process in affine inter mode.

FIG. 29 is a flow chart illustrating one example of an affine inter mode.

In the affine inter mode as illustrated, first, inter predictor 126 derives MV predictors ($v_0$, $v_1$) or ($v_0$, $v_1$, $v_2$) of respective two or three control points of a current block (Step Sj_1). The control points are an upper-left corner point of the current block and an upper-right corner point of the current block as illustrated in FIG. 25A, or an upper-left corner point of the current block, an upper-right corner point of the current block, and a lower-left corner point of the current block as illustrated in FIG. 25B.

In other words, inter predictor 126 derives the motion vector predictors ($v_0$, $v_1$) or ($v_0$, $v_1$, $v_2$) of respective two or three control points of the current block by selecting motion vectors of any of the blocks among encoded blocks in the vicinity of the respective control points of the current block illustrated in either FIG. 28A or FIG. 28B. At this time, inter predictor 126 encodes, in a stream, motion vector predictor selection information for identifying the selected two motion vectors.

For example, inter predictor 126 may determine, using a cost evaluation or the like, the block from which a motion vector as a motion vector predictor at a control point is selected from among encoded blocks neighboring the current block, and may describe, in a bitstream, a flag indicating which motion vector predictor has been selected.

Next, inter predictor 126 performs motion estimation (Step Sj_3 and Sj_4) while updating a motion vector predictor selected or derived in Step Sj_1 (Step Sj_2). In other words, inter predictor 126 calculates, as an affine MV, a motion vector of each of sub-blocks which corresponds to an updated motion vector predictor, using either the expression (1A) or expression (1B) described above (Step Sj_3). Inter predictor 126 then performs motion compensation of the sub-blocks using these affine MVs and encoded reference pictures (Step Sj_4). As a result, for example, inter predictor 126 determines the motion vector predictor which yields the smallest cost as the motion vector at a control point in a motion estimation loop (Step Sj_5). At this time, inter predictor 126 further encodes, in the stream, the difference value between the determined MV and the motion vector predictor as an MV difference.

Lastly, inter predictor 126 generates a prediction image for the current block by performing motion compensation of the current block using the determined MV and the encoded reference picture (Step Sj_6).

[MV Derivation>Affine Inter Mode]

Figure 30A:
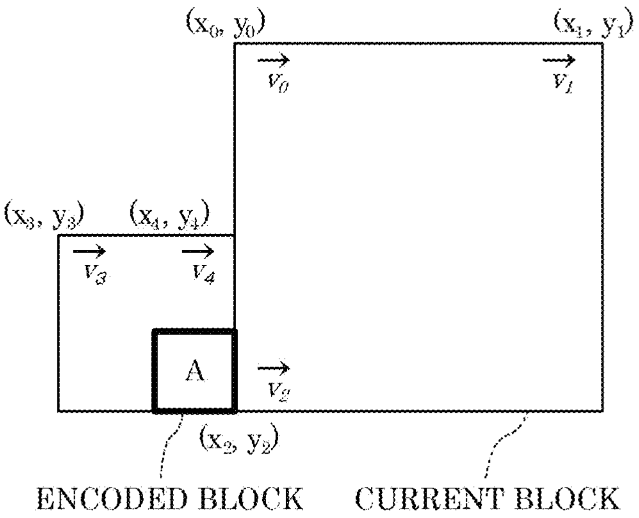
FIG. 30A is a conceptual diagram for illustrating an affine inter mode in which a current block has three control points and a neighboring block has two control points.
Figure 30B:
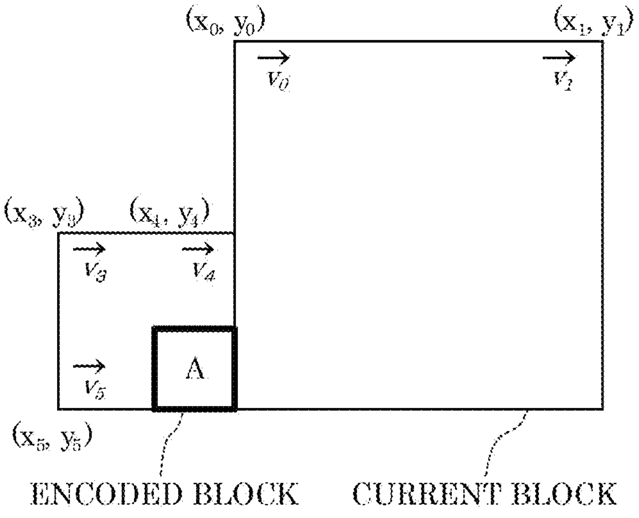
FIG. 30B is a conceptual diagram for illustrating an affine inter mode in which a current block has two control points and a neighboring block has three control points.

When affine modes in which different numbers of control points (for example, two and three control points) are used may be switched and signaled at the CU level, the number of control points in an encoded block and the number of control points in a current block may be different from each other. FIG. 30A and FIG. 30B are conceptual diagrams for illustrating methods for deriving motion vector predictors at control points when the number of control points in an encoded block and the number of control points in a current block are different from each other.

For example, as illustrated in FIG. 30A, when a current block has three control points at the upper-left corner, the upper-right corner, and the lower-left corner, and block A which neighbors to the left of the current block has been encoded according to an affine mode in which two control points are used, motion vectors $v_3$ and $v_4$ projected at the upper-left corner position and the upper-right corner position in the encoded block including block A are derived. Motion vector predictor $v_0$ at the upper-left corner control point of the current block and motion vector predictor $v_1$ at the upper-right corner control point of the current block are then calculated from derived motion vectors $v_3$ and $v_4$. Furthermore, motion vector predictor $v_2$ at the lower-left corner control point is calculated from derived motion vectors $v_0$ and $v_1$.

For example, as illustrated in FIG. 30B, when a current block has two control points at the upper-left corner and the upper-right corner, and block A which neighbors to the left of the current block has been encoded according to the affine mode in which three control points are used, motion vectors $v_3$, $v_4$, and $v_5$ projected at the upper-left corner position, the upper-right corner position, and the lower-left corner position in the encoded block including block A are derived. Motion vector predictor $v_0$ at the upper-left corner control point of the current block and motion vector predictor $v_1$ at the upper-right corner control point of the current block are then calculated from derived motion vectors $v_3$, $v_4$, and $V_5$.

It is to be noted that this method for deriving motion vector predictors may be used to derive motion vector predictors of the respective control points of the current block in Step Sj_1 in FIG. 29.

[MV Derivation>DMVR]

Figure 31A:
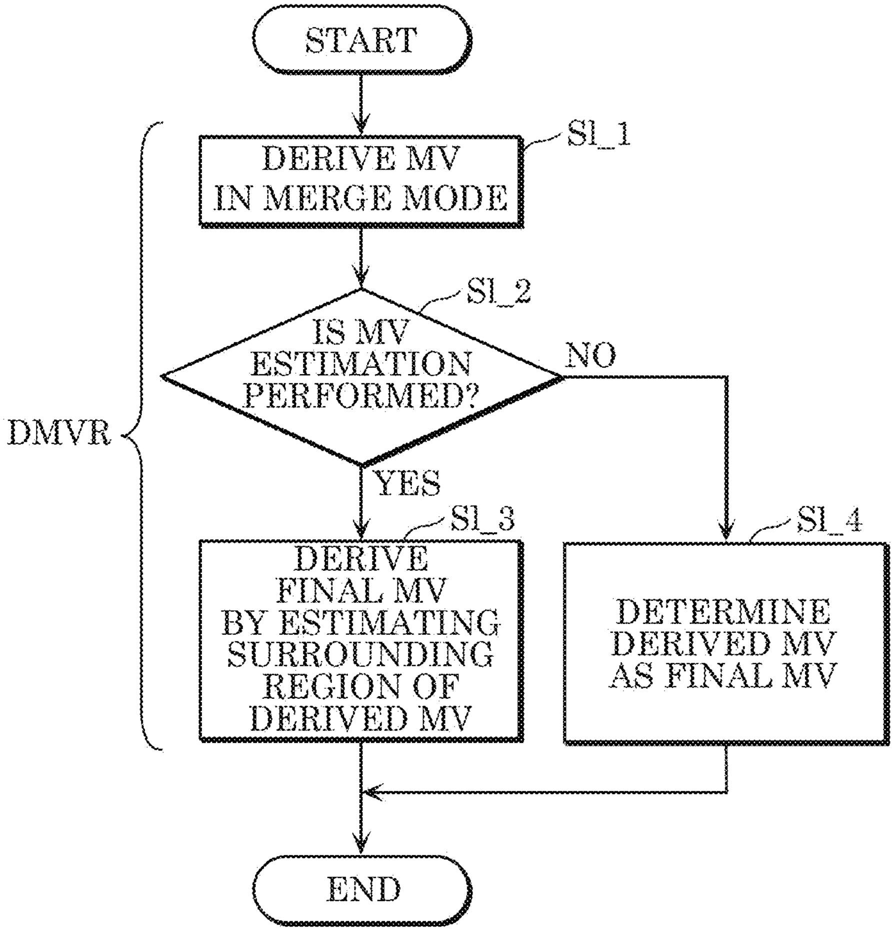
FIG. 31A is a flow chart illustrating a merge mode process including decoder motion vector refinement (DMVR)

FIG. 31A is a flow chart illustrating a relationship between the merge mode and DMVR.

Inter predictor 126 derives a motion vector of a current block according to the merge mode (Step Sl_1). Next, inter predictor 126 determines whether to perform estimation of a motion vector, that is, motion estimation (Step Sl_2). Here, when determining not to perform motion estimation (No in Step Sl_2), inter predictor 126 determines the motion vector derived in Step Sl_1 as the final motion vector for the current block (Step Sl_4). In other words, in this case, the motion vector of the current block is determined according to the merge mode.

When determining to perform motion estimation in Step Sl_1 (Yes in Step Sl_2), inter predictor 126 derives the final motion vector for the current block by estimating a surrounding region of the reference picture specified by the motion vector derived in Step Sl_1 (Step Sl_3). In other words, in this case, the motion vector of the current block is determined according to the DMVR.

Figure 31B:
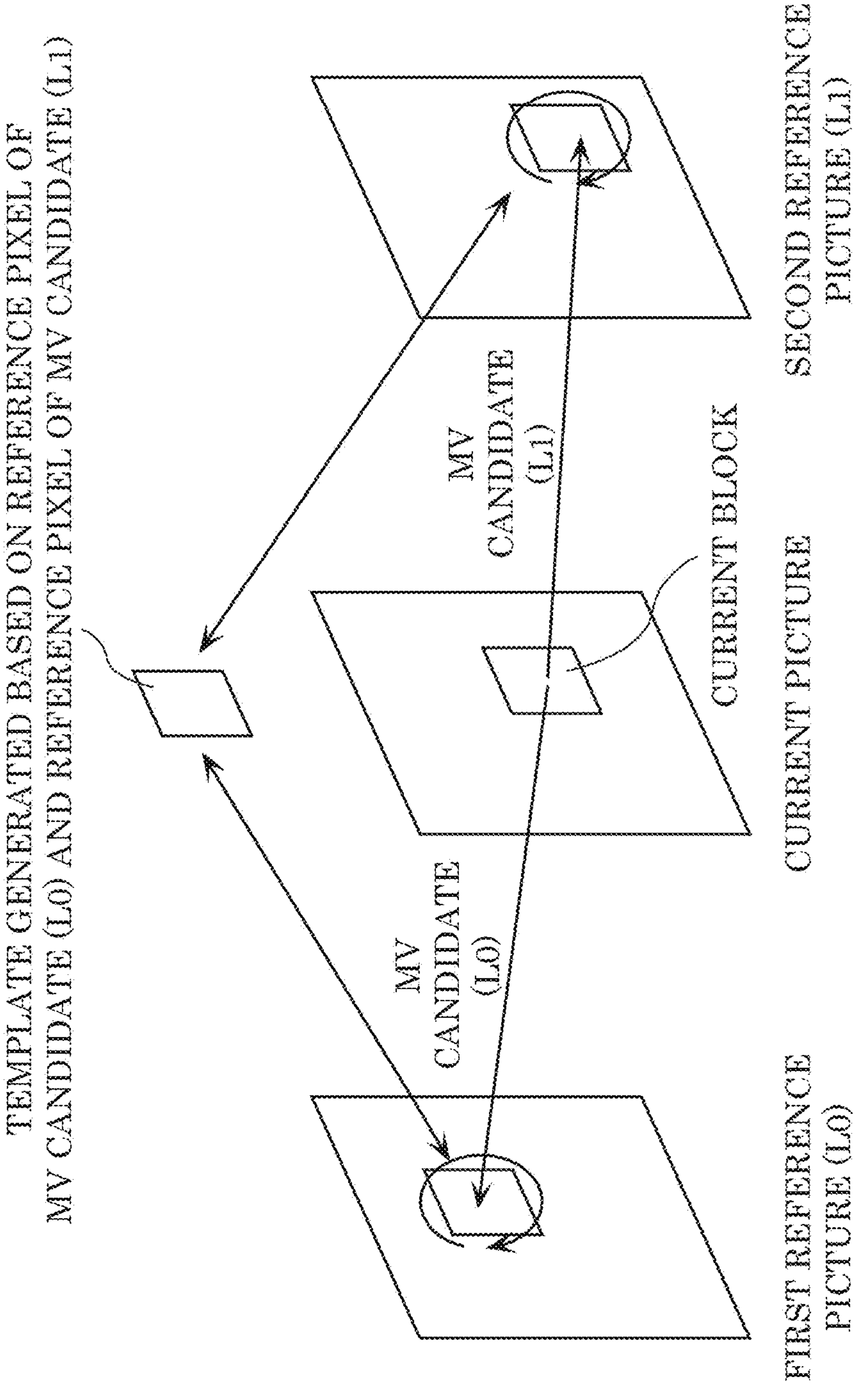
FIG. 31B is a conceptual diagram for illustrating one example of a DMVR process.

FIG. 31B is a conceptual diagram for illustrating one example of a DMVR process for determining an MV.

First, (for example, in merge mode) the best MVP which has been set to the current block is determined to be an MV candidate. A reference pixel is identified from a first reference picture (L0) which is an encoded picture in the L0 direction according to an MV candidate (L0). Likewise, a reference pixel is identified from a second reference picture (L1) which is an encoded picture in the L1 direction according to an MV candidate (L1). A template is generated by calculating an average of these reference pixels.

Next, each of the surrounding regions of MV candidates of the first reference picture (L0) and the second reference picture (L1) are estimated, and the MV which yields the smallest cost is determined to be the final MV. It is to be noted that the cost value may be calculated, for example, using a difference value between each of the pixel values in the template and a corresponding one of the pixel values in the estimation region, the values of MV candidates, etc.

It is to be noted that the processes, configurations, and operations described here typically are basically common between the encoder and a decoder to be described later.

Exactly the same example processes described here do not always need to be performed. Any process for enabling derivation of the final MV by estimation in surrounding regions of MV candidates may be used.

[Motion Compensation>BIO/OBMC]

Motion compensation involves a mode for generating a prediction image, and correcting the prediction image. The mode is, for example, BIO and OBMC to be described later.

Figure 32:
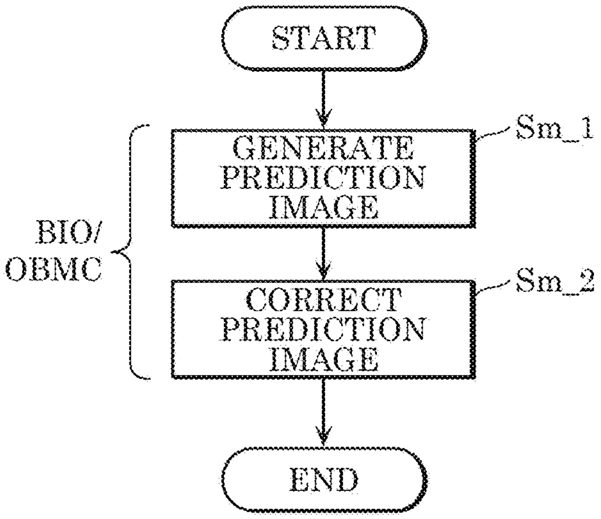
FIG. 32 is a flow chart illustrating one example of generation of a prediction image.

FIG. 32 is a flow chart illustrating one example of generation of a prediction image.

Inter predictor 126 generates a prediction image (Step Sm_1), and corrects the prediction image, for example, according to any of the modes described above (Step Sm_2).

Figure 33:
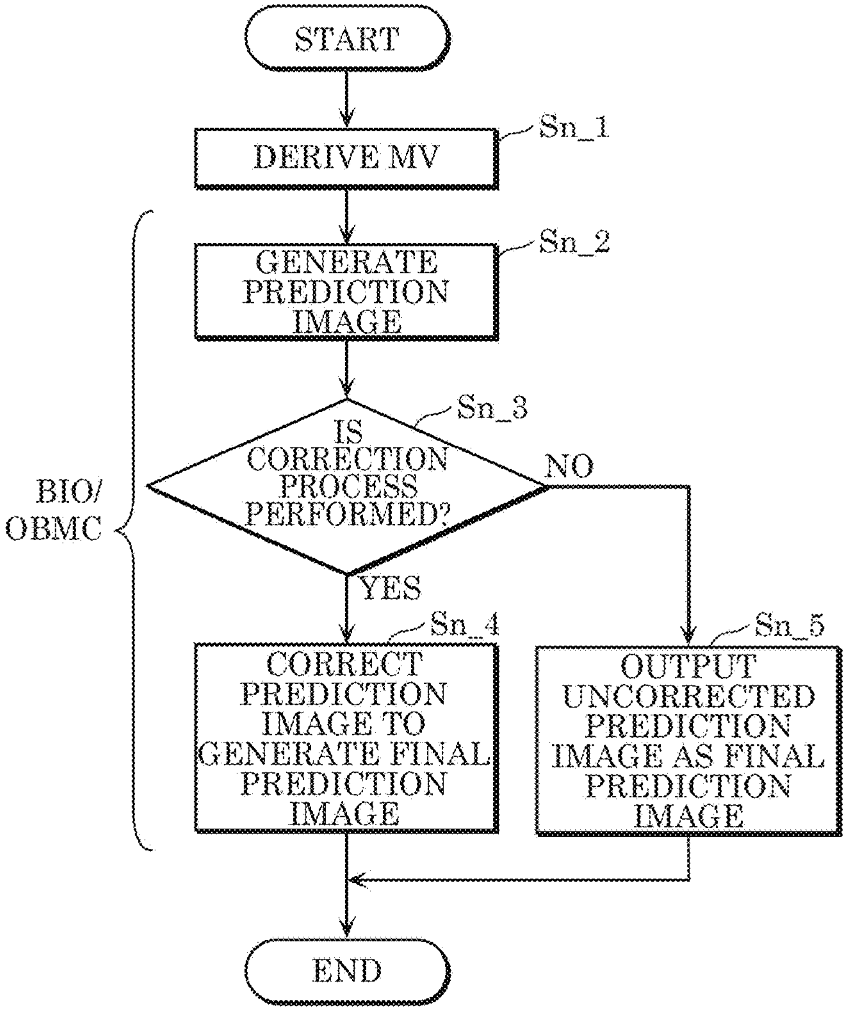
FIG. 33 is a flow chart illustrating another example of generation of a prediction image.

FIG. 33 is a flow chart illustrating another example of generation of a prediction image.

Inter predictor 126 determines a motion vector of a current block (Step Sn_1). Next, inter predictor 126 generates a prediction image (Step Sn_2), and determines whether to perform a correction process (Step Sn_3). Here, when determining to perform a correction process (Yes in Step Sn_3), inter predictor 126 generates the final prediction image by correcting the prediction image (Step Sn_4). When determining not to perform a correction process (No in Step Sn_3), inter predictor 126 outputs the prediction image as the final prediction image without correcting the prediction image (Step Sn_5).

In addition, motion compensation involves a mode for correcting a luminance of a prediction image when generating the prediction image. The mode is, for example, LIC to be described later.

Figure 34:
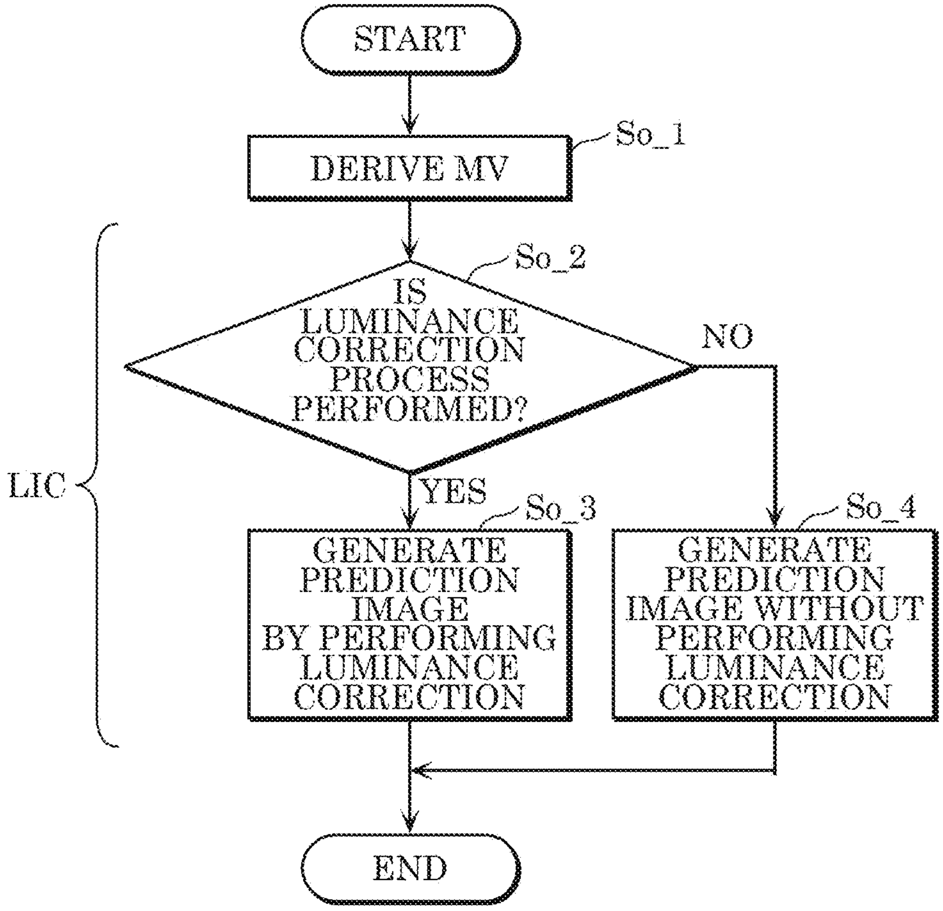
FIG. 34 is a flow chart illustrating another example of generation of a prediction image.

FIG. 34 is a flow chart illustrating another example of generation of a prediction image.

Inter predictor 126 derives a motion vector of a current block (Step So_1). Next, inter predictor 126 determines whether to perform a luminance correction process (Step So_2). Here, when determining to perform a luminance correction process (Yes in Step So_2), inter predictor 126 generates the prediction image while performing a luminance correction process (Step So_3). In other words, the prediction image is generated using LIC. When determining not to perform a luminance correction process (No in Step So_2), inter predictor 126 generates a prediction image by performing normal motion compensation without performing a luminance correction process (Step So_4).

[Motion Compensation>OBMC]

It is to be noted that an inter prediction signal may be generated using motion information for a neighboring block in addition to motion information for the current block obtained from motion estimation. More specifically, the inter prediction signal may be generated in units of a sub-block in the current block by performing a weighted addition of a prediction signal based on motion information obtained from motion estimation (in the reference picture) and a prediction signal based on motion information for a neighboring block (in the current picture). Such inter prediction (motion compensation) is also referred to as overlapped block motion compensation (OBMC).

In OBMC mode, information indicating a sub-block size for OBMC (referred to as, for example, an OBMC block size) may be signaled at the sequence level. Moreover, information indicating whether to apply the OBMC mode (referred to as, for example, an OBMC flag) may be signaled at the CU level. It is to be noted that the signaling of such information does not necessarily need to be performed at the sequence level and CU level, and may be performed at another level (for example, at the picture level, slice level, tile level, CTU level, or sub-block level).

Figure 35:
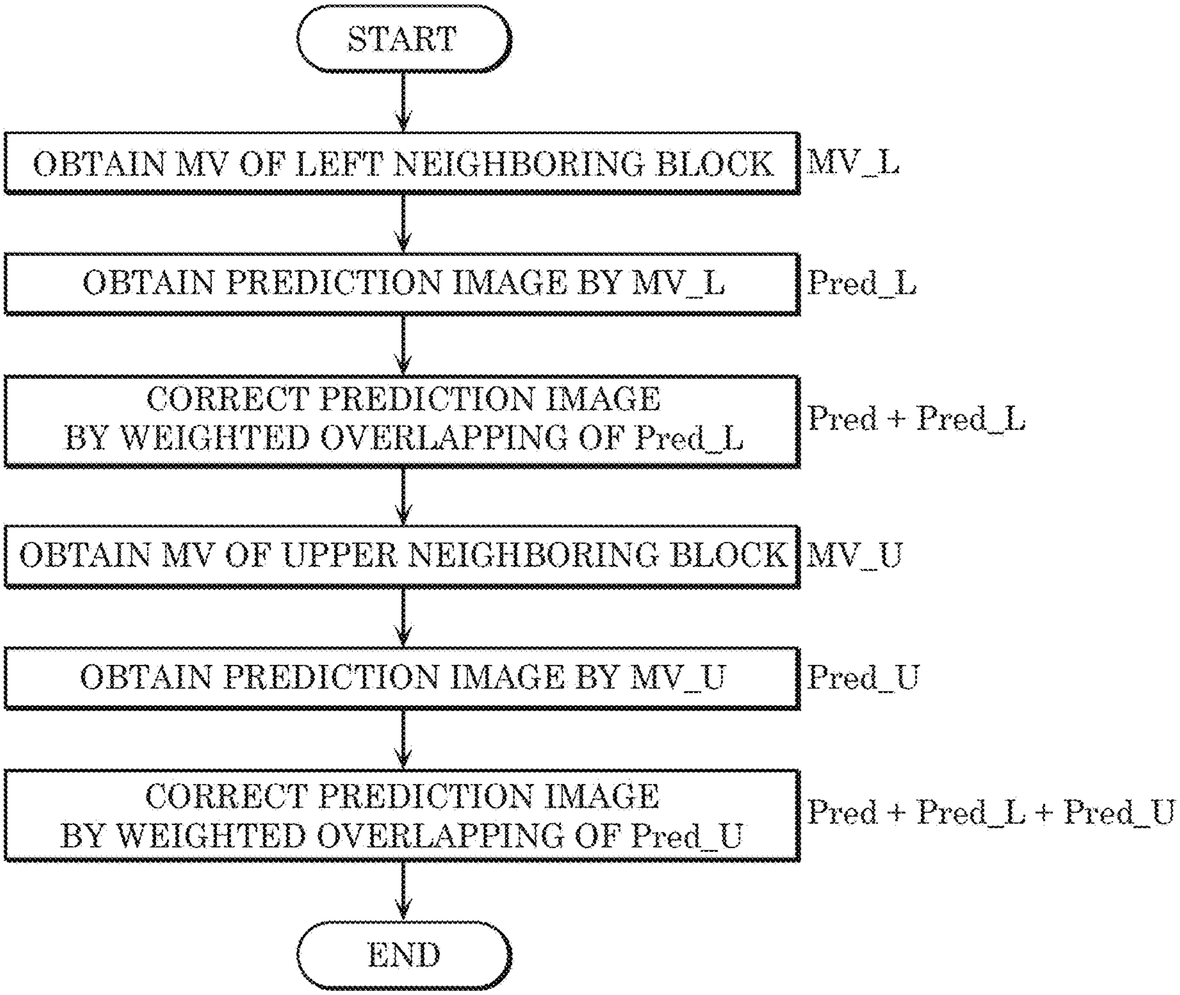
FIG. 35 is a flow chart illustrating one example of a prediction image correction process performed by an overlapped block motion compensation (OBMC) process.
Figure 36:
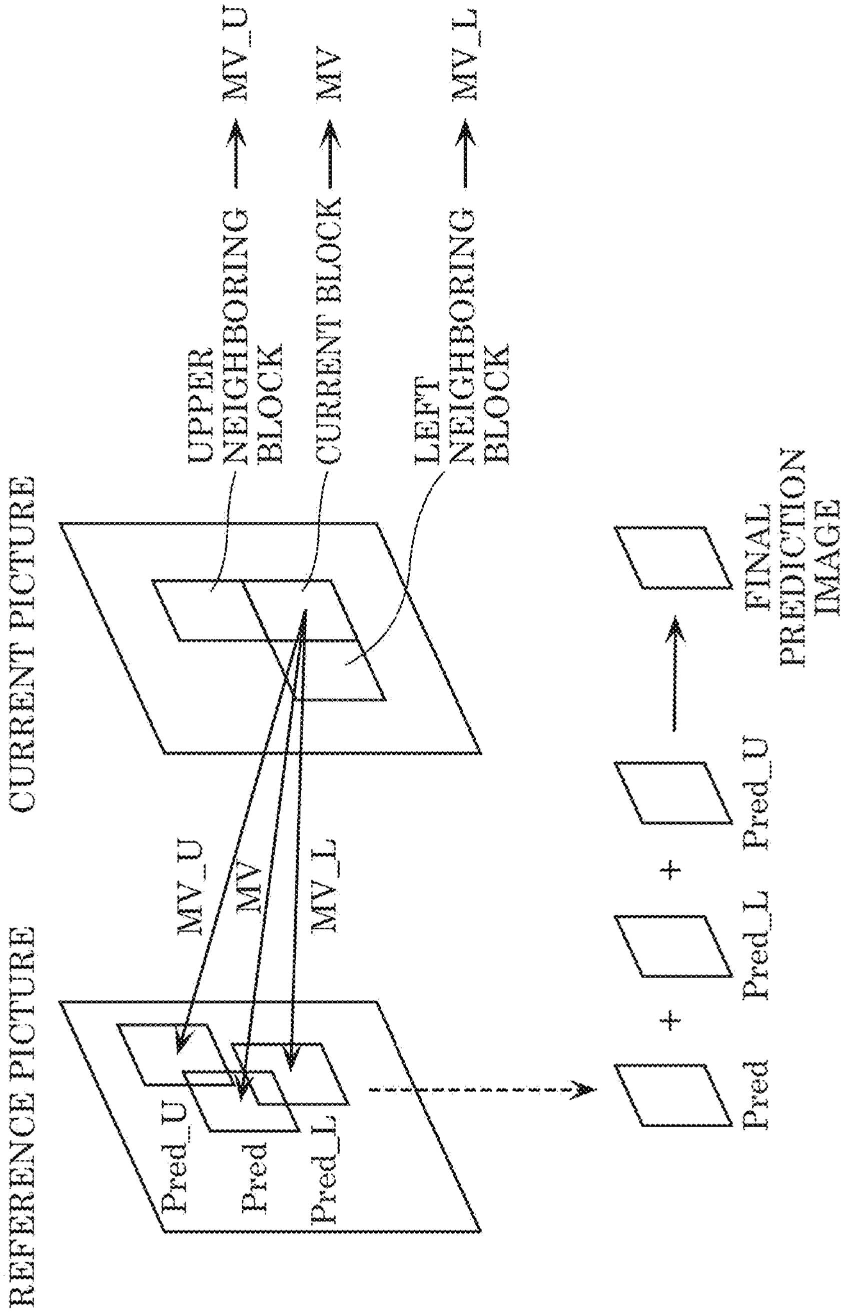
FIG. 36 is a conceptual diagram for illustrating one example of a prediction image correction process performed by an OBMC process.

Examples of the OBMC mode will be described in further detail. FIGS. 35 and 36 are a flow chart and a conceptual diagram for illustrating an outline of a prediction image correction process performed by an OBMC process.

First, as illustrated in FIG. 36, a prediction image (Pred) is obtained through normal motion compensation using a motion vector (MV) assigned to the processing target (current) block. In FIG. 36, the arrow "MV" points a reference picture, and indicates what the current block of the current picture refers to in order to obtain a prediction image.

Next, a prediction image (Pred_L) is obtained by applying a motion vector (MV_L) which has been already derived for the encoded block neighboring to the left of the current block to the current block (re-using the motion vector for the current block). The motion vector (MV_L) is indicated by an arrow "MV_L" indicating a reference picture from a current block. A first correction of a prediction image is performed by overlapping two prediction images Pred and Pred_L. This provides an effect of blending the boundary between neighboring blocks.

Likewise, a prediction image (Pred_U) is obtained by applying a motion vector (MV_U) which has been already derived for the encoded block neighboring above the current block to the current block (re-using the motion vector for the current block). The motion vector (MV_U) is indicated by an arrow "MV_U" indicating a reference picture from a current block. A second correction of a prediction image is performed by overlapping the prediction image Pred_U to the prediction images (for example, Pred and Pred_L) on which the first correction has been performed. This provides an effect of blending the boundary between neighboring blocks. The prediction image obtained by the second correction is the one in which the boundary between the neighboring blocks has been blended (smoothed), and thus is the final prediction image of the current block.

Although the above example is a two-path correction method using left and upper neighboring blocks, it is to be noted that the correction method may be three- or more-path correction method using also the right neighboring block and/or the lower neighboring block.

It is to be noted that the region in which such overlapping is performed may be only part of a region near a block boundary instead of the pixel region of the entire block.

It is to be noted that the prediction image correction process according to OBMC for obtaining one prediction image Pred from one reference picture by overlapping additional prediction image Pred_L and Pred_U have been described above. However, when a prediction image is corrected based on a plurality of reference images, a similar process may be applied to each of the plurality of reference pictures. In such a case, after corrected prediction images are obtained from the respective reference pictures by performing OBMC image correction based on the plurality of reference pictures, the obtained corrected prediction images are further overlapped to obtain the final prediction image.

It is to be noted that, in OBMC, the unit of a current block may be the unit of a prediction block or the unit of a sub-block obtained by further splitting the prediction block.

One example of a method for determining whether to apply an OBMC process is a method for using an obmc_flag which is a signal indicating whether to apply an OBMC process. As one specific example, an encoder determines whether the current block belongs to a region having complicated motion. The encoder sets the obmc_flag to a value of "1" when the block belongs to a region having complicated motion and applies an OBMC process when encoding, and sets the obmc_flag to a value of "0" when the block does not belong to a region having complicated motion and encodes the block without applying an OBMC process. The decoder switches between application and non-application of an OBMC process by decoding the obmc_flag written in the stream (for example, a compressed sequence) and decoding the block by switching between the application and non-application of the OBMC process in accordance with the flag value.

Inter predictor 126 generates one rectangular prediction image for a rectangular current block in the above example. However, inter predictor 126 may generate a plurality of prediction images each having a shape different from a rectangle for the rectangular current block, and may combine the plurality of prediction images to generate the final rectangular prediction image. The shape different from a rectangle may be, for example, a triangle.

Figure 37:
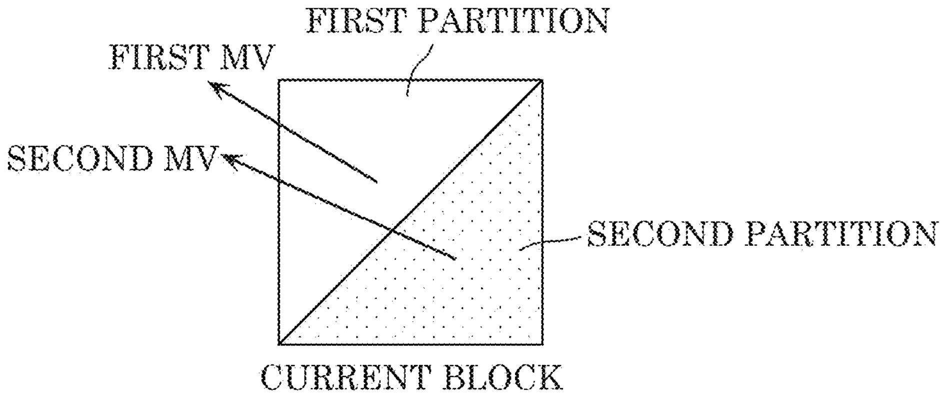
FIG. 37 is a conceptual diagram for illustrating generation of two triangular prediction images.

FIG. 37 is a conceptual diagram for illustrating generation of two triangular prediction images.

Inter predictor 126 generates a triangular prediction image by performing motion compensation of a first partition having a triangular shape in a current block by using a first MV of the first partition, to generate a triangular prediction image. Likewise, inter predictor 126 generates a triangular prediction image by performing motion compensation of a second partition having a triangular shape in a current block by using a second MV of the second partition, to generate a triangular prediction image. Inter predictor 126 then generates a prediction image having the same rectangular shape as the rectangular shape of the current block by combining these prediction images.

It is to be noted that, although the first partition and the second partition are triangles in the example illustrated in FIG. 37, the first partition and the second partition may be trapezoids, or other shapes different from each other. Furthermore, although the current block includes two partitions in the example illustrated in FIG. 37, the current block may include three or more partitions.

In addition, the first partition and the second partition may overlap with each other. In other words, the first partition and the second partition may include the same pixel region. In this case, a prediction image for a current block may be generated using a prediction image in the first partition and a prediction image in the second partition.

In addition, although an example in which a prediction image is generated for each of two partitions using inter prediction, a prediction image may be generated for at least one partition using intra prediction.

[Motion Compensation>BIO]

Next, a method for deriving a motion vector is described. First, a mode for deriving a motion vector based on a model assuming uniform linear motion will be described. This mode is also referred to as a bi-directional optical flow (BIO) mode.

Figure 38:
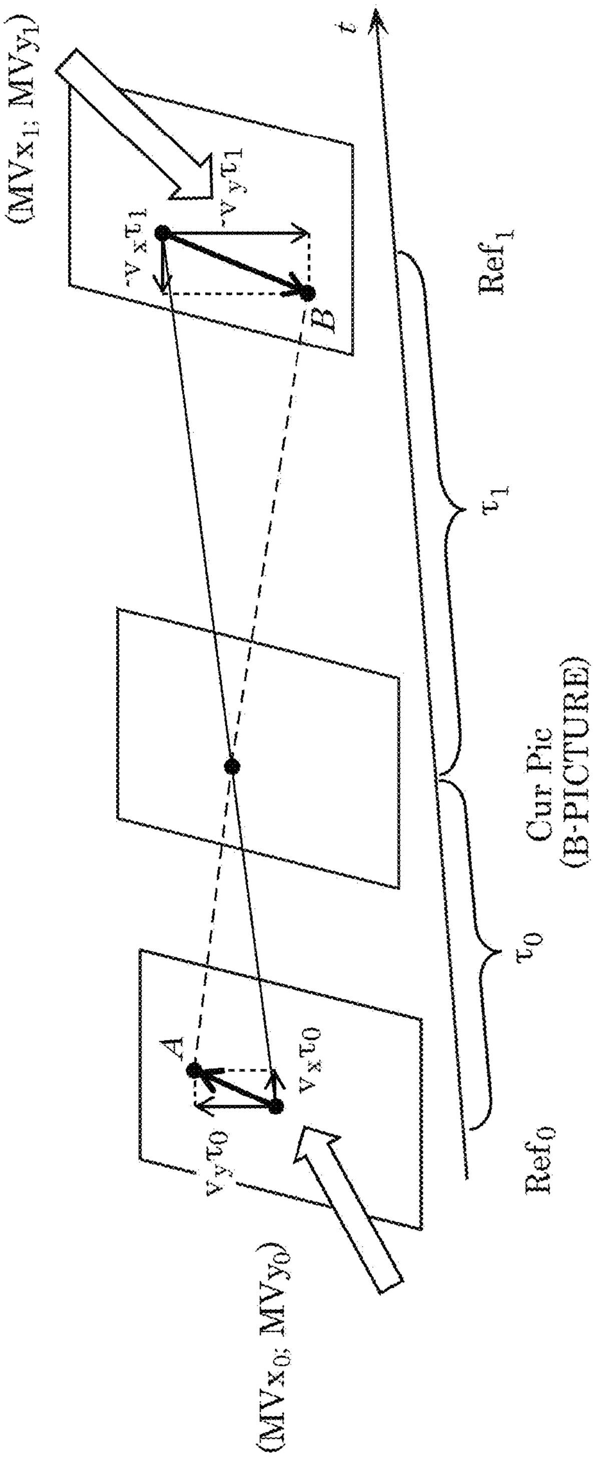
FIG. 38 is a conceptual diagram for illustrating a model assuming uniform linear motion.

FIG. 38 is a conceptual diagram for illustrating a model assuming uniform linear motion. In FIG. 38, (vx, vy) indicates a velocity vector, and τ0 and τ1 indicate temporal distances between a current picture (Cur Pic) and two reference pictures (Ref0, Ref1). (MVx0, MVy0) indicate motion vectors corresponding to reference picture Ref0, and (MVx1, MVy1) indicate motion vectors corresponding to reference picture Ref1.

Here, under the assumption of uniform linear motion exhibited by velocity vectors $(v_x, v_y)$, $(MVx_0, MVy_0)$ and $(MVx_1, MVy_1)$ are represented as $(v_x\tau_0, v_y\tau_0)$ and $(-v_x\tau_1, -v_y\tau_1)$, respectively, and the following optical flow equation (2) may be employed.

[Math. 3]

$$\partial I^{(k)}/\partial t+v_x\partial I^{(k)}/\partial x+v_y\partial I^{(k)}/\partial y=0. \quad (2)$$

Here, I(k) indicates a motion-compensated luma value of reference picture k (k=0, 1). This optical flow equation shows that the sum of (i) the time derivative of the luma value, (ii) the product of the horizontal velocity and the horizontal component of the spatial gradient of a reference image, and (iii) the product of the vertical velocity and the vertical component of the spatial gradient of a reference image is equal to zero. A motion vector of each block obtained from, for example, a merge list may be corrected in units of a pixel, based on a combination of the optical flow equation and Hermite interpolation.

It is to be noted that a motion vector may be derived on the decoder side using a method other than deriving a motion vector based on a model assuming uniform linear motion. For example, a motion vector may be derived in units of a sub-block based on motion vectors of neighboring blocks.

[Motion Compensation>LIC]

Next, an example of a mode in which a prediction image (prediction) is generated by using a local illumination compensation (LIC) process will be described.

Figure 39:
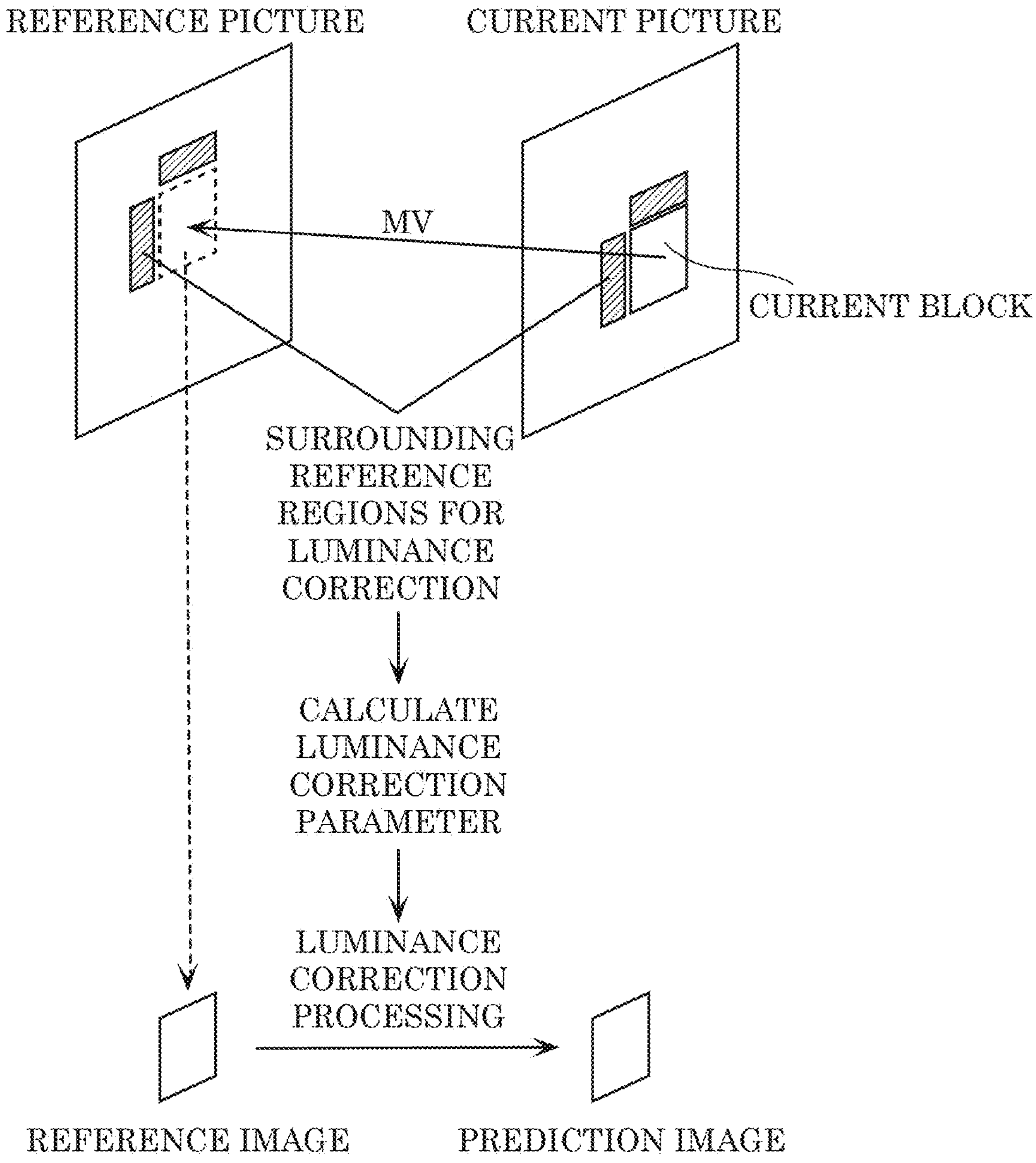
FIG. 39 is a conceptual diagram for illustrating one example of a prediction image generation method using a luminance correction process performed by a local illumination compensation (LIC) process.

FIG. 39 is a conceptual diagram for illustrating one example of a prediction image generation method using a luminance correction process performed by a LIC process.

First, an MV is derived from an encoded reference picture, and a reference image corresponding to the current block is obtained.

Next, information indicating how the luma value changed between the reference picture and the current picture is extracted for the current block. This extraction is performed based on the luma pixel values for the encoded left neighboring reference region (surrounding reference region) and the encoded upper neighboring reference region (surrounding reference region), and the luma pixel value at the corresponding position in the reference picture specified by the derived MV. A luminance correction parameter is calculated by using the information indicating how the luma value changed.

The prediction image for the current block is generated by performing a luminance correction process in which the luminance correction parameter is applied to the reference image in the reference picture specified by the MV.

It is to be noted that the shape of the surrounding reference region illustrated in FIG. 39 is just one example; the surrounding reference region may have a different shape.

Moreover, although the process in which a prediction image is generated from a single reference picture has been described here, cases in which a prediction image is generated from a plurality of reference pictures can be described in the same manner. The prediction image may be generated after performing a luminance correction process of the reference images obtained from the reference pictures in the same manner as described above.

One example of a method for determining whether to apply a LIC process is a method for using a lic_flag which is a signal indicating whether to apply the LIC process. As one specific example, the encoder determines whether the current block belongs to a region having a luminance change. The encoder sets the lic_flag to a value of "1" when the block belongs to a region having a luminance change and applies a LIC process when encoding, and sets the lic_flag to a value of "0" when the block does not belong to a region having a luminance change and encodes the current block without applying a LIC process. The decoder may decode the lic_flag written in the stream and decode the current block by switching between application and non-application of a LIC process in accordance with the flag value.

One example of a different method of determining whether to apply a LIC process is a determining method in accordance with whether a LIC process was applied to a surrounding block. In one specific example, when the merge mode is used on the current block, whether a LIC process was applied in the encoding of the surrounding encoded block selected upon deriving the MV in the merge mode process is determined. According to the result, encoding is performed by switching between application and non-application of a LIC process. It is to be noted that, also in this example, the same processes are applied in processes at the decoder side.

An embodiment of the luminance correction (LIC) process described with reference to FIG. 39 is described in detail below.

First, inter predictor 126 derives a motion vector for obtaining a reference image corresponding to a current block to be encoded from a reference picture which is an encoded picture.

Next, inter predictor 126 extracts information indicating how the luma value of the reference picture has been changed to the luma value of the current picture, using the luma pixel value of an encoded surrounding reference region which neighbors to the left of or above the current block and the luma value in the corresponding position in the reference picture specified by a motion vector, and calculates a luminance correction parameter. For example, it is assumed that the luma pixel value of a given pixel in the surrounding reference region in the current picture is p0, and that the luma pixel value of the pixel corresponding to the given pixel in the surrounding reference region in the reference picture is p1. Inter predictor 126 calculates coefficients A and B for optimizing A×p1+B=p0 as the luminance correction parameter for a plurality of pixels in the surrounding reference region.

Next, inter predictor 126 performs a luminance correction process using the luminance correction parameter for the reference image in the reference picture specified by the motion vector, to generate a prediction image for the current block. For example, it is assumed that the luma pixel value in the reference image is p2, and that the luminance-corrected luma pixel value of the prediction image is p3. Inter predictor 126 generates the prediction image after being subjected to the luminance correction process by calculating A×p2+B=p3 for each of the pixels in the reference image.

It is to be noted that the shape of the surrounding reference region illustrated in FIG. 39 is one example; a different shape other than the shape of the surrounding reference region may be used. In addition, part of the surrounding reference region illustrated in FIG. 39 may be used. For example, a region having a determined number of pixels extracted from each of an upper neighboring pixel and a left neighboring pixel may be used as a surrounding reference region. The determined number of pixels may be predetermined.

In addition, the surrounding reference region is not limited to a region which neighbors the current block, and may be a region which does not neighbor the current block. In the example illustrated in FIG. 39, the surrounding reference region in the reference picture is a region specified by a motion vector in a current picture, from a surrounding reference region in the current picture. However, a region specified by another motion vector is also possible. For example, the other motion vector may be a motion vector in a surrounding reference region in the current picture.

Although operations performed by encoder 100 have been described here, it is to be noted that decoder 200 typically performs similar operations.

It is to be noted that the LIC process may be applied not only to the luma but also to chroma. At this time, a correction parameter may be derived individually for each of Y, Cb, and Cr, or a common correction parameter may be used for any of Y, Cb, and Cr.

In addition, the LIC process may be applied in units of a sub-block. For example, a correction parameter may be derived using a surrounding reference region in a current sub-block and a surrounding reference region in a reference sub-block in a reference picture specified by an MV of the current sub-block.

[Prediction Controller]

Inter predictor 128 selects one of an intra prediction signal (a signal output from intra predictor 124) and an inter prediction signal (a signal output from inter predictor 126), and outputs the selected signal to subtractor 104 and adder 116 as a prediction signal.

As illustrated in FIG. 1, in various kinds of encoder examples, prediction controller 128 may output a prediction parameter which is input to entropy encoder 110. Entropy encoder 110 may generate an encoded bitstream (or a sequence), based on the prediction parameter which is input from prediction controller 128 and quantized coefficients which are input from quantizer 108. The prediction parameter may be used in a decoder. The decoder may receive and decode the encoded bitstream, and perform the same processes as the prediction processes performed by intra predictor 124, inter predictor 126, and prediction controller 128. The prediction parameter may include (i) a selection prediction signal (for example, a motion vector, a prediction type, or a prediction mode used by intra predictor 124 or inter predictor 126), or (ii) an optional index, a flag, or a value which is based on a prediction process performed in each of intra predictor 124, inter predictor 126, and prediction controller 128, or which indicates the prediction process.

[Mounting Example of Encoder]

Figure 40:
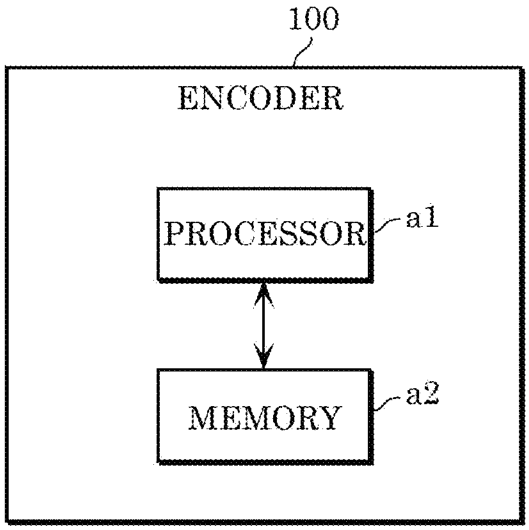
FIG. 40 is a block diagram illustrating a mounting example of the encoder.

FIG. 40 is a block diagram illustrating a mounting example of encoder 100. Encoder 100 includes processor a1 and memory a2. For example, the plurality of constituent elements of encoder 100 illustrated in FIG. 1 are mounted on processor a1 and memory a2 illustrated in FIG. 40.

Processor a1 is circuitry which performs information processing and is accessible to memory a2. For example, processor a1 is dedicated or general electronic circuitry which encodes a video. Processor a1 may be a processor such as a CPU. In addition, processor a1 may be an aggregate of a plurality of electronic circuits. In addition, for example, processor a1 may take the roles of two or more constituent elements out of the plurality of constituent elements of encoder 100 illustrated in FIG. 1, etc.

Memory a2 is dedicated or general memory for storing information that is used by processor a1 to encode a video. Memory a2 may be electronic circuitry, and may be connected to processor a1. In addition, memory a2 may be included in processor a1. In addition, memory a2 may be an aggregate of a plurality of electronic circuits. In addition, memory a2 may be a magnetic disc, an optical disc, or the like, or may be represented as a storage, a recording medium, or the like. In addition, memory a2 may be non-volatile memory, or volatile memory.

For example, memory a2 may store a video to be encoded or a bitstream corresponding to an encoded video. In addition, memory a2 may store a program for causing processor a1 to encode a video.

In addition, for example, memory a2 may take the roles of two or more constituent elements for storing information out of the plurality of constituent elements of encoder 100 illustrated in FIG. 1, etc. For example, memory a2 may take the roles of block memory 118 and frame memory 122 illustrated in FIG. 1. More specifically, memory a2 may store a reconstructed block, a reconstructed picture, etc.

It is to be noted that, in encoder 100, all of the plurality of constituent elements indicated in FIG. 1, etc. may not be implemented, and all the processes described above may not be performed. Part of the constituent elements indicated in FIG. 1, etc. may be included in another device, or part of the processes described above may be performed by another device.

[Decoder]

Figure 41:
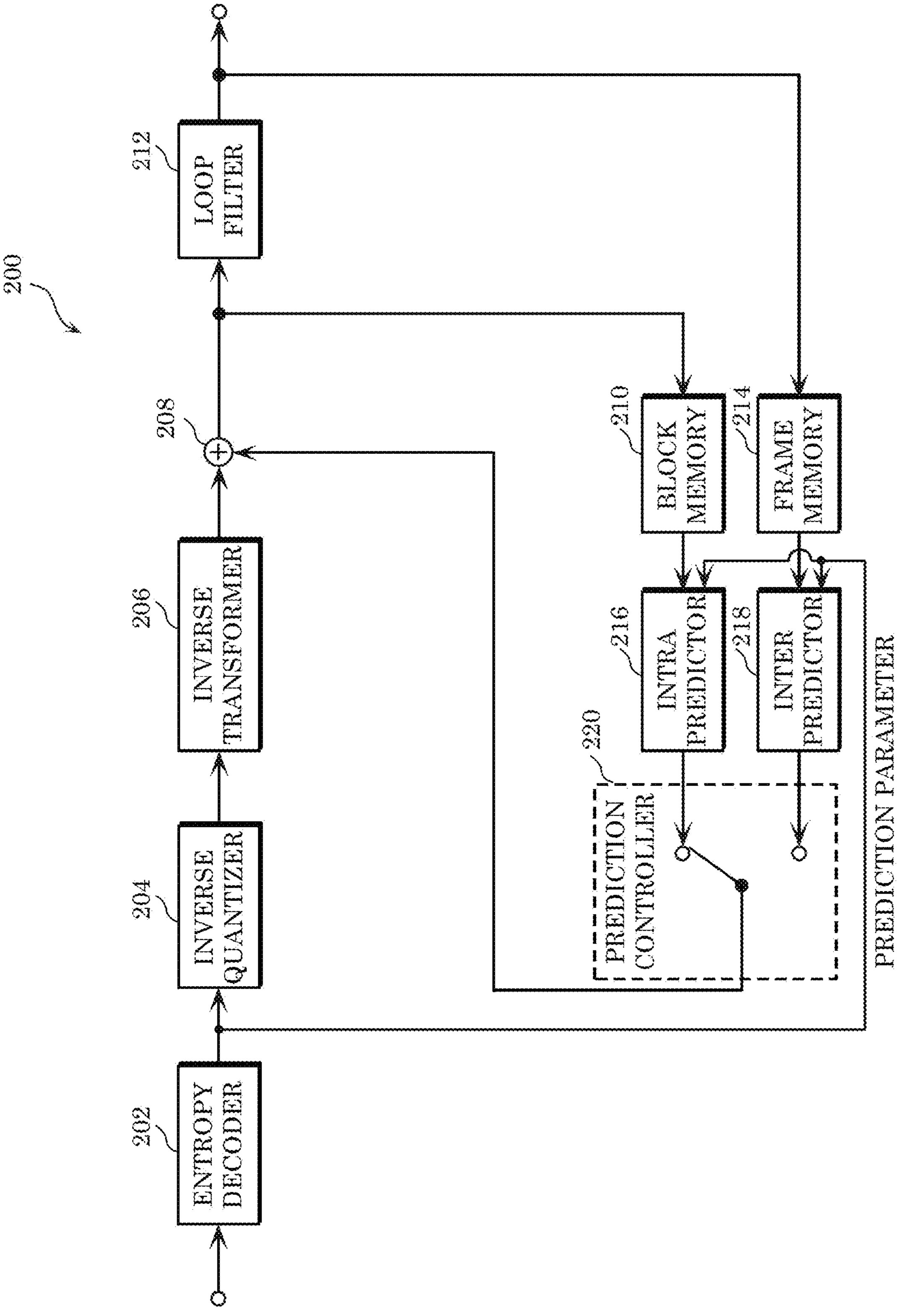
FIG. 41 is a block diagram illustrating a functional configuration of a decoder according to an embodiment.

Next, a decoder capable of decoding an encoded signal (encoded bitstream) output, for example, from encoder 100 described above will be described. FIG. 41 is a block diagram illustrating a functional configuration of decoder 200 according to an embodiment. Decoder 200 is a video decoder which decodes a video in units of a block.

As illustrated in FIG. 41, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is implemented as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be implemented as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, an overall flow of processes performed by decoder 200 is described, and then each of constituent elements included in decoder 200 will be described.

[Overall Flow of Decoding Process]

Figure 42:
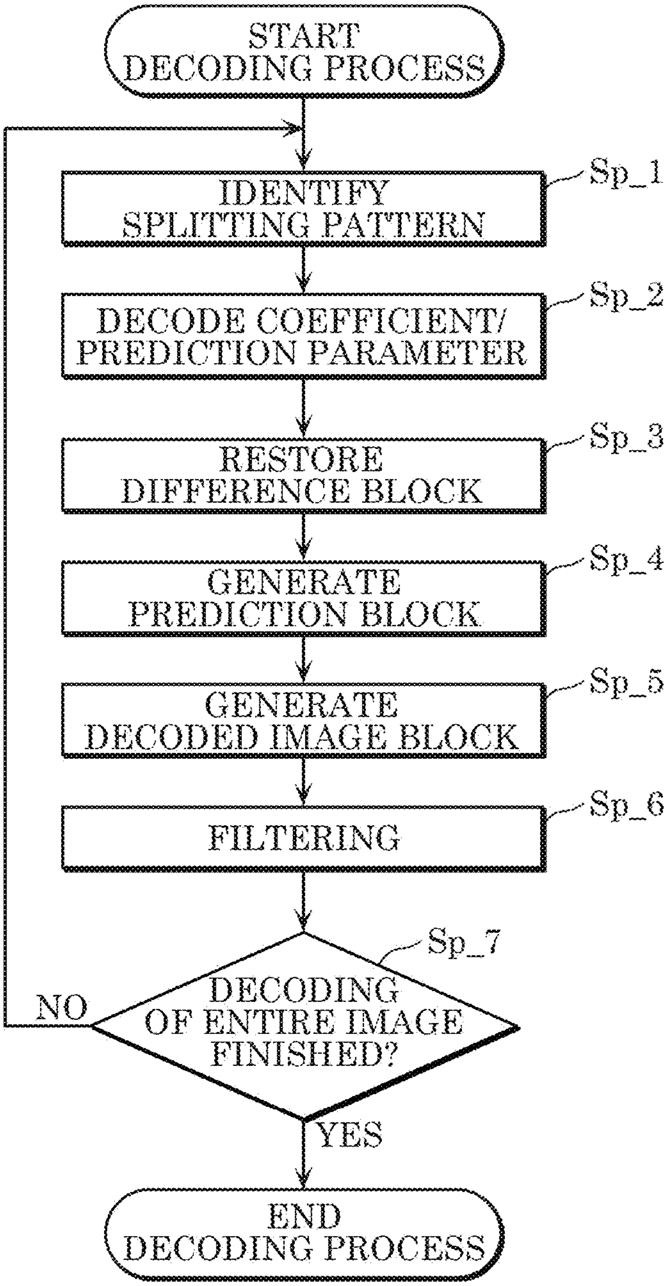
FIG. 42 is a flow chart illustrating one example of an overall decoding process performed by the decoder.

FIG. 42 is a flow chart illustrating one example of an overall decoding process performed by decoder 200.

First, entropy decoder 202 of decoder 200 identifies a splitting pattern of a block having a fixed size (for example, 128×128 pixels) (Step Sp_1). This splitting pattern is a splitting pattern selected by encoder 100. Decoder 200 then performs processes of Step Sp_2 to Sp_6 for each of a plurality of blocks of the splitting pattern.

In other words, entropy decoder 202 decodes (specifically, entropy-decodes) encoded quantized coefficients and a prediction parameter of a current block to be decoded (also referred to as a current block) (Step Sp_2).

Next, inverse quantizer 204 performs inverse quantization of the plurality of quantized coefficients and inverse transformer 206 performs inverse transform of the result, to restore a plurality of prediction residuals (that is, a difference block) (Step Sp_3).

Next, the prediction processor including all or part of intra predictor 216, inter predictor 218, and prediction controller 220 generates a prediction signal (also referred to as a prediction block) of the current block (Step Sp_4).

Next, adder 208 adds the prediction block to the difference block to generate a reconstructed image (also referred to as a decoded image block) of the current block (Step Sp_5).

When the reconstructed image is generated, loop filter 212 performs filtering of the reconstructed image (Step Sp_6).

Decoder 200 then determines whether decoding of the entire picture has been finished (Step Sp_7). When determining that the decoding has not yet been finished (No in Step Sp_7), decoder 200 repeatedly executes the processes starting with Step Sp_1.

As illustrated, the processes of Steps Sp_1 to Sp_7 are performed sequentially by decoder 200. Alternatively, two or more of the processes may be performed in parallel, the processing order of the two or more of the processes may be modified, etc.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204. Entropy decoder 202 may output a prediction parameter included in an encoded bitstream (see FIG. 1) to intra predictor 216, inter predictor 218, and prediction controller 220. Intra predictor 216, inter predictor 218, and prediction controller 220 in an embodiment are capable of executing the same prediction processes as those performed by intra predictor 124, inter predictor 126, and prediction controller 128 at the encoder side.

[Inverse Quantizer]

Inverse quantizer 204 inverse quantizes quantized coefficients of a block to be decoded (hereinafter referred to as a current block) which are inputs from entropy decoder 202. More specifically, inverse quantizer 204 inverse quantizes quantized coefficients of the current block, based on quantization parameters corresponding to the quantized coefficients. Inverse quantizer 204 then outputs the inverse quantized transform coefficients of the current block to inverse transformer 206.

[Inverse Transformer]

Inverse transformer 206 restores prediction errors by inverse transforming the transform coefficients which are inputs from inverse quantizer 204.

For example, when information parsed from an encoded bitstream indicates that EMT or AMT is to be applied (for example, when an AMT flag is true), inverse transformer 206 inverse transforms the transform coefficients of the current block based on information indicating the parsed transform type.

Moreover, for example, when information parsed from an encoded bitstream indicates that NSST is to be applied, inverse transformer 206 applies a secondary inverse transform to the transform coefficients.

[Adder]

Adder 208 reconstructs the current block by adding prediction errors which are inputs from inverse transformer 206 and prediction samples which are inputs from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) and to be referred to in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214, display device, etc.

When information indicating ON or OFF of an ALF parsed from an encoded bitstream indicates that an ALF is ON, one filter from among a plurality of filters is selected based on direction and activity of local gradients, and the selected filter is applied to the reconstructed block.

[Frame Memory]

Frame memory 214 is, for example, storage for storing reference pictures for use in inter prediction, and is also referred to as a frame buffer. More specifically, frame memory 214 stores a reconstructed block filtered by loop filter 212.

[Prediction Processor (Intra Predictor, Inter Predictor, Prediction Controller)]

Figure 43:
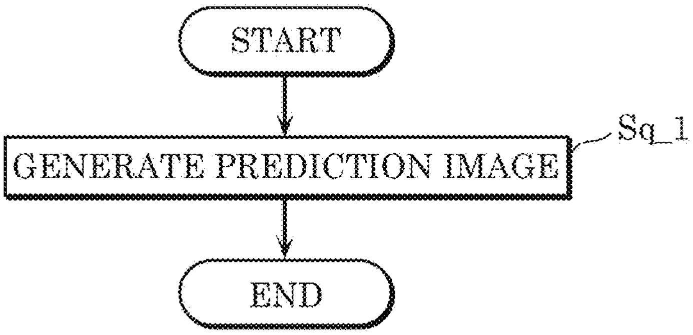
FIG. 43 is a flow chart illustrating one example of a process performed by a prediction processor of the decoder.

FIG. 43 is a flow chart illustrating one example of a process performed by a prediction processor of decoder 200. It is to be noted that the prediction processor includes all or part of the following constituent elements: intra predictor 216; inter predictor 218; and prediction controller 220.

The prediction processor generates a prediction image of a current block (Step Sq_1). This prediction image is also referred to as a prediction signal or a prediction block. It is to be noted that the prediction signal is, for example, an intra prediction signal or an inter prediction signal. Specifically, the prediction processor generates the prediction image of the current block using a reconstructed image which has been already obtained through generation of a prediction block, generation of a difference block, generation of a coefficient block, restoring of a difference block, and generation of a decoded image block.

The reconstructed image may be, for example, an image in a reference picture, or an image of a decoded block in a current picture which is the picture including the current block. The decoded block in the current picture is, for example, a neighboring block of the current block.

Figure 44:
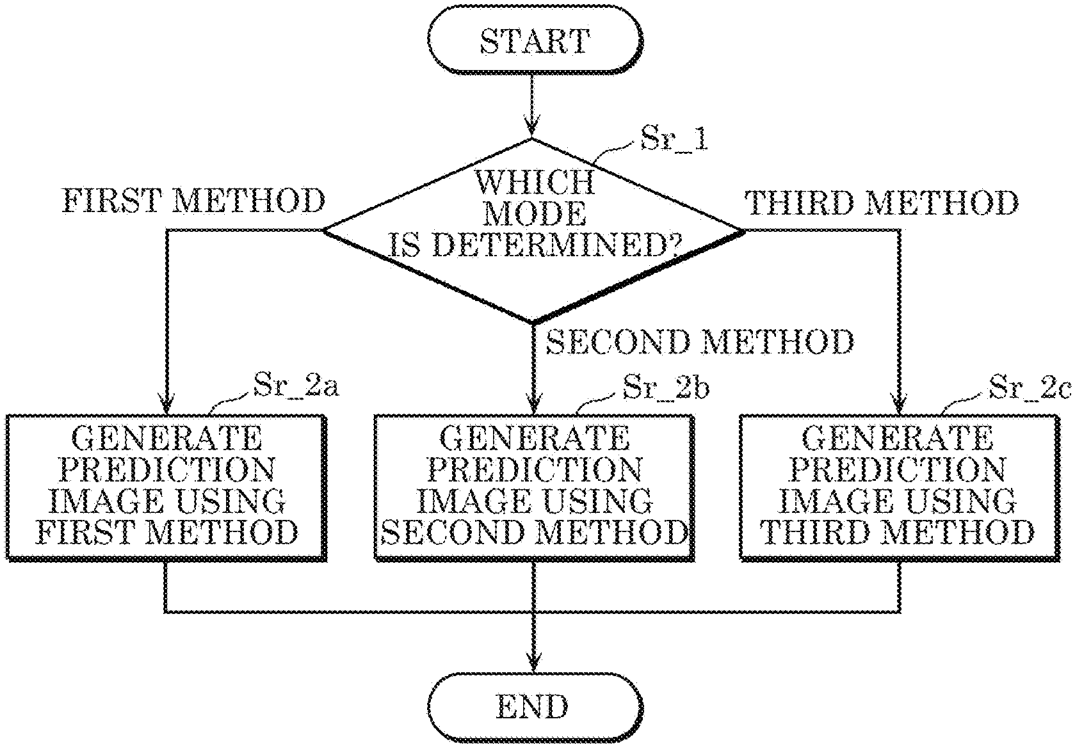
FIG. 44 is a flow chart illustrating another example of a process performed by the prediction processor of the decoder.

FIG. 44 is a flow chart illustrating another example of a process performed by the prediction processor of decoder 200.

The prediction processor determines either a method or a mode for generating a prediction image (Step Sr_1). For example, the method or mode may be determined based on, for example, a prediction parameter, etc.

When determining a first method as a mode for generating a prediction image, the prediction processor generates a prediction image according to the first method (Step Sr_2*a*). When determining a second method as a mode for generating a prediction image, the prediction processor generates a prediction image according to the second method (Step Sr_2*b*). When determining a third method as a mode for generating a prediction image, the prediction processor generates a prediction image according to the third method (Step Sr_2*c*).

The first method, the second method, and the third method may be mutually different methods for generating a prediction image. Each of the first to third methods may be an inter prediction method, an intra prediction method, or another prediction method. The above-described reconstructed image may be used in these prediction methods.

[Intra Predictor]

Intra predictor 216 generates a prediction signal (intra prediction signal) by performing intra prediction by referring to a block or blocks in the current picture stored in block memory 210, based on the intra prediction mode parsed from the encoded bitstream. More specifically, intra predictor 216 generates an intra prediction signal by performing intra prediction by referring to samples (for example, luma and/or chroma values) of a block or blocks neighboring the current block, and then outputs the intra prediction signal to prediction controller 220.

It is to be noted that when an intra prediction mode in which a luma block is referred to in intra prediction of a chroma block is selected, intra predictor 216 may predict the chroma component of the current block based on the luma component of the current block.

Moreover, when information parsed from an encoded bitstream indicates that PDPC is to be applied, intra predictor 216 corrects intra-predicted pixel values based on horizontal/vertical reference pixel gradients.

[Inter Predictor]

Inter predictor 218 predicts the current block by referring to a reference picture stored in frame memory 214. Inter prediction is performed in units of a current block or a sub-block (for example, a 4×4 block) in the current block. For example, inter predictor 218 generates an inter prediction signal of the current block or the sub-block by performing motion compensation by using motion information (for example, a motion vector) parsed from an encoded bitstream (for example, a prediction parameter output from entropy decoder 202), and outputs the inter prediction signal to prediction controller 220.

It is to be noted that when the information parsed from the encoded bitstream indicates that the OBMC mode is to be applied, inter predictor 218 generates the inter prediction signal using motion information of a neighboring block in addition to motion information of the current block obtained from motion estimation.

Moreover, when the information parsed from the encoded bitstream indicates that the FRUC mode is to be applied, inter predictor 218 derives motion information by performing motion estimation in accordance with the pattern matching method (bilateral matching or template matching) parsed from the encoded bitstream. Inter predictor 218 then performs motion compensation (prediction) using the derived motion information.

Moreover, when the BIO mode is to be applied, inter predictor 218 derives a motion vector based on a model assuming uniform linear motion. Moreover, when the information parsed from the encoded bitstream indicates that the affine motion compensation prediction mode is to be applied, inter predictor 218 derives a motion vector of each sub-block based on motion vectors of neighboring blocks.

[MV Derivation>Normal Inter Mode]

When information parsed from an encoded bitstream indicates that the normal inter mode is to be applied, inter predictor 218 derives an MV based on the information parsed from the encoded bitstream and performs motion compensation (prediction) using the MV.

Figure 45:
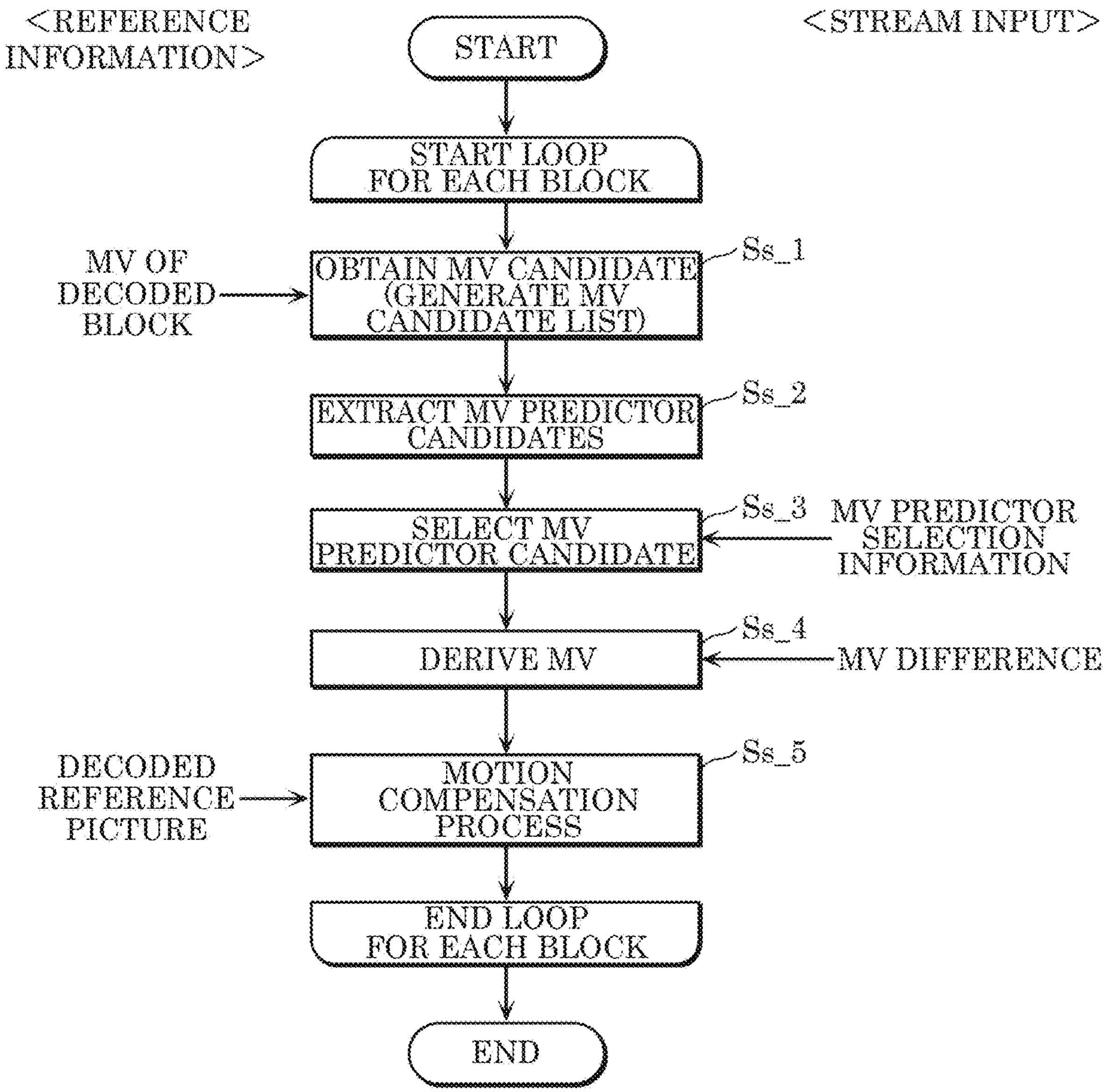
FIG. 45 is a flow chart illustrating an example of inter prediction in normal inter mode in the decoder.

FIG. 45 is a flow chart illustrating an example of inter prediction in normal inter mode in decoder 200.

Inter predictor 218 of decoder 200 performs motion compensation for each block. Inter predictor 218 obtains a plurality of MV candidates for a current block based on information such as MVs of a plurality of decoded blocks temporally or spatially surrounding the current block (Step Ss_1). In other words, inter predictor 218 generates an MV candidate list.

Next, inter predictor 218 extracts N (an integer of 2 or larger) MV candidates from the plurality of MV candidates obtained in Step Ss_1, as motion vector predictor candidates (also referred to as MV predictor candidates) according to a determined priority order (Step Ss_2). It is to be noted that the priority order may be determined in advance for each of the N MV predictor candidates.

Next, inter predictor 218 decodes motion vector predictor selection information from an input stream (that is, an encoded bitstream), and selects, one MV predictor candidate from the N MV predictor candidates using the decoded motion vector predictor selection information, as a motion vector (also referred to as an MV predictor) of the current block (Step Ss_3).

Next, inter predictor 218 decodes an MV difference from the input stream, and derives an MV for a current block by adding a difference value which is the decoded MV difference and a selected motion vector predictor (Step Ss_4).

Lastly, inter predictor 218 generates a prediction image for the current block by performing motion compensation of the current block using the derived MV and the decoded reference picture (Step Ss_5).

[Prediction Controller]

Prediction controller 220 selects either the intra prediction signal or the inter prediction signal, and outputs the selected prediction signal to adder 208. As a whole, the configurations, functions, and processes of prediction controller 220, intra predictor 216, and inter predictor 218 at the decoder side may correspond to the configurations, functions, and processes of prediction controller 128, intra predictor 124, and inter predictor 126 at the encoder side.

[Mounting Example of Decoder]

Figure 46:
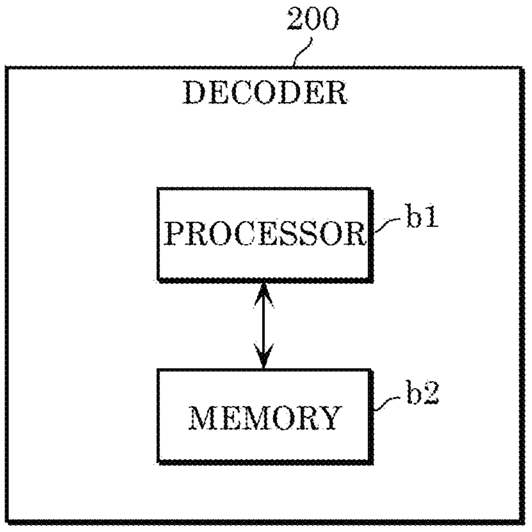
FIG. 46 is a block diagram illustrating a mounting example of the decoder.

FIG. 46 is a block diagram illustrating a mounting example of decoder 200. Decoder 200 includes processor b1 and memory b2. For example, the plurality of constituent elements of decoder 200 illustrated in FIG. 41 are mounted on processor b1 and memory b2 illustrated in FIG. 46.

Processor b1 is circuitry which performs information processing and is accessible to memory b2. For example, processor b1 is dedicated or general electronic circuitry which decodes a video (that is, an encoded bitstream). Processor b1 may be a processor such as a CPU. In addition, processor b1 may be an aggregate of a plurality of electronic circuits. In addition, for example, processor b1 may take the roles of two or more constituent elements out of the plurality of constituent elements of decoder 200 illustrated in FIG. 41, etc.

Memory b2 is dedicated or general memory for storing information that is used by processor b1 to decode an encoded bitstream. Memory b2 may be electronic circuitry, and may be connected to processor b1. In addition, memory b2 may be included in processor b1. In addition, memory b2 may be an aggregate of a plurality of electronic circuits. In addition, memory b2 may be a magnetic disc, an optical disc, or the like, or may be represented as a storage, a recording medium, or the like. In addition, memory b2 may be a non-volatile memory, or a volatile memory.

For example, memory b2 may store a video or a bitstream. In addition, memory b2 may store a program for causing processor b1 to decode an encoded bitstream.

In addition, for example, memory b2 may take the roles of two or more constituent elements for storing information out of the plurality of constituent elements of decoder 200 illustrated in FIG. 41, etc. Specifically, memory b2 may take the roles of block memory 210 and frame memory 214 illustrated in FIG. 41. More specifically, memory b2 may store a reconstructed block, a reconstructed picture, etc.

It is to be noted that, in decoder 200, all of the plurality of constituent elements illustrated in FIG. 41, etc. may not be implemented, and all the processes described above may not be performed. Part of the constituent elements indicated in FIG. 41, etc. may be included in another device, or part of the processes described above may be performed by another device.

Definitions of Terms

The respective terms may be defined as indicated below as examples.

A picture is an array of luma samples in monochrome format or an array of luma samples and two corresponding arrays of chroma samples in 4:2:0, 4:2:2, and 4:4:4 color format. A picture may be either a frame or a field.

A frame is the composition of a top field and a bottom field, where sample rows 0, 2, 4, . . . originate from the top field and sample rows 1, 3, 5, . . . originate from the bottom field.

A slice is an integer number of coding tree units contained in one independent slice segment and all subsequent dependent slice segments (if any) that precede the next independent slice segment (if any) within the same access unit.

A tile is a rectangular region of coding tree blocks within a particular tile column and a particular tile row in a picture. A tile may be a rectangular region of the frame that is intended to be able to be decoded and encoded independently, although loop-filtering across tile edges may still be applied.

A block is an M×N (M-column by N-row) array of samples, or an M×N array of transform coefficients. A block may be a square or rectangular region of pixels including one Luma and two Chroma matrices.

A coding tree unit (CTU) may be a coding tree block of luma samples of a picture that has three sample arrays, or two corresponding coding tree blocks of chroma samples. Alternatively, a CTU may be a coding tree block of samples of one of a monochrome picture and a picture that is coded using three separate color planes and syntax structures used to code the samples.

A super block may be a square block of 64×64 pixels that consists of either 1 or 2 mode info blocks or is recursively partitioned into four 32×32 blocks, which themselves can be further partitioned.

[First Specific Example of BIO]

Next, a first specific example of a decoding process based on BIO is described with reference to FIGS. 47, 48, and 49. For example, decoder 200 calculates a BIO parameter from two reference blocks which have been motion compensated, and decodes a current block using the BIO parameter calculated.

Figure 47:
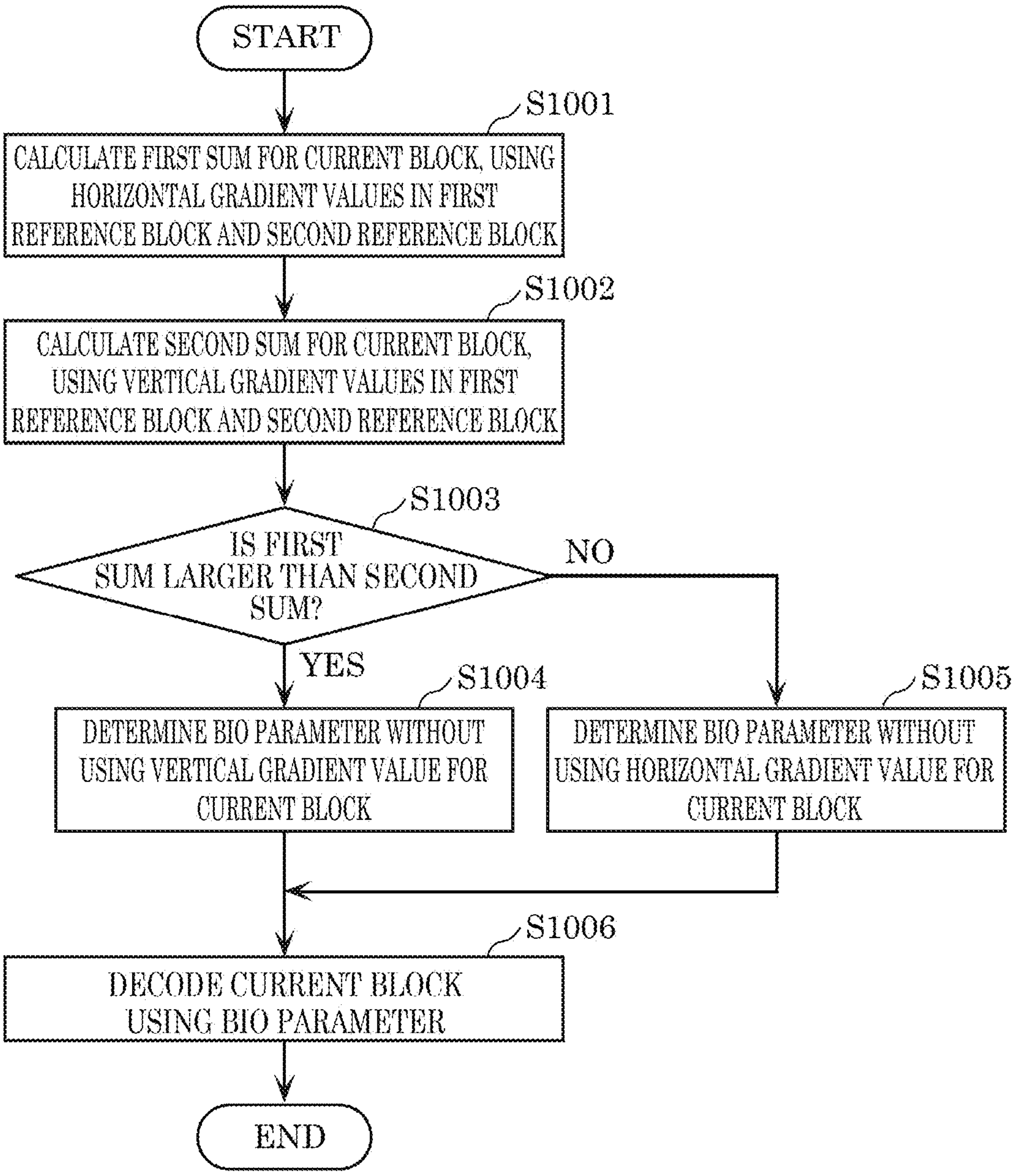
FIG. 47 is a flow chart indicating a first specific example of a decoding process based on BIO according to an embodiment.

FIG. 47 is a flow chart indicating the first specific example of the decoding process based on BIO. FIG. 48 is a conceptual diagram illustrating an example of calculating horizontal gradient values. FIG. 49 is a conceptual diagram illustrating an example of calculating vertical gradient values.

First, decoder 200 calculates a first sum for the current block, using the horizontal gradient value of a first reference block and the horizontal gradient value of a second reference block (S1001). The current block may be a sub-block of a current coding unit (current CU) as illustrated in FIGS. 48 and 49.

The first reference block is a block which is to be referred to in encoding of the current block and is defined in reference picture L0 by the current block or a first motion vector of a current CU. The second reference block is a block which is to be referred to in encoding of the current block and is defined in reference picture L1 by the current block or a second motion vector of the current CU.

Basically, reference picture L0 and reference picture L1 are two different reference pictures, and the first reference block and the second reference block are two different reference blocks. In addition, here, the first reference block and the second reference block used here have been adjusted respectively at a sub-pixel accuracy using a motion compensation filter, and have the same size as the size of the current block.

When the current block is a sub-block in a current coding unit, each of the first reference block and the second reference block may be a sub-block of the reference block in the current coding unit.

Figure 48:
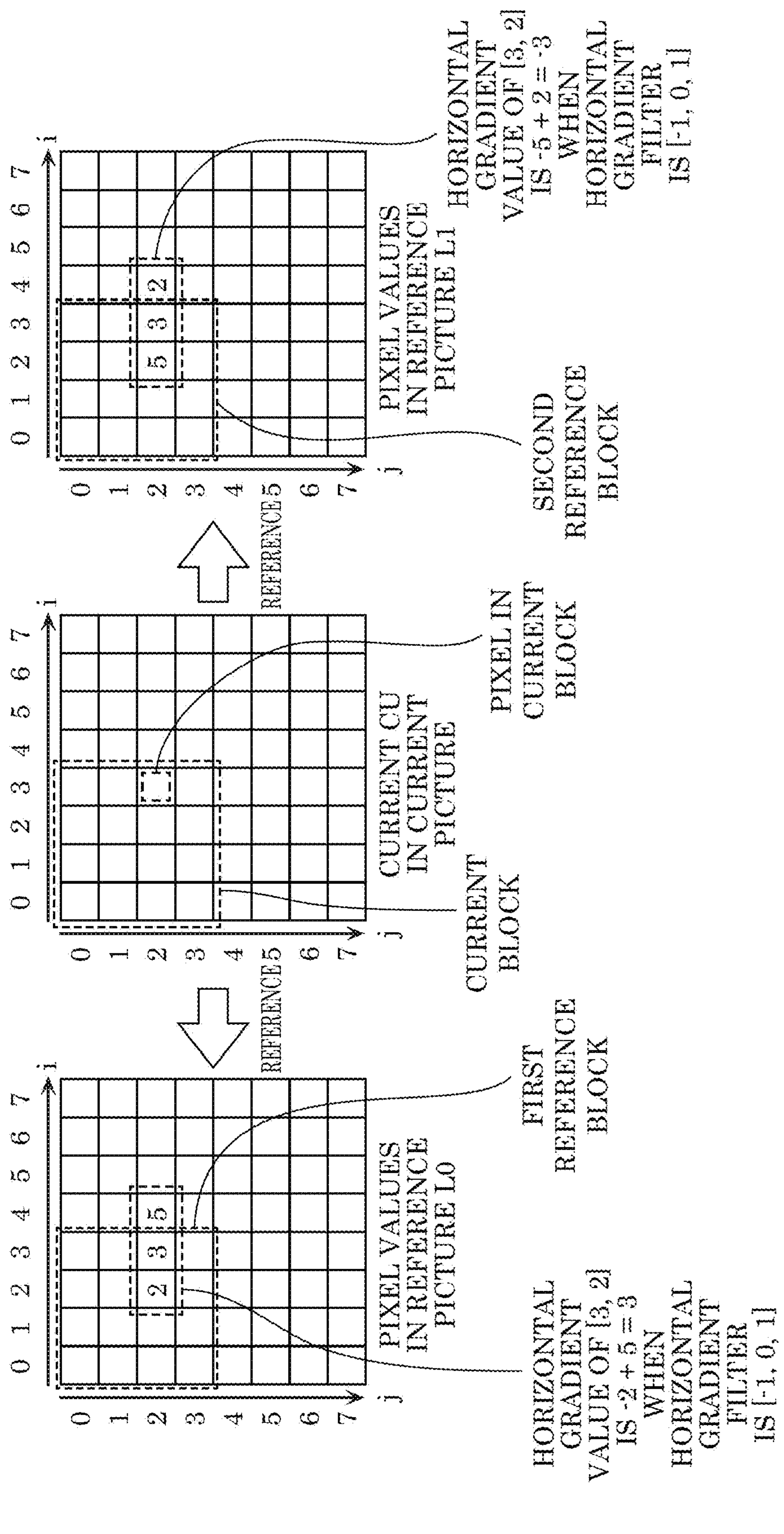
FIG. 48 is a conceptual diagram illustrating an example of calculating horizontal gradient values according to the embodiment.
Figure 49:
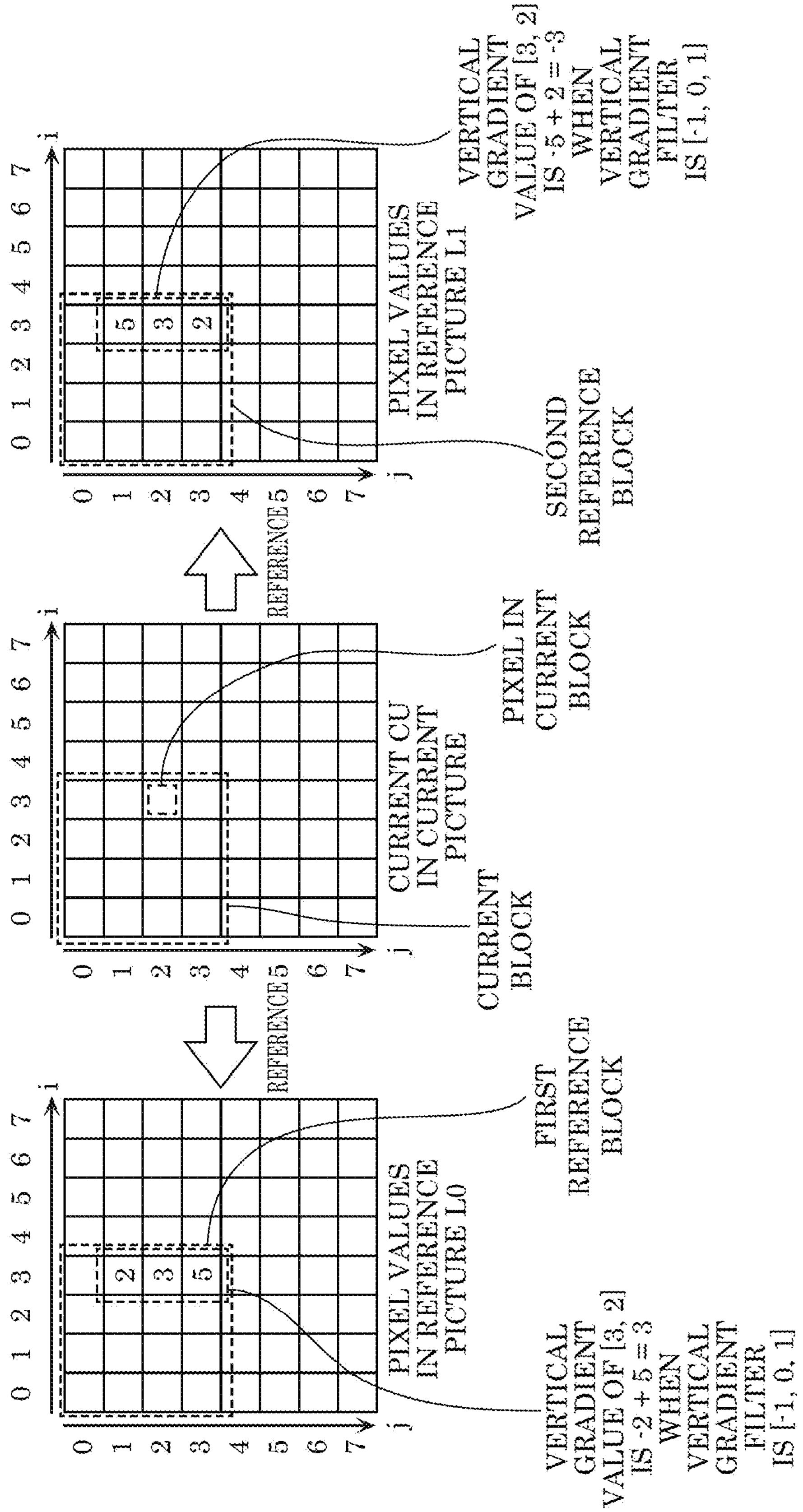
FIG. 49 is a conceptual diagram illustrating an example of calculating vertical gradient values according to the embodiment.

In other words, a plurality of pixel values in reference picture L0 in FIGS. 48 and 49 may be a plurality of pixel values in a block defined as a reference block in the current coding unit, for reference picture L0. Likewise, a plurality of pixel values in reference picture L1 in FIGS. 48 and 49 may be a plurality of pixel values in a block defined as a reference block in the current coding unit, for reference picture L1.

Decoder 200 calculates a first sum using a horizontal gradient value of the above-mentioned first reference block and a horizontal gradient value of the above-mentioned second reference block. Decoder 200 may calculate a first sum using not only the horizontal gradient value of the first reference block and the horizontal gradient value of the second reference block, but also a horizontal gradient value of a neighboring area that neighbors the first reference block and a horizontal gradient value of a neighboring area that neighbors the second reference block. Expressions (3.1) and (3.2) indicated below indicate an example of a method for a calculation process of a first sum.

[Math. 4]

$$G_x = I_x^0 + I_x^1 \tag{3.1}$$

[Math. 5]

$$sG_x = \sum_{[i,j]\in\Omega} \text{sign}(G_x[i,j]) \times G_x[i,j] \tag{3.2}$$

Here, x denotes multiplication, and + denotes addition. In addition, sign denotes a plus or minus sign. For example, the following is indicated by sign.

[Math. 6]

$$\text{sign}(x) = \begin{cases} 1 & \text{if } x \geq 0 \\ -1 & \text{if } x < 0 \end{cases}$$

As a result, sign ($G_x$ [i, j])×$G_x$ [i, j] becomes $G_x$ [i, j] without sign change when $G_x$ [i, j] is a plus value, and becomes $-G_x$ [i, j] when $G_x$ [i, j] is a minus value. Thus, the calculation is equivalent to derivation of an absolute value (abs) of $G_x$ [i, j]).

In Expression (3.1), $$I_x^0$$

denotes a horizontal gradient value in the first reference block in reference picture L0, and $$I_x^1$$

denotes a horizontal gradient value in the second reference block in reference picture L1.

An example of a horizontal gradient filter for obtaining horizontal gradient values is a three-tap filter having a filter coefficient set of [−1, 0, 1]. The horizontal gradient value in the first reference block is calculated by applying a horizontal gradient filter to a plurality of reference pixels in the first reference block. The horizontal gradient value in the second reference block is calculated by applying a horizontal gradient filter to a plurality of reference pixels in the second reference block.

In the example illustrated in FIG. 48, horizontal gradient value $$I_x^0$$

of the pixel located at position [3, 2] in the first reference block is calculated as a matrix product [−1, 0, 1] [2, 3, 5], and the resulting value is 3. Horizontal gradient value $$I_x^1$$

of the pixel located at position [3, 2] in the second reference block is calculated as a matrix product [−1, 0, 1] [5, 3, 2], and the resulting value is −3. It is to be noted that [a, b, c] denotes a matrix having three rows and one column.

In Expression (3.2), $sG_x$ denotes the first sum, and is calculated as a sum of absolute values of $G_x$ over a window denoted as Ω. The size of window Ω may be the same as the size of a current block. Alternatively, the size of window Ω may be larger than the size of a current block. In the latter case, the value of $G_x$ at a position neighboring the current block is included in a process of calculating a first sum.

As in the case of the first sum which is the sum of the horizontal gradient values, decoder 200 calculates a second sum for the current block, using a vertical gradient value of the first reference block and a vertical gradient value of the second reference block (S1002). Expressions (3.3) and (3.4) indicated below indicate an example of a method for a calculation process of a second sum.

[Math. 7]

$$G_y = I_y^0 + I_y^1 \tag{3.3}$$

[Math. 8]

$$sGy = \sum_{[i,j]\in\Omega} \text{sign}(G_y[i,j]) \times G_y[i,j] \tag{3.4}$$

In Expression (3.3), $$I_y^0$$

denotes a vertical gradient value in the first reference block in reference picture L0, and $$I_y^1$$

denotes a vertical gradient value in the second reference block in reference picture L1.

An example of a vertical gradient filter for obtaining vertical gradient values is a three-tap filter having a filter coefficient set of [−1, 0, 1]. The vertical gradient value in the first reference block is calculated by applying a vertical gradient filter to a plurality of reference pixels in the first reference block. The vertical gradient value in the second reference block is calculated by applying a vertical gradient filter to a plurality of reference pixels in the second reference block.

In the example illustrated in FIG. 49, vertical gradient value $$I_y^0$$

of the pixel located at position [3, 2] in the first reference block is calculated as a matrix product $[-1, 0, 1]^T[2, 3, 5]$, and the resulting value is 3. Vertical gradient value $$I_y^1$$

of the pixel located at position [3, 2] in the second reference block is calculated as a matrix product $[-1, 0, 1]^T[5, 3, 2]$, and the resulting value is −3.

In Expression (3.4), $sG_y$ denotes the second sum, and is calculated as a sum of absolute values of $G_y$ over the window denoted as Ω. When the size of window Ω is larger than the value of the current block, value $G_y$ at a position neighboring the current block is included in a process of calculating a second sum.

Next, decoder 200 judges whether the first sum is larger than the second sum (S1003). When judging that the first sum is larger than the second sum (Yes in S1003), decoder 200 determines a BIO parameter for the current block without using any vertical gradient value (S1004). Expressions (3.5) to (3.9) indicate an example of a computation process for determining the BIO parameter in this case. According to these expressions, the BIO parameter denoted as u is calculated using horizontal gradient values.

[Math. 9]

$$sG_xdI = \sum_{[i,j]\in\Omega} -\mathrm{sign}(G_x[i,j]) \times (I_{i,j}^0 - I_{i,j}^1) \quad (3.5)$$

[Math. 10]

$$\mathrm{denominator} = sG_x \quad (3.6)$$

[Math. 11]

$$\mathrm{numerator} = sG_xDI \quad (3.7)$$

[Math. 12]

$$\mathrm{shift} = \mathrm{Bits}(\mathrm{denominator}) - 6 \quad (3.8)$$

[Math. 13]

$$u = \mathrm{Clip}(((\mathrm{numerator} \gg (\mathrm{shift} - 12)) \times BIOShift[\mathrm{denominator} \gg \mathrm{shift}]) \gg 27) \quad (3.9)$$

Here, − denotes subtraction, and >>denotes shift computation. In addition, Bits, BIOShift, and Clip respectively indicate the following. It is to be noted that, in the description below, ceil and floor denote decimal round up and decimal round down, respectively.

[Math. 14]

$$\mathrm{Bits}(x) = \lceil \log_2 x \rceil$$

$$BIOShift[i]\lfloor((1 \ll 15) + \lfloor i/2 \rfloor)/i\rfloor;\ i \in [1, 63]$$

$$\mathrm{Clip}(x) = \begin{cases} 256 & \text{if } x > 256 \\ x & \text{if } -256 \le x \le 256 \\ -256 & \text{if } x < -256 \end{cases}$$

-continued $$\lceil x \rceil = \mathrm{ceil}(x)$$

$$\lfloor x \rfloor = \mathrm{floor}(x)$$

According to Expression (3.5), $SG_xdI$ is calculated as a sum of products of differences between $$I_{i,j}^0 \text{ and } I_{i,j}^1$$

and −sign ($G_x$ [i, j]) over window Ω. Here, $$I_{i,j}^0$$

denotes the pixel value at position [i, j] in the first reference block in reference picture L0, and $$I_{i,j}^1$$

denotes the pixel value at position [i, j] in the second reference block in reference picture L1.

$$I_{i,j}^0 \text{ and } I_{i,j}^1$$

may be simply represented as $I^0$ and $I^1$. BIO parameter u is calculated using $sG_xdI$ and $sG_x$ according to Expressions (3.6) to (3.9).

When judging that the first sum is not larger than the second sum (No in S1003), decoder 200 determines BIO parameter u for the current block without using any horizontal gradient value (S1005). Expressions (3.10) to (3.14) indicate an example of a computation process for determining BIO parameter u in this case. Expressions (3.10) to (3.14) are basically the same as Expressions (3.5) to (3.9) except that BIO parameter u is calculated using the vertical gradient values in Expression (3.10) to (3.14).

[Math. 15]

$$sG_ydI = \sum_{[i,j]\in\Omega} -\mathrm{sign}(G_y[i,j]) \times (I_{i,j}^0 - I_{i,j}^1) \quad (3.10)$$

[Math. 16]

$$\mathrm{denominator} = sG_y \quad (3.11)$$

[Math. 17]

$$\mathrm{numerator} = sG_yDI \quad (3.12)$$

[Math. 18]

$$\mathrm{shift} = \mathrm{Bits}(\mathrm{demoninator}) - 6 \quad (3.13)$$

[Math. 19]

$$u = \mathrm{Clip}(((\mathrm{numerator} \gg (\mathrm{shift} - 12)) \times BIOshift[\mathrm{demoninator} \gg \mathrm{shift}]) \gg 27) \quad (3.14)$$

According to Expression (3.10), $sG_ydI$ is calculated as a sum of products of differences between $$I^0_{i,j} \text{ and } I^1_{i,j}$$

and −sign ($G_y$ [i, j]) over window Ω.

Decoder 200 then decodes the current block using BIO parameter u (S1006). Specifically, decoder 200 generates a prediction sample using BIO parameter u, and decodes the current block using the prediction sample. Expressions (3.15) and (3.16) indicate an example of a computation process for generating a prediction sample.

[Math. 20]

$$\text{prediction sample} = \left(I^0 + I^1 + u \times \left(I_x^0 - I_x^1\right)\right) \gg 1 \tag{3.15}$$

[Math. 21]

$$\text{prediction sample} = \left(I^0 + I^1 + u \times \left(I_y^0 - I_y^1\right)\right) \gg 1 \tag{3.16}$$

When it is judged that the first sum is larger than the second sum (Yes in S1003), Expression (3.15) is used. When it is judged that the first sum is not larger than the second sum (No in S1003), Expression (3.16) is used.

Decoder 200 may repeat the processes (S1001 to S1006) for all the sub-blocks in each of current CUs.

Decoder 200 is capable of increasing the accuracy of the prediction sample in the current block using BIO. Decoder 200 is further capable of reducing increase in the amount of computation because decoder 200 uses only one of the horizontal gradient values and the vertical gradient values when calculating a BIO parameter.

The above expressions are examples, and expressions for calculating a BIO parameter are not limited to the above expressions. For example, expressions equivalent to the above expressions may be used. The plus and minus signs included in the above expressions may be changed as appropriate. Specifically, as an expression corresponding to Expressions (3.1) and (3.2) described above, following Expression (4.1) may be used.

[Math. 22]

$$sG_x = \sum\nolimits_{[i,j]\in\Omega} \text{abs}\left(I_x^1 + I_x^0\right) \tag{4.1}$$

For example, as an expression corresponding to Expression (3.5) described above, following Expression (4.2) may be used.

[Math. 23]

$$sG_xdI = \sum\nolimits_{[i,j]\in\Omega} \left(-\text{sign}\left(I_x^1 + I_x^0\right) \times \left(I^0 - I^1\right)\right) \tag{4.2}$$

For example, as an expression corresponding to Expression (3.15) described above, following Expression (4.3) may be used.

[Math. 24]

$$\text{prediction sample} = \left(I^1 + I^0 - u \times \left(I_x^1 - I_x^0\right)\right) \gg 1 \tag{4.3}$$

Expressions (3.6) to (3.9) substantially indicate division, and thus may be represented as Expression (4.4).

[Math. 25]

$$u = \frac{sG_xdI}{sG_x} \tag{4.4}$$

Expressions (4.1) to (4.4) are substantially the same as Expressions (3.1), (3.2), (3.5) to (3.9), and (3.15) described above.

Likewise, as an expression corresponding to Expressions (3.3) and (3.4) described above, following Expression (4.5) may be used.

[Math. 26]

$$sG_y = \sum\nolimits_{[i,j]\in\Omega} \text{abs}\left(I_y^1 + I_y^0\right) \tag{4.5}$$

For example, as an expression corresponding to Expression (3.10) described above, following Expression (4.6) may be used.

[Math. 27]

$$sG_yDI = \sum\nolimits_{[i,j]\in\Omega} \left(-\text{sign}\left(I_y^1 + I_y^0\right) \times \left(I^0 - I^1\right)\right) \tag{4.6}$$

For example, as an expression corresponding to Expression (3.16) described above, following Expression (4.7) may be used.

[Math. 28]

$$\text{prediction sample} = \left(I^1 + I^0 - u \times \left(I_y^1 - I_y^0\right)\right) \gg 1 \tag{4.7}$$

Expressions (3.11) to (3.14) substantially indicate division, and thus may be represented as Expression (4.8).

[Math. 29]

$$u = \frac{sG_ydI}{sG_y} \tag{4.8}$$

Expressions (4.5) to (4.8) are substantially the same as Expressions (3.3), (3.4), (3.10) to (3.14) and (3.16) described above.

In the above flow, the horizontal gradient value or the vertical gradient value is used based on the comparison between the first sum and the second sum. However, decoding process flows are not limited to the flow described above. Whether to use a horizontal gradient value or a vertical gradient value may be determined in advance by another coding parameter or the like. A BIO parameter may be derived using horizontal gradient values and a BIO parameter may be derived using vertical gradient values, without comparing a first sum and a second sum. Alternatively, only one of the first sum and the second sum may be calculated.

Even without comparing the first sum and the second sum, decoder 200 is capable of reducing substantial multiplication which requires a large amount of computation in the computations performed for the respective pixel positions, and deriving a plurality of parameters for generating the prediction image with a small amount of computation. Specifically, decoder 200 is capable of calculating $sG_x$, $SG_xdI$, $sG_y$, and $SG_ydI$ with a small amount of computation. Accordingly, decoder 200 is capable of reducing the processing amount in decoding.

Although the decoding process has been described in the above description, the same processes included in the decoding process may be applied also in an encoding process. In other words, the decoding in the above description may be read as encoding.

[Second Specific Example of BIO]

Next, a second specific example of a decoding process based on BIO is described. For example, as in the first example, decoder 200 calculates a BIO parameter from two reference blocks which have been motion compensated, and decodes a current block using the BIO parameter calculated.

In this specific example, a prediction sample for decoding a current block is generated according to Expressions (5.1) to (5.8) indicated below.

[Math. 30]

$$s_1 = \sum_{[i,j]\in\Omega}(I_x^1 + I_x^0)\times(I_x^1 + I_x^0) \tag{5.1}$$

[Math. 31]

$$s_2 = \sum_{[i,j]\in\Omega}(I_y^1 + I_y^0)\times(I_y^1 + I_y^0) \tag{5.2}$$

[Math. 32]

$$s_3 = \sum_{[i,j]\in\Omega}(-(I_x^1 + I_x^0)\times(I^0 - I^1)) \tag{5.3}$$

[Math. 33]

$$s_4 = \sum_{[i,j]\in\Omega}(-(I_y^1 + I_y^0)\times(I^0 - I^1)) \tag{5.4}$$

[Math. 34]

$$v_x = \frac{s_3}{s_1} \tag{5.5}$$

[Math. 35]

$$v_y = \frac{s_4}{s_2} \tag{5.6}$$

[Math. 36]

$$\text{offset} = \frac{v_x\times(I_x^0 - I_x^1)}{2} + \frac{v_y\times(I_y^0 - I_y^1)}{2} \tag{5.7}$$

[Math. 37]

$$\text{prediction sample} = \frac{I^0 + I^1 + \text{offset}}{2} \tag{5.8}$$

$S_1$ in Expression (5.1) in this specific example corresponds to $sG_x$ in Expression (3.2) in the first specific example. In addition, $S_2$ in Expression (5.2) in this specific example corresponds to $sG_xdI$ in Expression (3.5) in the first specific example. In addition, $S_3$ in Expression (5.3) in this specific example corresponds to $sG_y$ in Expression (3.4) in the first specific example. In addition, $S_4$ in Expression (5.4) in this specific example corresponds to $sG_ydI$ in Expression (3.10) in the specific example.

Furthermore, $v_x$ and $v_y$ in Expressions (5.5) to (5.7) in this specific example each correspond to a BIO parameter and correspond to u in Expressions (3.9) and (3.14) in the first specific example.

In the first specific example, no change is made to a plus or minus sign and no substantial multiplication is performed in the calculation of $SG_x$, $SG_xdI$, $sG_y$, and $sG_ydI$. In the specific example, substantial multiplication is performed in the calculation of $S_1$, $S_2$, $S_3$, and $S_4$. In this way, although the amount of computation increases, a prediction sample is generated with a higher accuracy. On the other hand, the amount of computation is reduced in the first specific example.

[Representative Examples of Configurations and Processes]

Descriptions are given of representative examples of the configurations of and processes performed by encoder 100 and decoder 200 described above. These representative examples mainly correspond to the first specific example described above.

Figure 50:
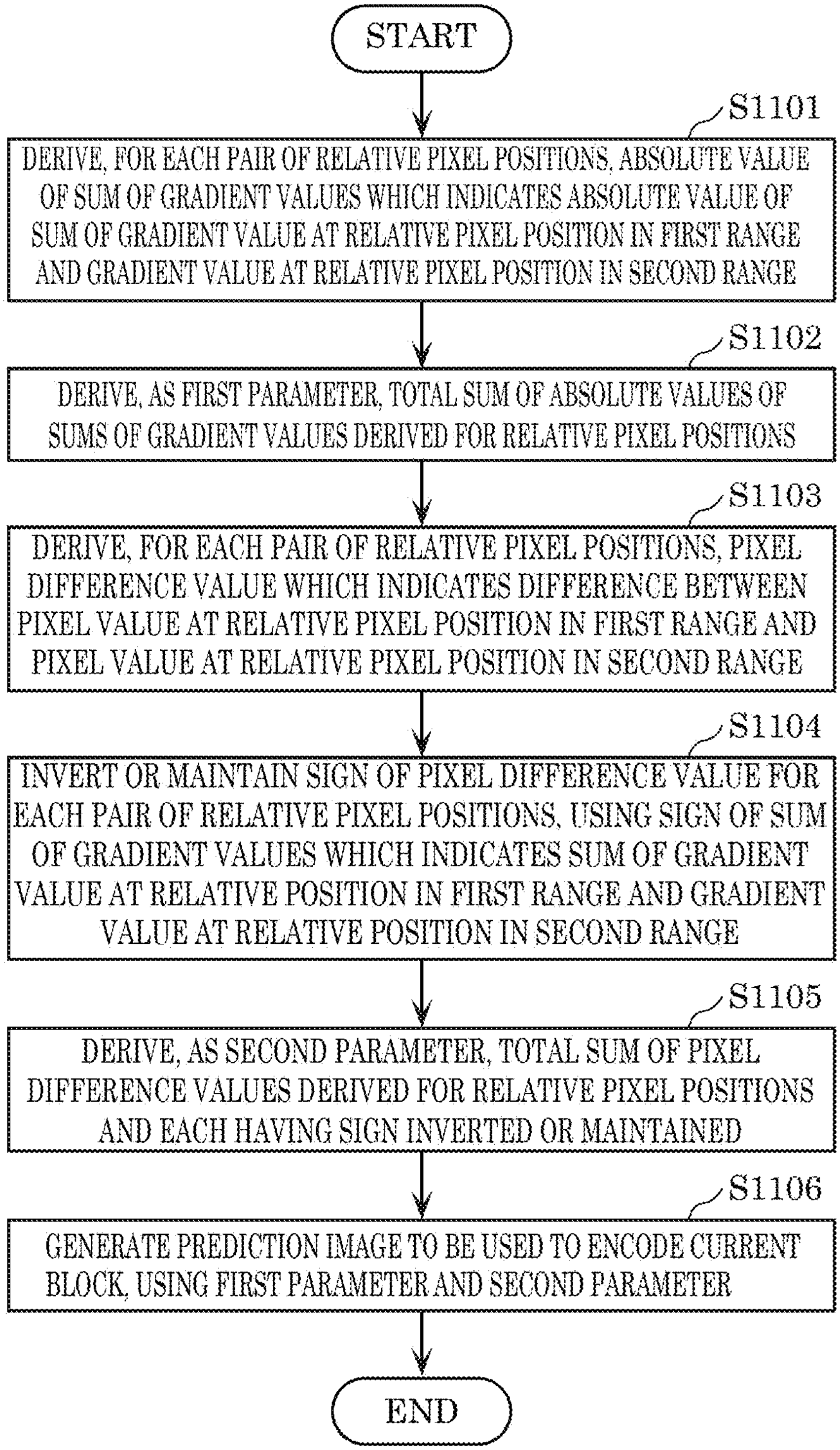
FIG. 50 is a flow chart indicating an operation performed by an encoder according to the embodiment.

FIG. 50 is a flow chart indicating an operation performed by encoder 100. For example, encoder 100 includes circuitry and memory connected to the circuitry. The circuitry and memory included in encoder 100 may correspond to processor a1 and memory a2 illustrated in FIG. 40. The circuitry of encoder 100 performs the following steps in operation.

For example, the circuitry of encoder 100 derives, for each of a plurality of pairs of relative pixel positions, the absolute value of the sum of the gradient values which indicates the absolute value of the sum of the gradient value at a relative pixel position in a first range and the gradient value at a relative pixel position in a second range (S1101). Here, the first range includes a first reference block in a current block, and the second range includes a second reference block in the current block. Each of the plurality of pairs of relative pixel positions is determined commonly and relatively for both the first range and the second range, and each pair of relative pixel positions is composed of a pixel position in the first range and a pixel position in the second range. To be determined commonly and relatively here means that the pixel position in the first range and the pixel position in the second range to be used when deriving the absolute value of the sum of the gradient values are relatively same positions. For example, the circuitry of encoder 100 derives the absolute value of the sum of the gradient values, using the gradient value for the pixel located at the upper leftmost position in the first range and the gradient value for the pixel located at the upper leftmost position in the second range.

The circuitry of encoder 100 then derives, as a first parameter, the total sum of a plurality of absolute values of the sums of gradient values derived respectively for the plurality of pairs of relative positions (S1102).

In addition, the circuitry of encoder 100 derives a pixel difference value which indicates the difference between the pixel value at the relative pixel position in the first range and the pixel value at the relative pixel position in the second range, for each of the plurality of pairs of relative pixel positions (S1103). For example, at this time, the circuitry of encoder 100 derives the pixel difference value with a plus or minus sign by subtracting one of the pixel value at the relative pixel position in the first range and the pixel value at the relative pixel position in the second range in each of the plurality of pairs of relative pixel positions from the other.

The circuitry of encoder 100 then inverts or maintains the plus or minus sign of the pixel difference value derived for the pair of relative pixel positions, according to the plus or minus sign of the sum of the gradient values (S1104). Here, the sum of the gradient values at the pair of relative pixel positions indicates the sum of the gradient value at the relative pixel position in the first range and the gradient value at the relative pixel position in the second range.

The circuitry of encoder 100 then derives, as a second parameter, the total sum of a plurality of pixel difference values which have been derived respectively for the plurality of pairs of relative pixel positions and each of which has the plus or minus sign inverted or maintained (S1105).

The circuitry of encoder 100 then generates a prediction image to be used to encode the current block using the first parameter and the second parameter (S1106).

In this way, encoder 100 is capable of reducing substantial multiplication which requires a large amount of computation in the computations performed for the respective pixel positions, and deriving the plurality of parameters for generating the prediction image with a small amount of computation. Accordingly, encoder 100 is capable of reducing the processing amount in encoding.

In addition, for example, the gradient value at the relative pixel position in the first range among each pair of relative pixel positions may be the horizontal gradient value at the relative pixel position in the first range. In addition, the gradient value at the relative pixel position in the second range among each pair of relative pixel positions may be the horizontal gradient value at the relative pixel position in the second range. In this way, encoder 100 is capable of deriving the plurality of parameters using the horizontal gradient values with a small amount of computation.

In addition, for example, the circuitry of encoder 100 may derive a first parameter according to Expression (4.1) described above. The circuitry of encoder 100 may then derive a second parameter according to Expression (4.2) described above.

Here, Ω denotes a set of relative pixel positions, and [i, j] denotes each of the relative pixel positions.

$$I_x^0$$

denotes the horizontal gradient value at each relative pixel position in the first range, $$I_x^1$$

denotes the horizontal gradient value at each relative pixel position in the second range, $I^0$ denotes the pixel value at each relative pixel position in the first range, and $I^1$ denotes the pixel value at each relative pixel position in the second range. In addition, abs $$(I_x^1 + I_x^0)$$

denotes the absolute value of $$I_x^1 + I_x^0,$$

and sign $$(I_x^1 + I_x^0)$$

denotes the plus or minus sign of $$I_x^1 + I_x^0.$$

In this way, encoder 100 is capable of appropriately deriving a plurality of parameters using pixel values and horizontal gradient values.

In addition, for example, the gradient value at the relative pixel position in the first range among each pair of relative pixel positions may be the vertical gradient value at the relative pixel position in the first range. In addition, the gradient value at the relative pixel position in the second range among each pair of relative pixel positions may be the vertical gradient value at the relative pixel position in the second range. In this way, encoder 100 is capable of deriving the plurality of parameters using the vertical gradient values with a small amount of computation.

In addition, for example, the circuitry of encoder 100 may derive a first parameter according to Expression (4.5) described above. The circuitry of encoder 100 may then derive a second parameter according to Expression (4.6) described above.

Here, Ω denotes a set of relative pixel positions, and [i, j] denotes each of the relative pixel positions.

$$I_y^0$$

denotes the vertical gradient value at each relative pixel position in the first range, $$I_y^1$$

denotes the vertical gradient value at each relative pixel position in the second range, $I^0$ denotes the pixel value at each relative pixel position in the first range, and $I^1$ denotes the pixel value at each relative pixel position in the second range. In addition, abs $$(I_y^1 + I_y^0)$$

denotes the absolute value of $$I_y^1 + I_y^1,$$

and sign $$(I_y^1 + I_y^0)$$

denotes the plus or minus sign of $$I_y^1 + I_y^0.$$

In this way, encoder 100 is capable of appropriately deriving the plurality of parameters using the pixel values and the vertical gradient values.

In addition, for example, the circuitry of encoder 100 may derive, for each of a plurality of pairs of relative pixel positions, the absolute value of the sum of the horizontal gradient values which indicates the absolute value of the sum of the horizontal gradient value at the relative pixel position in the first range and the horizontal gradient value at the relative pixel position in the second range. The circuitry of encoder 100 may then derive a total sum of a plurality of absolute values of the sums of horizontal gradient values derived respectively for the plurality of pairs of relative pixel positions.

Furthermore, the circuitry of encoder 100 may derive, for each of a plurality of pairs of relative pixel positions, the absolute value of the sum of the vertical gradient values which indicates the absolute value of the sum of the vertical gradient value at the relative pixel position in the first range and the vertical gradient value at the relative pixel position in the second range. The circuitry of encoder 100 may then derive the total sum of a plurality of absolute values of the sums of vertical gradient values derived respectively for the plurality of pairs of relative pixel positions.

Here, in the case where the total sum of the plurality of absolute values of the sums of horizontal gradient values is larger than the total sum of the plurality of absolute values of the sums of vertical gradient values, the circuitry of encoder 100 may apply horizontal gradient values to gradient values. More specifically, in this case, the circuitry of encoder 100 may apply the horizontal gradient value at the relative pixel position in the first range to the gradient value at the relative pixel position in the first range. Likewise, in this case, the circuitry of encoder 100 may apply the horizontal gradient value at the relative pixel position in the second range to the gradient value at the relative pixel position in the second range.

In the opposite case where the total sum of the plurality of absolute values of the sums of horizontal gradient values is not larger than the total sum of the plurality of absolute values of the sums of vertical gradient values, the circuitry of encoder 100 may apply vertical gradient values to the gradient values. More specifically, in this case, the circuitry of encoder 100 may apply the vertical gradient value at the relative pixel position in the first range to the gradient value at the relative pixel position in the first range. Likewise, in this case, the circuitry of encoder 100 may apply the vertical gradient value at the relative pixel position in the second range to the gradient value at the relative pixel position in the second range.

In this way, encoder 100 is capable of applying the horizontal gradient values or the vertical gradient values to the derivation of the plurality of parameters, based on comparison between the total sum related to the horizontal gradient values and the total sum related to the vertical gradient values. In other words, encoder 100 is capable of applying the gradient values having a large influence to the derivation of the plurality of parameters.

In addition, for example, the circuitry of encoder 100 may derive a third parameter using the first parameter as a denominator and the second parameter as a numerator, and generate a prediction image using the third parameter. In this way, encoder 100 is capable of appropriately generating the prediction image, using the parameters derived based on the relationships between the plurality of parameters.

In addition, for example, the circuitry of encoder 100 may derive, for each of the plurality of pairs of relative pixel positions, the gradient value at the relative pixel position in the first range and the gradient value at the relative pixel position in the second range using a three-tap filter having a filter coefficient set of [−1, 0, 1]. In this way, encoder 100 is capable of deriving the gradient value at each pixel position simply and appropriately.

In addition, for example, the current block may be a sub-block defined as having 4×4 pixel size in a coding unit. The circuitry of encoder 100 may then derive the first parameter and the second parameter on a per sub-block basis. In this way, encoder 100 is capable of appropriately generating the prediction image, using the plurality of parameters defined by the 4×4 pixel size.

In addition, for example, the circuitry of encoder 100 may derive a parameter in a bi-directional optical flow using the first parameter and the second parameter, and generate a prediction image using the parameter in the bi-directional optical flow and the bi-directional optical flow. In this way, encoder 100 is capable of appropriately generating the prediction image. The parameter in the bi-directional optical flow may be the third parameter described above.

It is to be noted that inter predictor 126 of encoder 100 may perform the operation described above as the circuitry of encoder 100.

Figure 51:
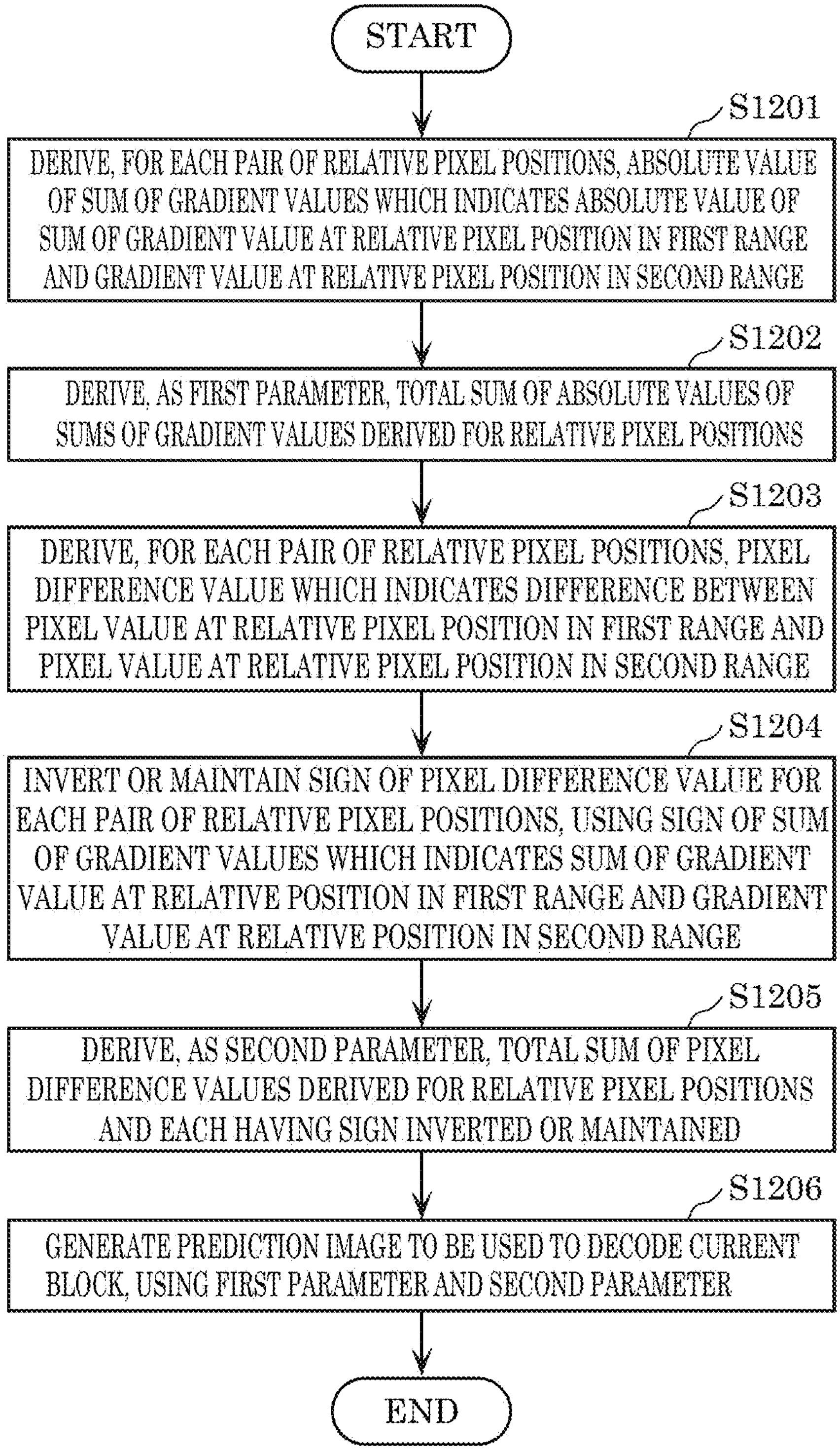
FIG. 51 is a flow chart indicating an operation performed by a decoder according to the embodiment.

FIG. 51 is a flow chart indicating an operation performed by decoder 200. For example, decoder 200 includes circuitry and memory connected to the circuitry. The circuitry and memory included in decoder 200 may correspond to processor b1 and memory b2 illustrated in FIG. 46. The circuitry of decoder 200 performs the following in operation.

For example, the circuitry of decoder 200 derives, for each of pairs of relative pixel positions, the absolute value of the sum of the gradient values which indicates the absolute value of the sum of the gradient value at a relative pixel position in a first range and the gradient value at a relative pixel position in a second range (S1201). Here, the first range includes a first reference block in a current block, and the second range includes a second reference block in the current block. Each of the plurality of pairs of relative pixel positions is determined commonly and relatively for both the first range and the second range, and each pair of relative pixel positions is composed of a pixel position in the first range and a pixel position in the second range.

The circuitry of decoder 200 then derives, as a first parameter, the total sum of a plurality of absolute values of the sums of gradient values derived respectively for the plurality of pairs of relative positions (S1202). In addition, the circuitry of decoder 200 derives a pixel difference value which indicates the difference between the pixel value at the relative pixel position in the first range and the pixel value at the relative pixel position in the second range, for each of the plurality of pairs of relative pixel positions (S1203). For example, at this time, the circuitry of decoder 200 derives the pixel difference value with a plus or minus sign by subtracting one of the pixel value at the relative pixel position in the first range and the pixel value at the relative pixel position in the second range in each of the plurality of pairs of relative pixel positions from the other.

The circuitry of decoder 200 then inverts or maintains the plus or minus sign of the pixel difference value derived for the pair of relative pixel positions, according to the plus or minus sign of the sum of the gradient values (S1204). Here, the sum of the gradient values at the pair of relative pixel positions indicates the sum of the gradient value at the relative pixel position in the first range and the gradient value at the relative pixel position in the second range.

The circuitry of decoder 200 then derives, as a second parameter, a total sum of a plurality of pixel difference values which have been derived respectively for the plurality of pairs of relative pixel positions and each of which has the plus or minus sign inverted or maintained (S1205).

The circuitry of decoder 200 then generates a prediction image to be used to decode the current block using the first parameter and the second parameter (S1206).

In this way, decoder 200 is capable of reducing substantial multiplication which requires a large amount of computation in the computations performed for the respective pixel positions, and deriving the plurality of parameters for generating the prediction image with a small amount of computation. Accordingly, decoder 200 is capable of reducing the processing amount in decoding.

In addition, for example, the gradient value at the relative pixel position in the first range among each pair of relative pixel positions may be the horizontal gradient value at the relative pixel position in the first range. In addition, the gradient value at the relative pixel position in the second range among each pair of relative pixel positions may be the horizontal gradient value at the relative pixel position in the second range. In this way, decoder 200 is capable of deriving the plurality of parameters using the horizontal gradient values with a small amount of computation.

In addition, for example, the circuitry of decoder 200 may derive a first parameter according to Expression (4.1) described above. In addition, the circuitry of decoder 200 may derive a second parameter according to Expression (4.2) described above.

Here, Ω denotes a set of relative pixel positions, and [i, j] denotes each of the relative pixel positions.

$$I_x^0$$

denotes the horizontal gradient value at each relative pixel position in the first range, $$I_x^1$$

denotes the horizontal gradient value at each relative pixel position in the second range, $I^0$ denotes the pixel value at each relative pixel position in the first range, and $I^1$ denotes the pixel value at each relative pixel position in the second range. In addition, abs $$(I_x^1 + I_x^0)$$

denotes the absolute value of $$I_x^1 + I_x^0,$$

and sign $$(I_x^1 + I_x^0)$$

denotes the plus or minus sign of $$I_x^1 + I_x^0.$$

In this way, decoder 200 is capable of appropriately deriving the plurality of parameters using the pixel values and the horizontal gradient values.

In addition, for example, the gradient value at the relative pixel position in the first range among each pair of relative pixel positions may be the vertical gradient value at the relative pixel position in the first range. In addition, for example, the gradient value at the relative pixel position in the second range among each pair of relative pixel positions may be the vertical gradient value at the relative pixel position in the second range. In this way, decoder 200 is capable of deriving the plurality of parameters using the vertical gradient values with a small amount of computation.

In addition, for example, the circuitry of decoder 200 may derive a first parameter according to Expression (4.5) described above. In addition, the circuitry of decoder 200 may derive a second parameter according to Expression (4.6) described above.

Here, Ω denotes a set of relative pixel positions, and [i, j] denotes each of the relative pixel positions.

$$I_y^1$$

denotes the vertical gradient value at each relative pixel position in the second range, $I^0$ denotes the pixel value at each relative pixel position in the first range, and $I^1$ denotes the pixel value at each relative pixel position in the second range. In addition, abs $$(I_y^1 + I_y^0)$$

denotes the absolute value of $$I_y^1 + I_y^0,$$

and sign $$(I_y^1 + I_y^0)$$

denotes the plus or minus sign of $$I_y^1 + I_y^0 \cdot I_y^0$$

denotes the vertical gradient value at each relative pixel position in the first range.

In this way, decoder 200 is capable of appropriately deriving the plurality of parameters using the pixel values and the vertical gradient values.

In addition, for example, the circuitry of decoder 200 may derive, for each of a plurality of pairs of relative pixel positions, the absolute value of the sum of the horizontal gradient values which indicates the absolute value of the sum of the horizontal gradient value at the relative pixel position in the first range and the horizontal gradient value at the relative pixel position in the second range. The circuitry of decoder 200 may then derive the total sum of a plurality of absolute values of horizontal gradient values derived respectively for the plurality of pairs of relative pixel positions.

Furthermore, the circuitry of decoder 200 may derive, for each of a plurality of pairs of relative pixel positions, the absolute value of the sum of the vertical gradient values which indicates the absolute value of the sum of the vertical gradient value at the relative pixel position in the first range and the vertical gradient value at the relative pixel position in the second range. The circuitry of decoder 200 may then derive the total sum of a plurality of absolute values of the sums of the vertical gradient values derived respectively for the plurality of pairs of relative pixel positions.

Here, in the case where the total sum of the plurality of absolute values of the sums of the horizontal gradient values is larger than the total sum of the plurality of absolute values of the sums of the vertical gradient values, the circuitry of decoder 200 may apply horizontal values to gradient values. More specifically, in this case, the circuitry of decoder 200 may apply the horizontal gradient value at the relative pixel position in the first range to the gradient value at the relative pixel position in the first range. More specifically, in this case, the circuitry of decoder 200 may apply the horizontal gradient value at the relative pixel position in the second range to the gradient value at the relative pixel position in the second range.

In the opposite case where the total sum of the plurality of absolute values of the sums of the horizontal gradient values is not larger than the total sum of the plurality of absolute values of the sums of the vertical gradient values, the circuitry of decoder 200 may apply vertical gradient values to the gradient values. More specifically, in this case, the circuitry of decoder 200 may apply the vertical gradient value at the relative pixel position in the first range to the gradient value at the relative pixel position in the first range. Likewise, in this case, the circuitry of decoder 200 may apply the vertical gradient value at the relative pixel position in the second range to the gradient value at the relative pixel position in the second range.

In this way, decoder 200 is capable of applying the horizontal gradient values or the vertical gradient values to the derivation of the plurality of parameters, based on comparison between the total sum related to the horizontal gradient values and the total sum related to the vertical gradient values. In other words, decoder 200 is capable of applying the gradient values having a large influence to the derivation of the plurality of parameters.

In addition, for example, the circuitry of decoder 200 may derive a third parameter using the first parameter as a denominator and the second parameter as a numerator, and generate a prediction image using the third parameter. In this way, decoder 200 is capable of appropriately generating the prediction image, using the parameters derived based on the relationships between the plurality of parameters.

In addition, for example, the circuitry of decoder 200 may derive, for each of the plurality of pairs of relative pixel positions, the gradient value at the relative pixel position in the first range and the gradient value at the relative pixel position in the second range using a three-tap filter having a filter coefficient set of [−1, 0, 1]. In this way, decoder 200 is capable of deriving the gradient value at each pixel position simply and appropriately.

In addition, for example, the current block may be a sub-block defined as having 4×4 pixel size in a coding unit. The circuitry of decoder 200 may then derive the first parameter and the second parameter on a per sub-block basis. In this way, decoder 200 is capable of appropriately generating the prediction image, using the plurality of parameters defined by the 4×4 pixel size.

In addition, for example, the circuitry of decoder 200 may derive a parameter in a bi-directional optical flow using the first parameter and the second parameter, and generate a prediction image using the parameter in the bi-directional optical flow and the bi-directional optical flow. In this way, decoder 200 is capable of appropriately generating the prediction image. The parameter in the bi-directional optical flow may be the third parameter described above.

It is to be noted that inter predictor 218 of decoder 200 may perform the operation described above as the circuitry of decoder 200.

OTHER EXAMPLES

Encoder 100 and decoder 200 in each of the above-described examples may be used as an image encoder and an image decoder, respectively, or may be used as a video encoder and a video decoder, respectively.

Alternatively, each of encoder 100 and decoder 200 may be used as a prediction device. In other words, encoder 100 and decoder 200 may correspond to only inter predictor 126 and inter predictor 218, respectively. The other constituent elements may be included in other devices.

In addition, at least a part of each example described above may be used as an encoding method or a decoding method, may be used as a prediction method, or may be used as another method.

In addition, each constituent element may be configured with dedicated hardware, or may be implemented by executing a software program suitable for the constituent element. Each constituent element may be implemented by a program executer such as a CPU or a processor reading and executing a software program recorded on a recording medium such as a hard disc or a semiconductor memory.

More specifically, each of encoder 100 and decoder 200 may include processing circuitry and storage which is electrically connected to the processing circuitry and is accessible from the processing circuitry. For example, the processing circuitry corresponds to processor a1 or b1, and the storage corresponds to memory a2 or b2.

The processing circuitry includes at least one of the dedicated hardware and the program executer, and executes processing using the storage. In addition, the storage stores a software program which is executed by the program executer when the processing circuitry includes the program executer.

Here, the software which implements either encoder 100, decoder 200, or the like described above is a program indicated below.

For example, the program causes a computer to execute an encoding method including: deriving an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; deriving, as a first parameter, a total sum of a plurality of absolute values of sums of gradient values derived respectively for the plurality of pairs of relative pixel positions; deriving a pixel difference value which indicates a difference between a pixel value at the relative pixel position in the first range and a pixel value at the relative pixel position in the second range, for each of the plurality of pairs of relative pixel positions; inverting or maintaining a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; deriving, as a second parameter, a total sum of a plurality of pixel difference values each having the plus or minus sign inverted or maintained, the plurality of pixel difference values derived respectively for the plurality of pairs of relative pixel positions; and generating a prediction image to be used to encode the current block using the first parameter and the second parameter.

For example, the program causes a computer to execute a decoding method including: deriving an absolute value of a sum of gradient values which indicates an absolute value of a sum of a gradient value at a relative pixel position in a first range and a gradient value at a relative pixel position in a second range, for each of a plurality of pairs of a relative pixel position in the first range and a relative pixel position in the second range among a plurality of pairs of relative pixel positions, the first range including a first reference block for a current block, the second range including a second reference block for the current block, the plurality of pairs of relative pixel positions being determined commonly and relatively for the first range and the second range; deriving, as a first parameter, a total sum of a plurality of absolute values of sums of gradient values derived respectively for the plurality of pairs of relative pixel positions; deriving a pixel difference value which indicates a difference between a pixel value at the relative pixel position in the first range and a pixel value at the relative pixel position in the second range, for each of the plurality of pairs of relative pixel positions; inverting or maintaining a plus or minus sign of the pixel difference value derived for each of the plurality of pairs of relative pixel positions, according to a plus or minus sign of the sum of the gradient values which indicates the sum of the gradient value at the relative pixel position in the first range and the gradient value at the relative pixel position in the second range; deriving, as a second parameter, a total sum of a plurality of pixel difference values each having the plus or minus sign inverted or maintained, the plurality of pixel difference values derived respectively for the plurality of pairs of relative pixel positions; and generating a prediction image to be used to decode the current block using the first parameter and the second parameter.

In addition, each constituent element may be circuitry as described above. Circuits may compose circuitry as a whole, or may be separate circuits. Alternatively, each constituent element may be implemented as a general processor, or may be implemented as an exclusive processor.

In addition, the process that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanation may be changed appropriately. A new ordinal number may be attached to a constituent element, or the ordinal number attached to a constituent element may be removed.

Although aspects of encoder 100 and decoder 200 have been described based on a plurality of examples, aspects of encoder 100 and decoder 200 are not limited to these examples. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by combining constituent elements in different embodiments.

One or more of the aspects disclosed herein may be performed by combining at least part of the other aspects in the present disclosure. In addition, one or more of the aspects disclosed herein may be performed by combining, with other aspects, part of the processes indicated in any of the flow charts according to the aspects, part of the configuration of any of the devices, part of syntaxes, etc.

[Implementations and Applications]

As described in each of the above embodiments, each functional or operational block may typically be realized as an MPU (micro processing unit) and memory, for example. Moreover, processes performed by each of the functional blocks may be realized as a program execution unit, such as a processor which reads and executes software (a program) recorded on a recording medium such as ROM. The software may be distributed. The software may be recorded on a variety of recording media such as semiconductor memory. Note that each functional block can also be realized as hardware (dedicated circuit). Various combinations of hardware and software may be employed.

The processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments will be described, as well as various systems that implement the application examples. Such a system may be characterized as including an image encoder that employs the image encoding method, an image decoder that employs the image decoding method, or an image encoder-decoder that includes both the image encoder and the image decoder. Other configurations of such a system may be modified on a case-by-case basis.

[Usage Examples]

Figure 52:
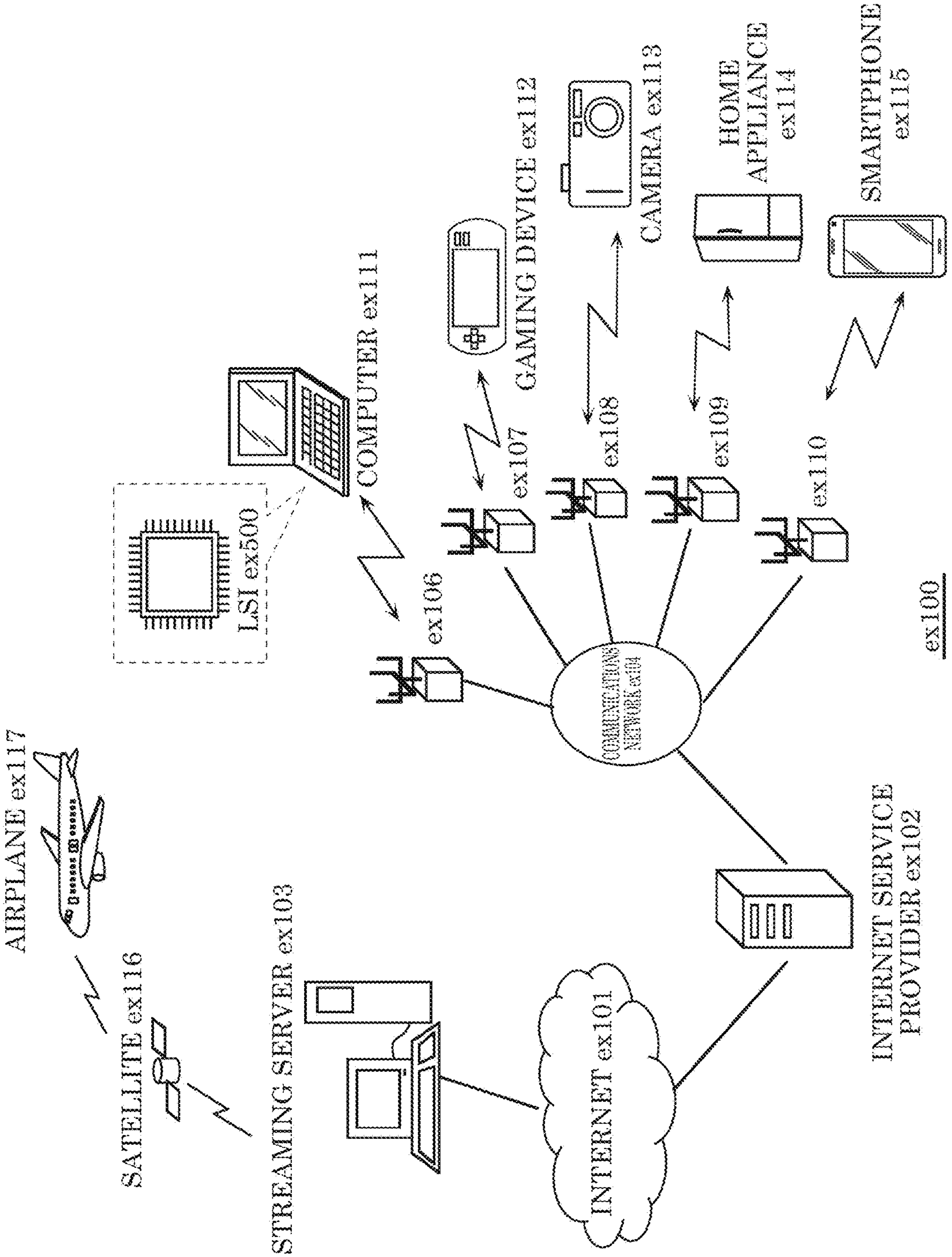
FIG. 52 is a block diagram illustrating an overall configuration of a content providing system for implementing a content distribution service.

FIG. 52 illustrates an overall configuration of content providing system ex100 suitable for implementing a content distribution service. The area in which the communication service is provided is divided into cells of desired sizes, and base stations ex106, ex107, ex108, ex109, and ex110, which are fixed wireless stations in the illustrated example, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above devices. In various implementations, the devices may be directly or indirectly connected together via a telephone network or near field communication, rather than via base stations ex106 through ex110. Further, streaming server ex103 may be connected to devices including computer ex111, gaming device ex112, camera ex113, home appliance ex114, and smartphone ex115 via, for example, internet ex101. Streaming server ex103 may also be connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handy-phone system (PHS) phone that can operate under the mobile communications system standards of the 2G, 3G, 3.9G, and 4G systems, as well as the next-generation 5G system.

Home appliance ex114 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or a terminal in airplane ex117) may perform the encoding processing described in the above embodiments on still-image or video content captured by a user via the terminal, may multiplex video data obtained via the encoding and audio data obtained by encoding audio corresponding to the video, and may transmit the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data may decode and reproduce the received data. In other words, the devices may each function as the image decoder, according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client may be dynamically assigned to the client. Content is cached and streamed to the edge server to reduce load times. In the event of, for example, some type of error or change in connectivity due, for example, to a spike in traffic, it is possible to stream data stably at high speeds, since it is possible to avoid affected parts of the network by, for example, dividing the processing between a plurality of edge servers, or switching the streaming duties to a different edge server and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount (an amount of features or characteristics) from an image, compresses data related to the feature amount as metadata, and transmits the compressed metadata to a server. For example, the server determines the significance of an object based on the feature amount and changes the quantization accuracy accordingly to perform compression suitable for the meaning (or content significance) of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos, and the server, on a per-unit basis. The units may be, for example, groups of pictures (GOP), pictures, or tiles resulting from dividing a picture. This makes it possible to reduce load times and achieve streaming that is closer to real time.

Since the videos are of approximately the same scene, management and/or instructions may be carried out by the server so that the videos captured by the terminals can be cross-referenced. Moreover, the server may receive encoded data from the terminals, change the reference relationship between items of data, or correct or replace pictures themselves, and then perform the encoding. This makes it possible to generate a stream with increased quality and efficiency for the individual items of data.

Furthermore, the server may stream video data after performing transcoding to convert the encoding format of the video data. For example, the server may convert the encoding format from MPEG to VP (e.g., VP9), may convert H.264 to H.265, etc.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

There has been an increase in usage of images or videos combined from images or videos of different scenes concurrently captured, or of the same scene captured from different angles, by a plurality of terminals such as camera ex113 and/or smartphone ex115. Videos captured by the terminals may be combined based on, for example, the separately obtained relative positional relationship between the terminals, or regions in a video having matching feature points.

In addition to the encoding of two-dimensional moving pictures, the server may encode a still image based on scene analysis of a moving picture, either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. The server may separately encode three-dimensional data generated from, for example, a point cloud and, based on a result of recognizing or tracking a person or object using three-dimensional data, may select or reconstruct and generate a video to be transmitted to a reception terminal, from videos captured by a plurality of terminals.

This allows the user to enjoy a scene by freely selecting videos corresponding to the video capturing terminals, and allows the user to enjoy the content obtained by extracting a video at a selected viewpoint from three-dimensional data reconstructed from a plurality of images or videos. Furthermore, as with video, sound may be recorded from relatively different angles, and the server may multiplex audio from a specific angle or space with the corresponding video, and transmit the multiplexed video and audio.

In recent years, content that is a composite of the real world and a virtual world, such as virtual reality (VR) and augmented reality (AR) content, has also become popular. In the case of VR images, the server may create images from the viewpoints of both the left and right eyes, and perform encoding that tolerates reference between the two viewpoint images, such as multi-view coding (MVC), and, alternatively, may encode the images as separate streams without referencing. When the images are decoded as separate streams, the streams may be synchronized when reproduced, so as to recreate a virtual three-dimensional space in accordance with the viewpoint of the user.

In the case of AR images, the server may superimpose virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information. The server may generate superimposed data based on three-dimensional data stored in the server in accordance with the received motion, and encode and stream the generated superimposed data to the decoder. Note that superimposed data typically includes, in addition to RGB values, an a value indicating transparency, and the server sets the a value for sections other than the object generated from three-dimensional data to, for example, 0, and may perform the encoding while those sections are transparent. Alternatively, the server may set the background to a determined RGB value, such as a chroma key, and generate data in which areas other than the object are set as the background. The determined RGB value may be predetermined.

Decoding of similarly streamed data may be performed by the client (e.g., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area, or inspect a region in further detail up close.

In situations in which a plurality of wireless connections are possible over near, mid, and far distances, indoors or outdoors, it may be possible to seamlessly receive content using a streaming system standard such as MPEG-DASH. The user may switch between data in real time while freely selecting a decoder or display apparatus including the user's terminal, displays arranged indoors or outdoors, etc. Moreover, using, for example, information on the position of the user, decoding can be performed while switching which terminal handles decoding and which terminal handles the displaying of content. This makes it possible to map and display information, while the user is on the move in route to a destination, on the wall of a nearby building in which a device capable of displaying content is embedded, or on part of the ground. Moreover, it is also possible to switch the bit rate of the received data based on the accessibility to the encoded data on a network, such as when encoded data is cached on a server quickly accessible from the reception terminal, or when encoded data is copied to an edge server in a content delivery service.

[Scalable Encoding]

Figure 53:
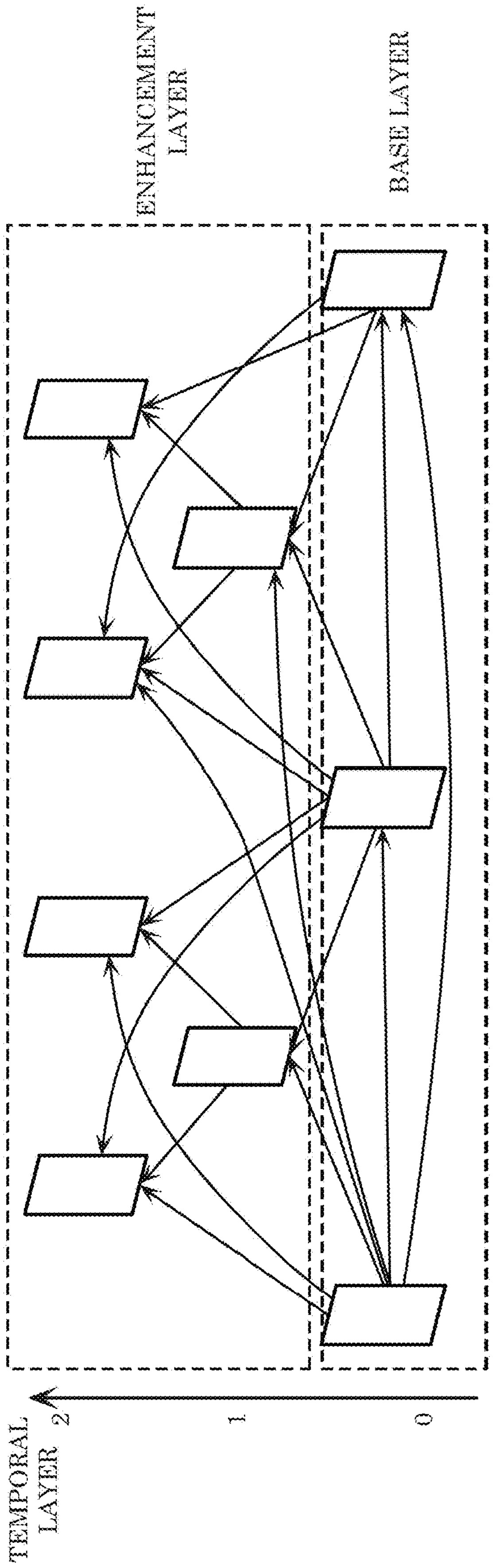
FIG. 53 is a conceptual diagram illustrating one example of an encoding structure in scalable encoding.

The switching of content will be described with reference to a scalable stream, illustrated in FIG. 53, which is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 53. Note that there may be a plurality of individual streams that are of the same content but different quality. In other words, by determining which layer to decode based on internal factors, such as the processing ability on the decoder side, and external factors, such as communication bandwidth, the decoder side can freely switch between low resolution content and high resolution content while decoding. For example, in a case in which the user wants to continue watching, for example at home on a device such as a TV connected to the internet, a video that the user had been previously watching on smartphone ex115 while on the move, the device can simply decode the same stream up to a different layer, which reduces the server side load.

Furthermore, in addition to the configuration described above, in which scalability is achieved as a result of the pictures being encoded per layer, with the enhancement layer being above the base layer, the enhancement layer may include metadata based on, for example, statistical information on the image. The decoder side may generate high image quality content by performing super-resolution imaging on a picture in the base layer based on the metadata. Super-resolution imaging may improve the SN ratio while maintaining resolution and/or increasing resolution. Metadata includes information for identifying a linear or a non-linear filter coefficient, as used in super-resolution processing, or information identifying a parameter value in filter processing, machine learning, or a least squares method used in super-resolution processing.

Figure 54:
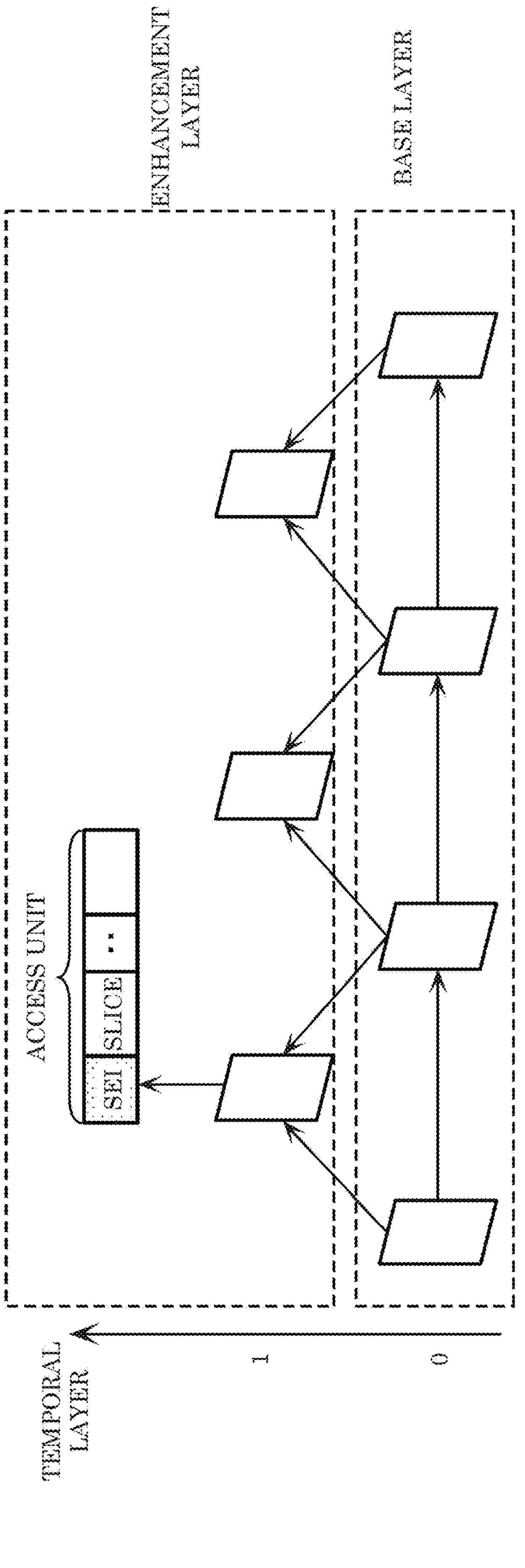
FIG. 54 is a conceptual diagram illustrating one example of an encoding structure in scalable encoding.

Alternatively, a configuration may be provided in which a picture is divided into, for example, tiles in accordance with, for example, the meaning of an object in the image. On the decoder side, only a partial region is decoded by selecting a tile to decode. Further, by storing an attribute of the object (person, car, ball, etc.) and a position of the object in the video (coordinates in identical images) as metadata, the decoder side can identify the position of a desired object based on the metadata and determine which tile or tiles include that object. For example, as illustrated in FIG. 54, metadata may be stored using a data storage structure different from pixel data, such as an SEI (supplemental enhancement information) message in HEVC. This metadata indicates, for example, the position, size, or color of the main object.

Metadata may be stored in units of a plurality of pictures, such as stream, sequence, or random access units. The decoder side can obtain, for example, the time at which a specific person appears in the video, and by fitting the time information with picture unit information, can identify a picture in which the object is present, and can determine the position of the object in the picture.

[Web Page Optimization]

Figure 55:
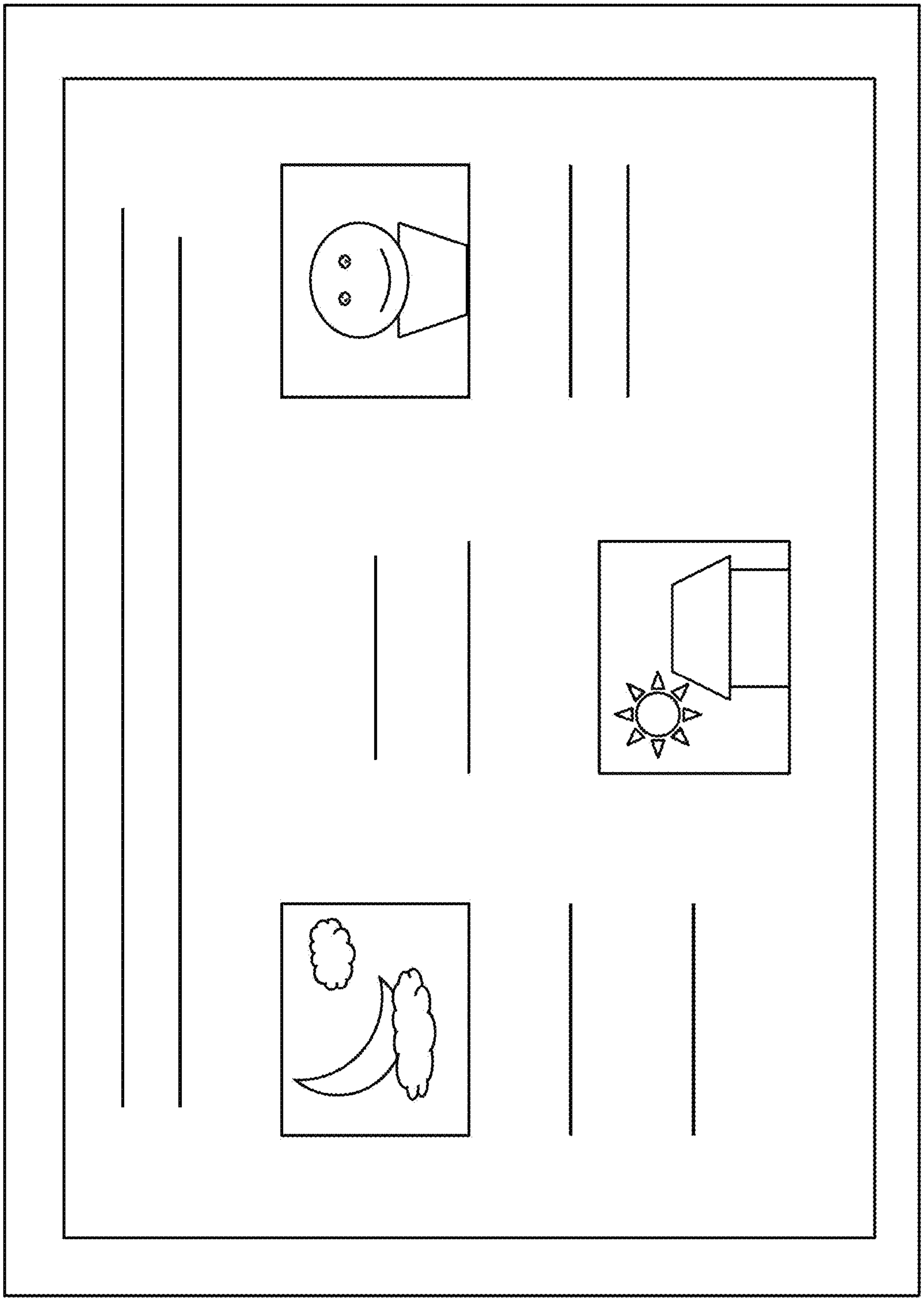
FIG. 55 is a conceptual diagram illustrating an example of a display screen of a web page.
Figure 56:
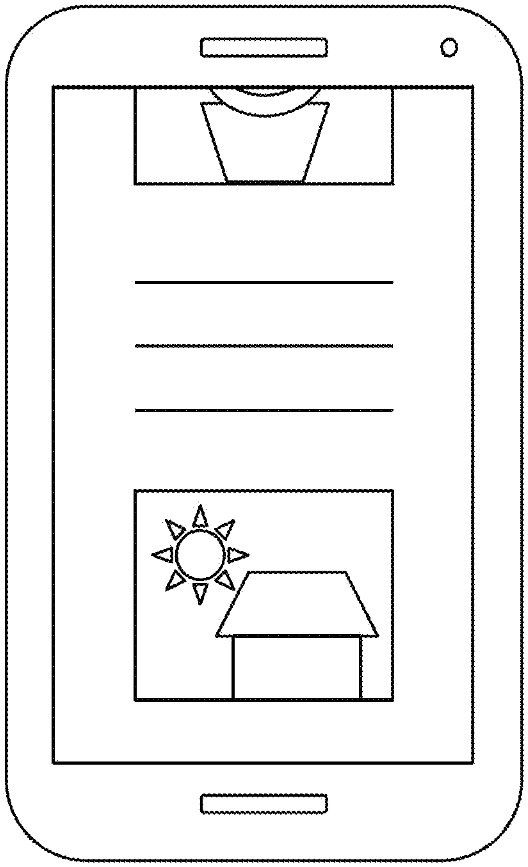
FIG. 56 is a conceptual diagram illustrating an example of a display screen of a web page.

FIG. 55 illustrates an example of a display screen of a web page on computer ex111, for example. FIG. 56 illustrates an example of a display screen of a web page on smartphone ex115, for example. As illustrated in FIG. 55 and FIG. 56, a web page may include a plurality of image links that are links to image content, and the appearance of the web page may differ depending on the device used to view the web page. When a plurality of image links are viewable on the screen, until the user explicitly selects an image link, or until the image link is in the approximate center of the screen or the entire image link fits in the screen, the display apparatus (decoder) may display, as the image links, still images included in the content or I pictures; may display video such as an animated gif using a plurality of still images or I pictures; or may receive only the base layer, and decode and display the video.

When an image link is selected by the user, the display apparatus performs decoding while, for example, giving the highest priority to the base layer. Note that if there is information in the HTML code of the web page indicating that the content is scalable, the display apparatus may decode up to the enhancement layer. Further, in order to guarantee real-time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Still further, the display apparatus may purposely ignore the reference relationship between pictures, and coarsely decode all B and P pictures as forward reference pictures, and then perform normal decoding as the number of pictures received over time increases.

[Autonomous Driving]

When transmitting and receiving still image or video data such as two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., containing the reception terminal is mobile, the reception terminal may seamlessly receive and perform decoding while switching between base stations among base stations ex106 through ex110 by transmitting information indicating the position of the reception terminal. Moreover, in accordance with the selection made by the user, the situation of the user, and/or the bandwidth of the connection, the reception terminal may dynamically select to what extent the metadata is received, or to what extent the map information, for example, is updated.

In content providing system ex100, the client may receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, and short content from an individual are also possible. Such content from individuals is likely to further increase in popularity. The server may first perform editing processing on the content before the encoding processing, in order to refine the individual content. This may be achieved using the following configuration, for example.

In real time while capturing video or image content, or after the content has been captured and accumulated, the server performs recognition processing based on the raw data or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures, or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement, based on an image processing result. Alternatively, the server may generate and encode a video digest based on a result of an analysis of the meaning of a scene.

There may be instances in which individual content may include content that infringes a copyright, moral right, portrait rights, etc. Such instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Further, the server may be configured to recognize the faces of people other than a registered person in images to be encoded, and when such faces appear in an image, may apply a mosaic filter, for example, to the face of the person. Alternatively, as pre- or post-processing for encoding, the user may specify, for copyright reasons, a region of an image including a person or a region of the background to be processed. The server may process the specified region by, for example, replacing the region with a different image, or blurring the region. If the region includes a person, the person may be tracked in the moving picture, and the person's head region may be replaced with another image as the person moves.

Since there is a demand for real-time viewing of content produced by individuals, which tends to be small in data size, the decoder may first receive the base layer as the highest priority, and perform decoding and reproduction, although this may differ depending on bandwidth. When the content is reproduced two or more times, such as when the decoder receives the enhancement layer during decoding and reproduction of the base layer, and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Implementation and Application Examples]

The encoding and decoding may be performed by LSI (large scale integration circuitry) ex500 (see FIG. 52), which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data may be coded by LSI ex500 included in smartphone ex115.

Note that LSI ex500 may be configured to download and activate an application. In such a case, the terminal first determines whether it is compatible with the scheme used to encode the content, or whether it is capable of executing a specific service. When the terminal is not compatible with the encoding scheme of the content, or when the terminal is not capable of executing a specific service, the terminal may first download a codec or application software and then obtain and reproduce the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast, whereas unicast is easier with content providing system ex100.

[Hardware Configuration]

Figure 57:
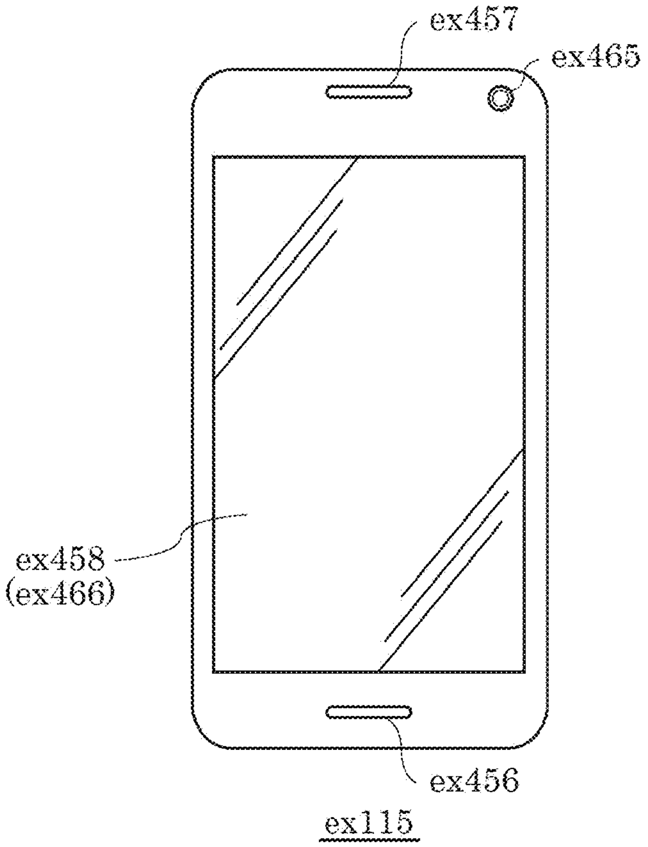
FIG. 57 is a block diagram illustrating one example of a smartphone.
Figure 58:
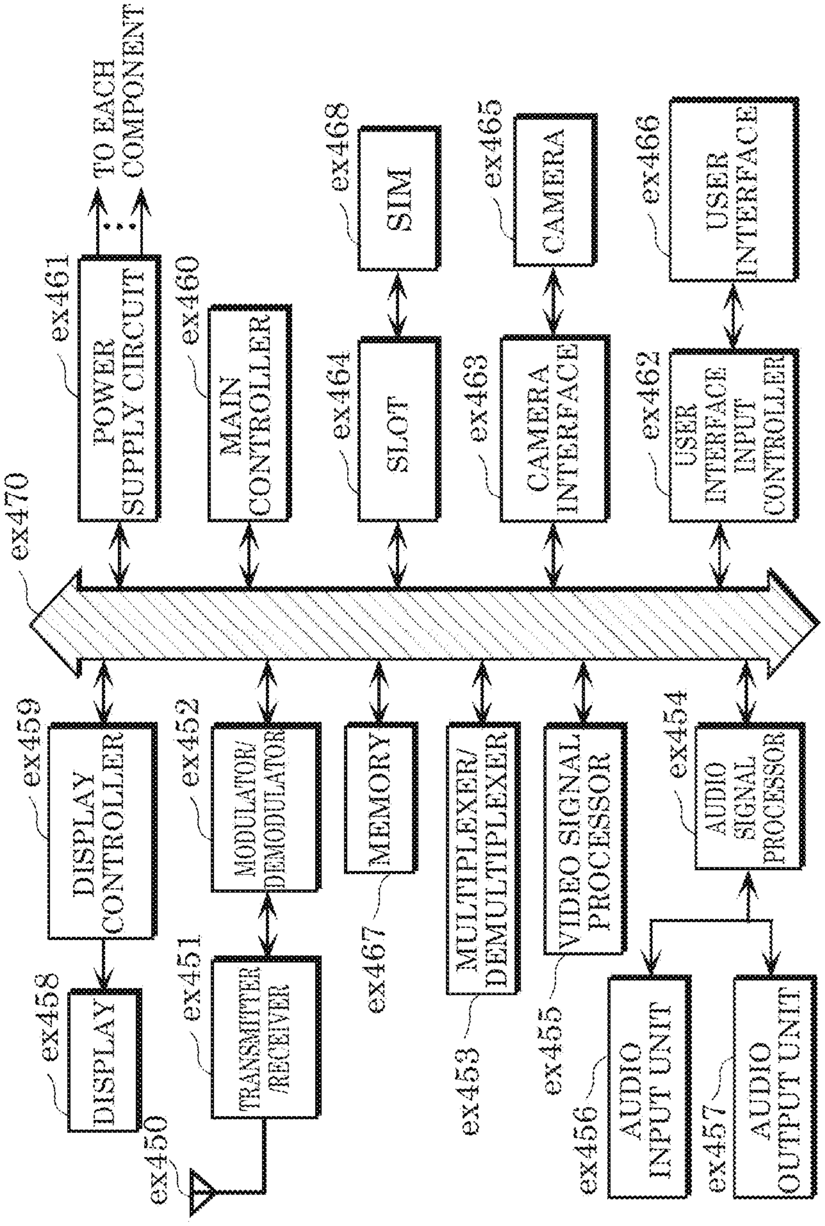
FIG. 58 is a block diagram illustrating an example of a configuration of a smartphone.

FIG. 57 illustrates further details of smartphone ex115 shown in FIG. 52. FIG. 58 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Main controller ex460, which may comprehensively control display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns on the power button of power supply circuit ex461, smartphone ex115 is powered on into an operable state, and each component is supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, to which spread spectrum processing is applied by modulator/demodulator ex452 and digital-analog conversion, and frequency conversion processing is applied by transmitter/receiver ex451, and the resulting signal is transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data may be transmitted under control of main controller ex460 via user interface input controller ex462 based on operation of user interface ex466 of the main body, for example. Similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453.

Audio signal processor ex454 encodes an audio signal recorded by audio input unit ex456 while camera ex465 is capturing a video or still image, and transmits the encoded audio data to multiplexer/demultiplexer ex453. Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450. The determined scheme may be predetermined.

When video appended in an email or a chat, or a video linked from a web page, is received, for example, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Audio signal processor ex454 decodes the audio signal and outputs audio from audio output unit ex457. Since real-time streaming is becoming increasingly popular, there may be instances in which reproduction of the audio may be socially inappropriate, depending on the user's environment. Accordingly, as an initial value, a configuration in which only video data is reproduced, i.e., the audio signal is not reproduced, may be preferable; audio may be synchronized and reproduced only when an input, such as when the user clicks video data, is received.

Although smartphone ex115 was used in the above example, other implementations are conceivable: a transceiver terminal including both an encoder and a decoder; a transmitter terminal including only an encoder; and a receiver terminal including only a decoder. In the description of the digital broadcasting system, an example is given in which multiplexed data obtained as a result of video data being multiplexed with audio data is received or transmitted. The multiplexed data, however, may be video data multiplexed with data other than audio data, such as text data related to the video. Further, the video data itself rather than multiplexed data may be received or transmitted.

Although main controller ex460 including a CPU is described as controlling the encoding or decoding processes, various terminals often include GPUs. Accordingly, a configuration is acceptable in which a large area is processed at once by making use of the performance ability of the GPU via memory shared by the CPU and GPU, or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of pictures, for example, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:

1. An encoder comprising:

a memory; and a processor connected to the memory and configured to:

generate a prediction image based on a first parameter and a second parameter that are derived in a bi-directional optical flow (BDOF) process; and encode a current block using the generated prediction image, wherein the first parameter is derived based on the following expression:

[Math. 1]

$$\sum_{[i,j]\in\Omega} \mathrm{abs}(I_x^1 + I_x^0);$$

and the second parameter according to the following expression:

[Math. 2]

$$\sum_{[i,j]\in\Omega} \left(-\mathrm{sign}(I_x^1 + I_x^0) \times (I^0 - I^1)\right),$$

where:

Ω indicates a set of relative pixel positions;

[i, j] indicates a relative pixel position in the set Ω defined by a horizontal position i and a vertical position j;

$$I_x^0$$

indicates a horizontal gradient value at a first pixel position in a first gradient image, and $$I_x^1$$

indicates a horizontal gradient value at the first pixel position in a second gradient image, the first pixel position being determined based on a relative pixel position [i, j], the first gradient image and the second gradient image corresponding to the current block;

$I^0$ indicates a pixel value at the first pixel position in a first interpolated image corresponding to the current block;

$I^1$ indicates a pixel value at the first pixel position in a second interpolated image corresponding to the current block;

the abs function outputs an absolute value of an argument;

the sign function outputs a sign of an argument; and $$I_x^0$$

indicates a difference between a pixel value adjacent to left side of $I^0$ and a pixel value adjacent to right side of $I^0$.

2. The encoder according to claim 1, wherein the sign function outputs the sign which is −1, or 1.

3. The encoder according to claim 1, wherein each of the relative pixel positions is relative to a position of the current block.

4. A decoder comprising:

a memory; and a processor connected to the memory and configured to:

generate a prediction image based on a first parameter and a second parameter that are derived in a bi-directional optical flow (BDOF) process; and decode a current block using the generated prediction image, wherein the first parameter is derived based on the following expression:

[Math. 3]

$$\sum_{[i,j]\in\Omega} \mathrm{abs}(I_x^1 + I_x^0);$$

and the second parameter according to the following expression:

[Math. 4]

$$\sum_{[i,j]\in\Omega} \left(-\mathrm{sign}(I_x^1 + I_x^0) \times (I^0 - I^1)\right),$$

where:

Ω indicates a set of relative pixel positions;

[i, j] indicates a relative pixel position in the set Ω defined by a horizontal position i and a vertical position j;

$$I_x^0$$

indicates a horizontal gradient value at a first pixel position in a first gradient image, and $$I_x^1$$

indicates a horizontal gradient value at the first pixel position in a second gradient image, the first pixel position being determined based on a relative pixel position [i, j], the first gradient image and the second gradient image corresponding to the current block;

$I^0$ indicates a pixel value at the first pixel position in a first interpolated image corresponding to the current block;

$I^1$ indicates a pixel value at the first pixel position in a second interpolated image corresponding to the current block;

the abs function outputs an absolute value of an argument;

the sign function outputs a sign of an argument; and $$I_x^0$$

indicates a difference between a pixel value adjacent to left side of $I^0$ and a pixel value adjacent to right side of $I^0$.

5. The decoder according to claim 4, wherein the sign function outputs the sign which is −1, or 1.

6. The decoder according to claim 4, wherein each of the relative pixel positions is relative to a position of the current block.

* * * * *